United States Patent
McNutt et al.

(10) Patent No.: US 12,375,308 B2
(45) Date of Patent: Jul. 29, 2025

(54) DATA ENCRYPTION AND DECRYPTION USING OBJECT-BASED SCREENS AND LOGIC BLOCKS

(71) Applicant: CERULEANT SYSTEMS, LLC, Crystal, MN (US)

(72) Inventors: Jason McNutt, Plymouth, MN (US); Amy J. Witty, Plymouth, MN (US); Scott Hanson, North Oaks, MN (US)

(73) Assignee: CERULEANT SYSTEMS, LLC, Crystal, MN (US)

( * ) Notice: Subject to any disclaimer, the term of this patent is extended or adjusted under 35 U.S.C. 154(b) by 310 days.

(21) Appl. No.: 18/075,738

(22) Filed: Dec. 6, 2022

(65) Prior Publication Data

US 2023/0123207 A1    Apr. 20, 2023

Related U.S. Application Data

(63) Continuation-in-part of application No. 17/156,775, filed on Jan. 25, 2021, now Pat. No. 11,816,237, which is a continuation of application No. 16/153,917, filed on Oct. 8, 2018, now Pat. No. 10,902,142.

(51) Int. Cl.
*H04L 9/32* (2006.01)
*H04L 9/08* (2006.01)

(52) U.S. Cl.
CPC .......... *H04L 9/3297* (2013.01); *H04L 9/0866* (2013.01); *H04L 9/0872* (2013.01); *H04L 9/3247* (2013.01)

(58) Field of Classification Search
None
See application file for complete search history.

(56) References Cited

U.S. PATENT DOCUMENTS

| | | |
|---|---|---|
| 6,668,325 B1 | 12/2003 | Collberg et al. |
| 8,588,406 B2 | 11/2013 | Dellow et al. |
| (Continued) | | |

FOREIGN PATENT DOCUMENTS

EP    1615369 A1  *  1/2006  ......... G06F 12/1408

OTHER PUBLICATIONS

US 9,251,311 B2, 02/2016, Guirguis et al. (withdrawn)
(Continued)

*Primary Examiner* — Benjamin E Lanier
(74) *Attorney, Agent, or Firm* — Stinson LLP

(57) ABSTRACT

A plurality of data blocks are encrypted in accordance with an encryption scheme that transforms a data block into an encrypted data block by: performing a bit modification operation on the data block using one or more logic blocks generated for the data block to thereby generate a first intermediate state data block; performing a bit remapping operation on the first intermediate state data block using at least one encryption screen to thereby generate a second intermediate state data block; and performing a bit modification operation on the second intermediate state data block using one or more logic blocks generated for the data block to thereby generate the encrypted data block. The encrypted data blocks may then be decrypted in accordance with a decryption scheme that applies at least one decryption screen and the same logic blocks that were used in the encryption scheme.

48 Claims, 62 Drawing Sheets

| | A | B | C | D | E | F | G | H | I | J | K | L | M | N | O | P |
|---|---|---|---|---|---|---|---|---|---|---|---|---|---|---|---|---|
| 1 | 1 | 2 | 3 | 4 | 5 | 6 | 7 | 8 | 9 | 10 | 11 | 12 | 13 | 14 | 15 | 16 |
| 2 | 17 | 18 | 19 | 20 | 21 | 22 | 23 | 24 | 25 | 26 | 27 | 28 | 29 | 30 | 31 | 32 |
| 3 | 33 | 34 | 35 | 36 | 37 | 38 | 39 | 40 | 41 | 42 | 43 | 44 | 45 | 46 | 47 | 48 |
| 4 | 49 | 50 | 51 | 52 | 53 | 54 | 55 | 56 | 57 | 58 | 59 | 60 | 61 | 62 | 63 | 64 |
| 5 | 65 | 66 | 67 | 68 | 69 | 70 | 71 | 72 | 73 | 74 | 75 | 76 | 77 | 78 | 79 | 80 |
| 6 | 81 | 82 | 83 | 84 | 85 | 86 | 87 | 88 | 89 | 90 | 91 | 92 | 93 | 94 | 95 | 96 |
| 7 | 97 | 98 | 99 | 100 | 101 | 102 | 103 | 104 | 105 | 106 | 107 | 108 | 109 | 110 | 111 | 112 |
| 8 | 113 | 114 | 115 | 116 | 117 | 118 | 119 | 120 | 121 | 122 | 123 | 124 | 125 | 126 | 127 | 128 |
| 9 | 129 | 130 | 131 | 132 | 133 | 134 | 135 | 136 | 137 | 138 | 139 | 140 | 141 | 142 | 143 | 144 |
| 10 | 145 | 146 | 147 | 148 | 149 | 150 | 151 | 152 | 153 | 154 | 155 | 156 | 157 | 158 | 159 | 160 |
| 11 | 161 | 162 | 163 | 164 | 165 | 166 | 167 | 168 | 169 | 170 | 171 | 172 | 173 | 174 | 175 | 176 |
| 12 | 177 | 178 | 179 | 180 | 181 | 182 | 183 | 184 | 185 | 186 | 187 | 188 | 189 | 190 | 191 | 192 |
| 13 | 193 | 194 | 195 | 196 | 197 | 198 | 199 | 200 | 201 | 202 | 203 | 204 | 205 | 206 | 207 | 208 |
| 14 | 209 | 210 | 211 | 212 | 213 | 214 | 215 | 216 | 217 | 218 | 219 | 220 | 221 | 222 | 223 | 224 |
| 15 | 225 | 226 | 227 | 228 | 229 | 230 | 231 | 232 | 233 | 234 | 235 | 236 | 237 | 238 | 239 | 240 |
| 16 | 241 | 242 | 243 | 244 | 245 | 246 | 247 | 248 | 249 | 250 | 251 | 252 | 253 | 254 | 255 | 256 |

100

(56) References Cited

U.S. PATENT DOCUMENTS

| | | |
|---|---|---|
| 11,816,237 B2 * | 11/2023 | McNutt .............. G06F 9/30029 |
| 2005/0251865 A1 | 11/2005 | Mont et al. |
| 2015/0229621 A1 | 8/2015 | Kariman et al. |
| 2016/0026829 A1 | 1/2016 | Brocker |
| 2017/0331624 A1 | 11/2017 | Samid |
| 2019/0007390 A1 | 1/2019 | Wu et al. |
| 2019/0044954 A1 * | 2/2019 | Kounavis .............. H04L 9/0631 |
| 2020/0169383 A1 | 5/2020 | Durham et al. |
| 2021/0258514 A1 | 8/2021 | Braness et al. |
| 2022/0358203 A1 | 11/2022 | Qureshi et al. |

OTHER PUBLICATIONS

International Search Report and Written Opinion from related PCT application, PCT/US2023/082454, dated Mar. 21, 2024 (15 pgs).
Armknecht, F., et al., Article, "A Guide to Fully Homomorphic Encryption", IACR Cryptology ePrint Archive (2015) (35 pgs).
NIST, FIPS Pub 197: Announcing the Advanced Encryption Standard (AES), 2001. (51 pgs).

* cited by examiner

|   | A | B | C | D | E | F | G | H | I | J | K | L | M | N | O | P |
|---|---|---|---|---|---|---|---|---|---|---|---|---|---|---|---|---|
| 1 | 1 | 2 | 3 | 4 | 5 | 6 | 7 | 8 | 9 | 10 | 11 | 12 | 13 | 14 | 15 | 16 |
| 2 | 17 | 18 | 19 | 20 | 21 | 22 | 23 | 24 | 25 | 26 | 27 | 28 | 29 | 30 | 31 | 32 |
| 3 | 33 | 34 | 35 | 36 | 37 | 38 | 39 | 40 | 41 | 42 | 43 | 44 | 45 | 46 | 47 | 48 |
| 4 | 49 | 50 | 51 | 52 | 53 | 54 | 55 | 56 | 57 | 58 | 59 | 60 | 61 | 62 | 63 | 64 |
| 5 | 65 | 66 | 67 | 68 | 69 | 70 | 71 | 72 | 73 | 74 | 75 | 76 | 77 | 78 | 79 | 80 |
| 6 | 81 | 82 | 83 | 84 | 85 | 86 | 87 | 88 | 89 | 90 | 91 | 92 | 93 | 94 | 95 | 96 |
| 7 | 97 | 98 | 99 | 100 | 101 | 102 | 103 | 104 | 105 | 106 | 107 | 108 | 109 | 110 | 111 | 112 |
| 8 | 113 | 114 | 115 | 116 | 117 | 118 | 119 | 120 | 121 | 122 | 123 | 124 | 125 | 126 | 127 | 128 |
| 9 | 129 | 130 | 131 | 132 | 133 | 134 | 135 | 136 | 137 | 138 | 139 | 140 | 141 | 142 | 143 | 144 |
| 10 | 145 | 146 | 147 | 148 | 149 | 150 | 151 | 152 | 153 | 154 | 155 | 156 | 157 | 158 | 159 | 160 |
| 11 | 161 | 162 | 163 | 164 | 165 | 166 | 167 | 168 | 169 | 170 | 171 | 172 | 173 | 174 | 175 | 176 |
| 12 | 177 | 178 | 179 | 180 | 181 | 182 | 183 | 184 | 185 | 186 | 187 | 188 | 189 | 190 | 191 | 192 |
| 13 | 193 | 194 | 195 | 196 | 197 | 198 | 199 | 200 | 201 | 202 | 203 | 204 | 205 | 206 | 207 | 208 |
| 14 | 209 | 210 | 211 | 212 | 213 | 214 | 215 | 216 | 217 | 218 | 219 | 220 | 221 | 222 | 223 | 224 |
| 15 | 225 | 226 | 227 | 228 | 229 | 230 | 231 | 232 | 233 | 234 | 235 | 236 | 237 | 238 | 239 | 240 |
| 16 | 241 | 242 | 243 | 244 | 245 | 246 | 247 | 248 | 249 | 250 | 251 | 252 | 253 | 254 | 255 | 256 |

| 1 | 2 | 3 | 4 | 5 | 6 | 7 | 8 |
|---|---|---|---|---|---|---|---|
| 0 | 1 | 0 | 1 | 0 | 0 | 0 | 1 |

| 9 | 10 | 11 | 12 | 13 | 14 | 15 | 16 |
|---|---|---|---|---|---|---|---|
| 1 | 0 | 1 | 0 | 1 | 0 | 0 | 0 |

| 17 | 18 | 19 | 20 | 21 | 22 | 23 | 24 |
|---|---|---|---|---|---|---|---|
| 1 | 0 | 1 | 0 | 1 | 0 | 0 | 1 |

| 25 | 26 | 27 | 28 | 29 | 30 | 31 | 32 |
|---|---|---|---|---|---|---|---|
| 0 | 1 | 1 | 0 | 1 | 1 | 1 | 1 |

| 33 | 34 | 35 | 36 | 37 | 38 | 39 | 40 |
|---|---|---|---|---|---|---|---|
| 0 | 1 | 0 | 0 | 1 | 0 | 1 | 1 |

| 41 | 42 | 43 | 44 | 45 | 46 | 47 | 48 |
|---|---|---|---|---|---|---|---|
| 0 | 0 | 1 | 1 | 0 | 0 | 1 | 0 |

| 49 | 50 | 51 | 52 | 53 | 54 | 55 | 56 |
|---|---|---|---|---|---|---|---|
| 1 | 0 | 0 | 0 | 1 | 1 | 0 | 1 |

| 57 | 58 | 59 | 60 | 61 | 62 | 63 | 64 |
|---|---|---|---|---|---|---|---|
| 1 | 0 | 0 | 1 | 1 | 0 | 1 | 0 |

|   | A | B | C | D | E | F | G | H | I | J | K | L | M | N | O | P |
|---|---|---|---|---|---|---|---|---|---|---|---|---|---|---|---|---|
| 1  | 0 | 1 | 0 | 1 | 0 | 0 | 0 | 1 | 1 | 0 | 1 | 0 | 1 | 0 | 0 | 0 |
| 2  | 1 | 0 | 1 | 0 | 1 | 0 | 0 | 1 | 0 | 1 | 1 | 0 | 1 | 1 | 1 | 1 |
| 3  | 0 | 1 | 0 | 0 | 1 | 0 | 1 | 1 | 0 | 0 | 1 | 1 | 0 | 0 | 1 | 0 |
| 4  | 1 | 0 | 0 | 0 | 1 | 1 | 0 | 1 | 1 | 0 | 0 | 1 | 1 | 0 | 1 | 0 |
| 5  | 0 | 1 | 0 | 1 | 0 | 0 | 0 | 1 | 1 | 0 | 1 | 0 | 1 | 0 | 0 | 0 |
| 6  | 1 | 0 | 1 | 0 | 1 | 0 | 0 | 1 | 0 | 1 | 1 | 0 | 1 | 1 | 1 | 1 |
| 7  | 0 | 1 | 0 | 0 | 1 | 0 | 1 | 1 | 0 | 0 | 1 | 1 | 0 | 0 | 1 | 0 |
| 8  | 1 | 0 | 0 | 0 | 1 | 1 | 0 | 1 | 1 | 0 | 0 | 1 | 1 | 0 | 1 | 0 |
| 9  | 0 | 1 | 0 | 1 | 0 | 0 | 0 | 1 | 1 | 0 | 1 | 0 | 1 | 0 | 0 | 0 |
| 10 | 1 | 0 | 1 | 0 | 1 | 0 | 0 | 1 | 0 | 1 | 1 | 0 | 1 | 1 | 1 | 1 |
| 11 | 0 | 1 | 0 | 0 | 1 | 0 | 1 | 1 | 0 | 0 | 1 | 1 | 0 | 0 | 1 | 0 |
| 12 | 1 | 0 | 0 | 0 | 1 | 1 | 0 | 1 | 1 | 0 | 0 | 1 | 1 | 0 | 1 | 0 |
| 13 | 0 | 1 | 0 | 1 | 0 | 0 | 0 | 1 | 1 | 0 | 1 | 0 | 1 | 0 | 0 | 0 |
| 14 | 1 | 0 | 1 | 0 | 1 | 0 | 0 | 1 | 0 | 1 | 1 | 0 | 1 | 1 | 1 | 1 |
| 15 | 0 | 1 | 0 | 0 | 1 | 0 | 1 | 1 | 0 | 0 | 1 | 1 | 0 | 0 | 1 | 0 |
| 16 | 1 | 0 | 0 | 0 | 1 | 1 | 0 | 1 | 1 | 0 | 0 | 1 | 1 | 0 | 1 | 0 |

FIG. 3

| | | | | | | | | | | | | | | | | | | |
|---|---|---|---|---|---|---|---|---|---|---|---|---|---|---|---|---|---|---|
| 1 | 1 | 0 | Rt | 2 | 9 | 17 | 1 | Lt | 2 | 17 | 33 | 0 | Rt | 2 | 25 | 49 | 1 | Lt | 2 |
| | 2 | 1 | Dn | 5 | | 18 | 0 | Up | 5 | | 34 | 1 | Dn | 5 | | 50 | 0 | Up | 5 |
| 2 | 3 | 0 | Rt | 1 | 10 | 19 | 1 | Lt | 1 | 18 | 35 | 0 | Rt | 1 | 26 | 51 | 0 | Rt | 1 |
| | 4 | 1 | Dn | 7 | | 20 | 0 | Up | 7 | | 36 | 0 | Up | 7 | | 52 | 0 | Up | 7 |
| 3 | 5 | 0 | Rt | 3 | 11 | 21 | 1 | Lt | 3 | 19 | 37 | 1 | Lt | 3 | 27 | 53 | 1 | Lt | 3 |
| | 6 | 0 | Up | 4 | | 22 | 0 | Up | 4 | | 38 | 0 | Up | 4 | | 54 | 1 | Dn | 4 |
| 4 | 7 | 0 | Rt | 8 | 12 | 23 | 0 | Rt | 8 | 20 | 39 | 1 | Lt | 8 | 28 | 55 | 0 | Rt | 8 |
| | 8 | 1 | Dn | 6 | | 24 | 1 | Dn | 6 | | 40 | 1 | Dn | 6 | | 56 | 1 | Dn | 6 |
| 5 | 9 | 1 | Lt | 2 | 13 | 25 | 0 | Rt | 2 | 21 | 41 | 0 | Rt | 2 | 29 | 57 | 1 | Lt | 2 |
| | 10 | 0 | Up | 5 | | 26 | 1 | Dn | 5 | | 42 | 0 | Up | 5 | | 58 | 0 | Up | 5 |
| 6 | 11 | 1 | Lt | 1 | 14 | 27 | 1 | Lt | 1 | 22 | 43 | 1 | Lt | 1 | 30 | 59 | 0 | Rt | 1 |
| | 12 | 0 | Up | 7 | | 28 | 0 | Up | 7 | | 44 | 1 | Dn | 7 | | 60 | 1 | Dn | 7 |
| 7 | 13 | 1 | Lt | 3 | 15 | 29 | 1 | Lt | 3 | 23 | 45 | 0 | Rt | 3 | 31 | 61 | 1 | Lt | 3 |
| | 14 | 0 | Up | 4 | | 30 | 1 | Dn | 4 | | 46 | 0 | Up | 4 | | 62 | 0 | Up | 4 |
| 8 | 15 | 0 | Rt | 8 | 16 | 31 | 1 | Lt | 8 | 24 | 47 | 1 | Lt | 8 | 32 | 63 | 1 | Lt | 8 |
| | 16 | 0 | Up | 6 | | 32 | 1 | Dn | 6 | | 48 | 0 | Up | 6 | | 64 | 0 | Up | 6 |

| 1 | From | - | To | | 2 | From | - | To | | 3 | From | - | To | | 4 | From | - | To | |
|---|---|---|---|---|---|---|---|---|---|---|---|---|---|---|---|---|---|---|---|
| 1 | A | 1 | - | D | 6 | 17 | A | 2 | - | C | 7 | 33 | A | 3 | - | F | 8 | 49 | A | 4 | - | C | 9 |
| 2 | B | 1 | - | C | 8 | 18 | B | 2 | - | C | 11 | 34 | B | 3 | - | D | 10 | 50 | B | 4 | - | C | 13 |
| 3 | C | 1 | - | F | 13 | 19 | C | 2 | - | A | 15 | 35 | C | 3 | - | F | 15 | 51 | C | 4 | - | P | 16 |
| 4 | D | 1 | - | M | 7 | 20 | D | 2 | - | M | 8 | 36 | D | 3 | - | L | 9 | 52 | D | 4 | - | L | 10 |
| 5 | E | 1 | - | C | 12 | 21 | E | 2 | - | G | 13 | 37 | E | 3 | - | D | 14 | 53 | E | 4 | - | H | 15 |
| 6 | F | 1 | - | F | 10 | 22 | F | 2 | - | E | 9 | 38 | F | 3 | - | F | 12 | 54 | F | 4 | - | F | 11 |
| 7 | G | 1 | - | E | 13 | 23 | G | 2 | - | K | 14 | 39 | G | 3 | - | D | 15 | 55 | G | 4 | - | J | 16 |
| 8 | H | 1 | - | P | 11 | 24 | H | 2 | - | P | 12 | 40 | H | 3 | - | P | 13 | 56 | H | 4 | - | P | 14 |
| 9 | I | 1 | - | G | 12 | 25 | I | 2 | - | H | 13 | 41 | I | 3 | - | G | 14 | 57 | I | 4 | - | G | 15 |
| 10 | J | 1 | - | I | 10 | 26 | J | 2 | - | L | 11 | 42 | J | 3 | - | J | 12 | 58 | J | 4 | - | K | 13 |
| 11 | K | 1 | - | I | 13 | 27 | K | 2 | - | I | 6 | 43 | K | 3 | - | I | 15 | 59 | K | 4 | - | I | 8 |
| 12 | L | 1 | - | D | 7 | 28 | L | 2 | - | D | 8 | 44 | L | 3 | - | F | 9 | 60 | L | 4 | - | E | 10 |
| 13 | M | 1 | - | P | 6 | 29 | M | 2 | - | L | 13 | 45 | M | 3 | - | P | 8 | 61 | M | 4 | - | L | 15 |
| 14 | N | 1 | - | N | 10 | 30 | N | 2 | - | O | 9 | 46 | N | 3 | - | N | 12 | 62 | N | 4 | - | A | 12 |
| 15 | O | 1 | - | L | 5 | 31 | O | 2 | - | L | 14 | 47 | O | 3 | - | L | 7 | 63 | O | 4 | - | M | 16 |
| 16 | P | 1 | - | I | 7 | 32 | P | 2 | - | I | 12 | 48 | P | 3 | - | I | 9 | 64 | P | 4 | - | I | 14 |

FIG. 6A

| 5 | From | | To | | 6 | From | | To | | 7 | From | | To | | 8 | From | | To | |
|---|---|---|---|---|---|---|---|---|---|---|---|---|---|---|---|---|---|---|---|
| 65 | A | 5 | - | C | 10 | 81 | A | 6 | - | E | 11 | 97 | A | 7 | - | H | 12 | 113 | A | 8 | - | B | 14 |
| 66 | B | 5 | - | D | 12 | 82 | B | 6 | - | C | 15 | 98 | B | 7 | - | C | 14 | 114 | B | 8 | - | C | 1 |
| 67 | C | 5 | - | F | 1 | 83 | C | 6 | - | A | 3 | 99 | C | 7 | - | F | 3 | 115 | C | 8 | - | P | 4 |
| 68 | D | 5 | - | M | 11 | 84 | D | 6 | - | M | 12 | 100 | D | 7 | - | N | 13 | 116 | D | 8 | - | M | 14 |
| 69 | E | 5 | - | C | 16 | 85 | E | 6 | - | G | 1 | 101 | E | 7 | - | D | 2 | 117 | E | 8 | - | H | 3 |
| 70 | F | 5 | - | F | 14 | 86 | F | 6 | - | J | 13 | 102 | F | 7 | - | F | 16 | 118 | F | 8 | - | J | 15 |
| 71 | G | 5 | - | E | 1 | 87 | G | 6 | - | K | 2 | 103 | G | 7 | - | D | 3 | 119 | G | 8 | - | J | 4 |
| 72 | H | 5 | - | P | 15 | 88 | H | 6 | - | A | 1 | 104 | H | 7 | - | P | 1 | 120 | H | 8 | - | P | 2 |
| 73 | I | 5 | - | G | 16 | 89 | I | 6 | - | H | 1 | 105 | I | 7 | - | G | 2 | 121 | I | 8 | - | G | 3 |
| 74 | J | 5 | - | J | 14 | 90 | J | 6 | - | K | 15 | 106 | J | 7 | - | K | 16 | 122 | J | 8 | - | K | 1 |
| 75 | K | 5 | - | I | 1 | 91 | K | 6 | - | J | 10 | 107 | K | 7 | - | I | 3 | 123 | K | 8 | - | K | 12 |
| 76 | L | 5 | - | D | 11 | 92 | L | 6 | - | E | 12 | 108 | L | 7 | - | D | 13 | 124 | L | 8 | - | E | 14 |
| 77 | M | 5 | - | P | 10 | 93 | M | 6 | - | L | 1 | 109 | M | 7 | - | A | 13 | 125 | M | 8 | - | L | 3 |
| 78 | N | 5 | - | N | 14 | 94 | N | 6 | - | O | 13 | 110 | N | 7 | - | N | 16 | 126 | N | 8 | - | A | 16 |
| 79 | O | 5 | - | N | 9 | 95 | O | 6 | - | L | 2 | 111 | O | 7 | - | N | 11 | 127 | O | 8 | - | M | 4 |
| 80 | P | 5 | - | I | 11 | 96 | P | 6 | - | I | 16 | 112 | P | 7 | - | M | 13 | 128 | P | 8 | - | I | 2 |

| 9 | From | - | To | | 10 | From | - | To | | 11 | From | - | To | | 12 | From | - | To | |
|---|---|---|---|---|---|---|---|---|---|---|---|---|---|---|---|---|---|---|
| 129 | A | 9 | - | H | 14 | 145 | A | 10 | - | O | 15 | 161 | A | 11 | - | H | 16 | 177 | A | 12 | - | B | 2 |
| 130 | B | 9 | - | D | 16 | 146 | B | 10 | - | C | 3 | 162 | B | 11 | - | C | 2 | 178 | B | 12 | - | C | 5 |
| 131 | C | 9 | - | F | 5 | 147 | C | 10 | - | A | 7 | 163 | C | 11 | - | F | 7 | 179 | C | 12 | - | A | 9 |
| 132 | D | 9 | - | M | 15 | 148 | D | 10 | - | L | 16 | 164 | D | 11 | - | N | 1 | 180 | D | 12 | - | M | 2 |
| 133 | E | 9 | - | C | 4 | 149 | E | 10 | - | G | 5 | 165 | E | 11 | - | C | 6 | 181 | E | 12 | - | J | 7 |
| 134 | F | 9 | - | F | 2 | 150 | F | 10 | - | J | 1 | 166 | F | 11 | - | F | 4 | 182 | F | 12 | - | J | 3 |
| 135 | G | 9 | - | E | 5 | 151 | G | 10 | - | K | 6 | 167 | G | 11 | - | G | 7 | 183 | G | 12 | - | J | 8 |
| 136 | H | 9 | - | P | 3 | 152 | H | 10 | - | A | 5 | 168 | H | 11 | - | P | 5 | 184 | H | 12 | - | E | 7 |
| 137 | I | 9 | - | G | 4 | 153 | I | 10 | - | H | 5 | 169 | I | 11 | - | G | 6 | 185 | I | 12 | - | N | 7 |
| 138 | J | 9 | - | J | 2 | 154 | J | 10 | - | K | 3 | 170 | J | 11 | - | K | 4 | 186 | J | 12 | - | K | 5 |
| 139 | K | 9 | - | I | 5 | 155 | K | 10 | - | O | 14 | 171 | K | 11 | - | H | 7 | 187 | K | 12 | - | O | 16 |
| 140 | L | 9 | - | E | 15 | 156 | L | 10 | - | E | 16 | 172 | L | 11 | - | D | 1 | 188 | L | 12 | - | E | 2 |
| 141 | M | 9 | - | B | 15 | 157 | M | 10 | - | M | 5 | 173 | M | 11 | - | B | 1 | 189 | M | 12 | - | K | 7 |
| 142 | N | 9 | - | N | 2 | 158 | N | 10 | - | O | 1 | 174 | N | 11 | - | N | 4 | 190 | N | 12 | - | A | 4 |
| 143 | O | 9 | - | A | 14 | 159 | O | 10 | - | L | 6 | 175 | O | 11 | - | B | 16 | 191 | O | 12 | - | L | 8 |
| 144 | P | 9 | - | N | 15 | 160 | P | 10 | - | I | 4 | 176 | P | 11 | - | M | 1 | 192 | P | 12 | - | H | 6 |

| 13 | From | | | To | | 14 | From | | | To | | 15 | From | | | To | | 16 | From | | | To |
|---|---|---|---|---|---|---|---|---|---|---|---|---|---|---|---|---|---|---|---|---|---|---|
| 193 | A | 13 | - | H | 2 | 209 | A | 14 | - | O | 3 | 225 | A | 15 | - | H | 4 | 241 | A | 16 | - | A | 6 |
| 194 | B | 13 | - | D | 4 | 210 | B | 14 | - | A | 8 | 226 | B | 15 | - | E | 6 | 242 | B | 16 | - | A | 10 |
| 195 | C | 13 | - | G | 9 | 211 | C | 14 | - | A | 11 | 227 | C | 15 | - | H | 11 | 243 | C | 16 | - | O | 4 |
| 196 | D | 13 | - | M | 3 | 212 | D | 14 | - | L | 4 | 228 | D | 15 | - | N | 5 | 244 | D | 16 | - | M | 6 |
| 197 | E | 13 | - | E | 8 | 213 | E | 14 | - | J | 9 | 229 | E | 15 | - | G | 10 | 245 | E | 16 | - | K | 11 |
| 198 | F | 13 | - | F | 6 | 214 | F | 14 | - | J | 5 | 230 | F | 15 | - | K | 8 | 246 | F | 16 | - | B | 8 |
| 199 | G | 13 | - | D | 9 | 215 | G | 14 | - | M | 10 | 231 | G | 15 | - | G | 11 | 247 | G | 16 | - | L | 12 |
| 200 | H | 13 | - | P | 7 | 216 | H | 14 | - | K | 9 | 232 | H | 15 | - | B | 10 | 248 | H | 16 | - | O | 11 |
| 201 | I | 13 | - | G | 8 | 217 | I | 14 | - | M | 9 | 233 | I | 15 | - | H | 10 | 249 | I | 16 | - | B | 12 |
| 202 | J | 13 | - | J | 6 | 218 | J | 14 | - | O | 7 | 234 | J | 15 | - | N | 8 | 250 | J | 16 | - | K | 10 |
| 203 | K | 13 | - | H | 9 | 219 | K | 14 | - | O | 2 | 235 | K | 15 | - | J | 11 | 251 | K | 16 | - | O | 6 |
| 204 | L | 13 | - | E | 3 | 220 | L | 14 | - | E | 4 | 236 | L | 15 | - | D | 5 | 252 | L | 16 | - | B | 7 |
| 205 | M | 13 | - | B | 3 | 221 | M | 14 | - | P | 9 | 237 | M | 15 | - | B | 5 | 253 | M | 16 | - | O | 12 |
| 206 | N | 13 | - | N | 6 | 222 | N | 14 | - | O | 5 | 238 | N | 15 | - | O | 8 | 254 | N | 16 | - | B | 9 |
| 207 | O | 13 | - | A | 2 | 223 | O | 14 | - | O | 10 | 239 | O | 15 | - | B | 4 | 255 | O | 16 | - | B | 13 |
| 208 | P | 13 | - | N | 3 | 224 | P | 14 | - | H | 8 | 240 | P | 15 | - | B | 6 | 256 | P | 16 | - | B | 11 |

FIG. 6D

|   | A | B | C | D | E | F | G | H | I | J | K | L | M | N | O | P |
|---|---|---|---|---|---|---|---|---|---|---|---|---|---|---|---|---|
| 1 | 88 | 173 | 114 | 172 | 71 | 67 | 85 | 89 | 75 | 150 | 122 | 93 | 176 | 164 | 158 | 104 |
| 2 | 207 | 177 | 162 | 101 | 188 | 134 | 105 | 193 | 128 | 138 | 87 | 95 | 180 | 142 | 219 | 120 |
| 3 | 83 | 205 | 146 | 103 | 204 | 99 | 121 | 117 | 107 | 182 | 154 | 125 | 196 | 208 | 209 | 136 |
| 4 | 190 | 239 | 133 | 194 | 220 | 166 | 137 | 225 | 160 | 119 | 170 | 212 | 127 | 174 | 243 | 115 |
| 5 | 152 | 237 | 178 | 236 | 135 | 131 | 149 | 153 | 139 | 214 | 186 | 15 | 157 | 228 | 222 | 168 |
| 6 | 241 | 240 | 165 | 1 | 226 | 198 | 169 | 192 | 27 | 202 | 151 | 159 | 244 | 206 | 251 | 13 |
| 7 | 147 | 252 | 17 | 12 | 184 | 163 | 167 | 171 | 16 | 181 | 189 | 47 | 4 | 185 | 218 | 200 |
| 8 | 210 | 246 | 2 | 28 | 197 | 33 | 201 | 224 | 59 | 183 | 230 | 191 | 20 | 234 | 238 | 45 |
| 9 | 179 | 254 | 49 | 199 | 22 | 44 | 195 | 203 | 48 | 213 | 216 | 36 | 217 | 79 | 30 | 221 |
| 10 | 242 | 232 | 65 | 34 | 60 | 6 | 229 | 233 | 10 | 91 | 250 | 52 | 215 | 14 | 223 | 77 |
| 11 | 211 | 256 | 18 | 76 | 81 | 54 | 231 | 227 | 80 | 235 | 245 | 26 | 68 | 111 | 248 | 8 |
| 12 | 62 | 249 | 5 | 66 | 92 | 38 | 9 | 97 | 32 | 42 | 123 | 247 | 84 | 46 | 253 | 24 |
| 13 | 109 | 255 | 50 | 108 | 7 | 3 | 21 | 25 | 11 | 86 | 58 | 29 | 112 | 100 | 94 | 40 |
| 14 | 143 | 113 | 98 | 37 | 124 | 70 | 41 | 129 | 64 | 74 | 23 | 31 | 116 | 78 | 155 | 56 |
| 15 | 19 | 141 | 82 | 39 | 140 | 35 | 57 | 53 | 43 | 118 | 90 | 61 | 132 | 144 | 145 | 72 |
| 16 | 126 | 175 | 69 | 130 | 156 | 102 | 73 | 161 | 96 | 55 | 106 | 148 | 63 | 110 | 187 | 51 |

| | A | B | C | D | E | F | G | H | I | J | K | L | M | N | O | P |
|---|---|---|---|---|---|---|---|---|---|---|---|---|---|---|---|---|
| 1 | 0 | 1 | 0 | 1 | 0 | 0 | 0 | 1 | 1 | 0 | 1 | 0 | 1 | 0 | 0 | 0 |
| 2 | 1 | 0 | 1 | 0 | 1 | 0 | 0 | 1 | 0 | 1 | 1 | 0 | 1 | 1 | 1 | 1 |
| 3 | 0 | 1 | 0 | 1 | 0 | 0 | 0 | 1 | 1 | 0 | 1 | 0 | 1 | 0 | 0 | 0 |
| 4 | 1 | 0 | 1 | 0 | 1 | 0 | 0 | 1 | 0 | 1 | 1 | 0 | 1 | 1 | 1 | 1 |
| 5 | 0 | 1 | 0 | 1 | 0 | 0 | 0 | 1 | 1 | 0 | 1 | 0 | 1 | 0 | 0 | 0 |
| 6 | 1 | 0 | 1 | 0 | 1 | 0 | 0 | 1 | 0 | 1 | 1 | 0 | 1 | 1 | 1 | 1 |
| 7 | 0 | 1 | 0 | 1 | 0 | 0 | 0 | 1 | 1 | 0 | 1 | 0 | 1 | 0 | 0 | 0 |
| 8 | 1 | 0 | 1 | 0 | 1 | 0 | 0 | 1 | 0 | 1 | 1 | 0 | 1 | 1 | 1 | 1 |
| 9 | 0 | 1 | 0 | 1 | 0 | 0 | 0 | 1 | 1 | 0 | 1 | 0 | 1 | 0 | 0 | 0 |
| 10 | 1 | 0 | 1 | 0 | 1 | 0 | 0 | 1 | 0 | 1 | 1 | 0 | 1 | 1 | 1 | 1 |
| 11 | 0 | 1 | 0 | 1 | 0 | 0 | 0 | 1 | 1 | 0 | 1 | 0 | 1 | 0 | 0 | 0 |
| 12 | 1 | 0 | 1 | 0 | 1 | 0 | 0 | 1 | 0 | 1 | 1 | 0 | 1 | 1 | 1 | 1 |
| 13 | 0 | 1 | 0 | 1 | 0 | 0 | 0 | 1 | 1 | 0 | 1 | 0 | 1 | 0 | 0 | 0 |
| 14 | 1 | 0 | 1 | 0 | 1 | 0 | 0 | 1 | 0 | 1 | 1 | 0 | 1 | 1 | 1 | 1 |
| 15 | 0 | 1 | 0 | 1 | 0 | 0 | 0 | 1 | 1 | 0 | 1 | 0 | 1 | 0 | 0 | 0 |
| 16 | 1 | 0 | 1 | 0 | 1 | 0 | 0 | 1 | 0 | 1 | 1 | 0 | 1 | 1 | 1 | 1 |

|    | A | B | C | D | E | F | G | H | I | J | K | L | M | N | O | P |
|----|---|---|---|---|---|---|---|---|---|---|---|---|---|---|---|---|
| 1  | 1 | 0 | 1 | 0 | 1 | 0 | 0 | 1 | 0 | 1 | 0 | 1 | 1 | 1 | 0 | 1 |
| 2  | 0 | 1 | 1 | 0 | 0 | 0 | 1 | 0 | 0 | 0 | 1 | 0 | 1 | 0 | 1 | 0 |
| 3  | 0 | 0 | 1 | 0 | 1 | 0 | 1 | 0 | 1 | 0 | 0 | 1 | 0 | 1 | 1 | 1 |
| 4  | 1 | 0 | 0 | 0 | 1 | 1 | 0 | 1 | 1 | 0 | 0 | 1 | 0 | 0 | 0 | 1 |
| 5  | 0 | 1 | 0 | 0 | 1 | 0 | 1 | 0 | 1 | 1 | 0 | 1 | 0 | 0 | 0 | 0 |
| 6  | 1 | 0 | 1 | 1 | 0 | 1 | 1 | 0 | 1 | 0 | 1 | 1 | 0 | 0 | 0 | 1 |
| 7  | 0 | 1 | 0 | 0 | 0 | 1 | 0 | 1 | 1 | 1 | 1 | 0 | 0 | 0 | 1 | 0 |
| 8  | 0 | 1 | 0 | 1 | 0 | 0 | 1 | 0 | 0 | 0 | 0 | 1 | 0 | 1 | 0 | 0 |
| 9  | 0 | 0 | 1 | 1 | 0 | 0 | 1 | 0 | 0 | 1 | 0 | 1 | 0 | 0 | 1 | 0 |
| 10 | 0 | 1 | 0 | 0 | 1 | 1 | 0 | 0 | 1 | 0 | 0 | 1 | 1 | 1 | 1 | 1 |
| 11 | 1 | 0 | 0 | 0 | 1 | 1 | 0 | 1 | 0 | 0 | 0 | 1 | 0 | 0 | 0 | 1 |
| 12 | 0 | 1 | 0 | 1 | 0 | 0 | 1 | 1 | 1 | 0 | 0 | 0 | 0 | 1 | 0 | 1 |
| 13 | 0 | 0 | 1 | 1 | 1 | 1 | 0 | 1 | 1 | 0 | 1 | 1 | 0 | 0 | 1 | 1 |
| 14 | 0 | 1 | 0 | 1 | 0 | 1 | 0 | 0 | 1 | 0 | 1 | 0 | 0 | 0 | 1 | 0 |
| 15 | 1 | 1 | 0 | 0 | 0 | 1 | 0 | 1 | 0 | 1 | 0 | 0 | 0 | 1 | 1 | 0 |
| 16 | 1 | 0 | 0 | 0 | 1 | 0 | 1 | 0 | 0 | 0 | 0 | 1 | 0 | 0 | 1 | 0 |

FIG. 9

|    | A | B | C | D | E | F | G | H | I | J | K | L | M | N | O | P |
|----|---|---|---|---|---|---|---|---|---|---|---|---|---|---|---|---|
| 1  | 1 | 0 | 1 | 0 | 0 | 1 | 1 | 1 | 1 | 1 | 1 | 0 | 1 | 1 | 1 | 1 |
| 2  | 0 | 0 | 1 | 0 | 0 | 0 | 1 | 1 | 1 | 1 | 1 | 1 | 1 | 1 | 0 | 1 |
| 3  | 0 | 0 | 1 | 1 | 1 | 0 | 0 | 1 | 0 | 0 | 0 | 0 | 0 | 1 | 0 | 0 |
| 4  | 1 | 1 | 0 | 1 | 1 | 1 | 0 | 0 | 0 | 1 | 0 | 1 | 0 | 0 | 0 | 1 |
| 5  | 0 | 1 | 0 | 0 | 0 | 1 | 1 | 0 | 1 | 0 | 0 | 0 | 1 | 0 | 0 | 0 |
| 6  | 1 | 0 | 0 | 0 | 0 | 0 | 1 | 1 | 1 | 0 | 0 | 0 | 1 | 1 | 0 | 0 |
| 7  | 1 | 0 | 0 | 0 | 0 | 0 | 0 | 1 | 1 | 0 | 1 | 1 | 0 | 0 | 0 | 0 |
| 8  | 1 | 1 | 1 | 0 | 0 | 1 | 0 | 0 | 1 | 0 | 0 | 0 | 1 | 1 | 0 | 0 |
| 9  | 0 | 0 | 0 | 0 | 0 | 0 | 1 | 1 | 0 | 0 | 1 | 0 | 1 | 0 | 0 | 1 |
| 10 | 1 | 1 | 0 | 1 | 1 | 1 | 1 | 0 | 0 | 0 | 1 | 1 | 0 | 0 | 1 | 1 |
| 11 | 0 | 1 | 1 | 1 | 1 | 1 | 0 | 0 | 1 | 0 | 1 | 0 | 0 | 0 | 0 | 1 |
| 12 | 1 | 0 | 0 | 1 | 1 | 0 | 0 | 0 | 0 | 0 | 1 | 0 | 1 | 1 | 1 | 0 |
| 13 | 0 | 0 | 1 | 0 | 0 | 1 | 1 | 0 | 1 | 0 | 0 | 1 | 0 | 0 | 0 | 1 |
| 14 | 1 | 0 | 1 | 1 | 1 | 1 | 1 | 0 | 0 | 1 | 1 | 1 | 0 | 0 | 1 | 0 |
| 15 | 1 | 0 | 1 | 0 | 0 | 0 | 0 | 1 | 0 | 1 | 0 | 0 | 1 | 0 | 0 | 0 |
| 16 | 1 | 0 | 0 | 0 | 0 | 1 | 0 | 0 | 1 | 0 | 0 | 1 | 0 | 0 | 0 | 0 |

FIG. 10

|    | A | B | C | D | E | F | G | H | I | J | K | L | M | N | O | P |
|----|---|---|---|---|---|---|---|---|---|---|---|---|---|---|---|---|
| 1  | 1 | 1 | 1 | 1 | 0 | 1 | 1 | 0 | 0 | 1 | 0 | 0 | 0 | 1 | 1 | 1 |
| 2  | 1 | 0 | 0 | 0 | 1 | 0 | 1 | 0 | 1 | 0 | 0 | 1 | 0 | 0 | 1 | 0 |
| 3  | 0 | 1 | 1 | 0 | 1 | 0 | 0 | 0 | 1 | 0 | 1 | 0 | 1 | 1 | 0 | 0 |
| 4  | 0 | 1 | 1 | 1 | 0 | 1 | 0 | 1 | 0 | 0 | 1 | 1 | 1 | 1 | 1 | 0 |
| 5  | 0 | 0 | 0 | 1 | 0 | 1 | 1 | 1 | 0 | 0 | 1 | 0 | 0 | 0 | 0 | 0 |
| 6  | 0 | 0 | 1 | 0 | 1 | 0 | 1 | 0 | 1 | 1 | 1 | 0 | 0 | 0 | 1 | 1 |
| 7  | 1 | 1 | 0 | 1 | 0 | 0 | 0 | 0 | 0 | 0 | 0 | 1 | 1 | 0 | 0 | 0 |
| 8  | 0 | 1 | 0 | 0 | 1 | 1 | 0 | 1 | 1 | 1 | 1 | 0 | 0 | 0 | 1 | 1 |
| 9  | 0 | 1 | 0 | 1 | 0 | 0 | 1 | 0 | 1 | 0 | 0 | 0 | 0 | 0 | 0 | 1 |
| 10 | 0 | 1 | 1 | 1 | 0 | 1 | 1 | 1 | 0 | 1 | 0 | 1 | 1 | 1 | 0 | 0 |
| 11 | 0 | 0 | 1 | 0 | 1 | 1 | 0 | 1 | 0 | 0 | 0 | 0 | 1 | 0 | 0 | 1 |
| 12 | 0 | 0 | 1 | 1 | 0 | 0 | 0 | 1 | 0 | 1 | 0 | 0 | 0 | 0 | 0 | 1 |
| 13 | 0 | 1 | 1 | 1 | 0 | 1 | 1 | 1 | 0 | 0 | 1 | 1 | 1 | 0 | 0 | 1 |
| 14 | 0 | 0 | 0 | 1 | 0 | 1 | 1 | 1 | 0 | 0 | 0 | 1 | 1 | 1 | 0 | 1 |
| 15 | 1 | 1 | 1 | 1 | 0 | 0 | 0 | 0 | 1 | 1 | 1 | 0 | 0 | 0 | 0 | 0 |
| 16 | 0 | 0 | 1 | 0 | 1 | 1 | 0 | 1 | 1 | 1 | 1 | 1 | 1 | 1 | 1 | 1 |

FIG. 11

| 1 | 2 | 3 | 4 | 5 | 6 | 7 | 8 |
|---|---|---|---|---|---|---|---|
| 1 | 1 | 0 | 1 | 0 | 1 | 1 | 0 |

| 9 | 10 | 11 | 12 | 13 | 14 | 15 | 16 |
|---|---|---|---|---|---|---|---|
| 1 | 0 | 1 | 0 | 1 | 1 | 0 | 1 |

| 17 | 18 | 19 | 20 | 21 | 22 | 23 | 24 |
|---|---|---|---|---|---|---|---|
| 0 | 0 | 1 | 0 | 0 | 1 | 1 | 1 |

| 25 | 26 | 27 | 28 | 29 | 30 | 31 | 32 |
|---|---|---|---|---|---|---|---|
| 1 | 1 | 0 | 0 | 0 | 0 | 1 | 1 |

| 33 | 34 | 35 | 36 | 37 | 38 | 38 | 40 |
|---|---|---|---|---|---|---|---|
| 0 | 0 | 0 | 0 | 0 | 1 | 0 | 1 |

| 41 | 42 | 43 | 44 | 45 | 46 | 47 | 48 |
|---|---|---|---|---|---|---|---|
| 1 | 1 | 1 | 1 | 1 | 0 | 0 | 1 |

| 49 | 50 | 51 | 52 | 53 | 54 | 55 | 56 |
|---|---|---|---|---|---|---|---|
| 1 | 0 | 0 | 0 | 0 | 0 | 0 | 1 |

| 57 | 58 | 59 | 60 | 61 | 62 | 63 | 64 |
|---|---|---|---|---|---|---|---|
| 0 | 1 | 0 | 0 | 1 | 1 | 1 | 0 |

| 65 | 66 | 67 | 68 | 69 | 70 | 71 | 72 |
|---|---|---|---|---|---|---|---|
| 0 | 0 | 0 | 0 | 1 | 1 | 1 | 1 |

| 73 | 74 | 75 | 76 | 77 | 78 | 79 | 80 |
|---|---|---|---|---|---|---|---|
| 1 | 0 | 1 | 1 | 0 | 1 | 1 | 0 |

| 81 | 82 | 83 | 84 | 85 | 86 | 87 | 88 |
|---|---|---|---|---|---|---|---|
| 1 | 0 | 1 | 1 | 0 | 0 | 0 | 0 |

| 89 | 90 | 91 | 92 | 93 | 94 | 95 | 96 |
|---|---|---|---|---|---|---|---|
| 1 | 0 | 1 | 0 | 0 | 1 | 1 | 1 |

| 97 | 98 | 99 | 100 | 101 | 102 | 103 | 104 |
|---|---|---|---|---|---|---|---|
| 0 | 1 | 1 | 0 | 1 | 1 | 0 | 1 |

| 105 | 106 | 107 | 108 | 109 | 110 | 111 | 112 |
|---|---|---|---|---|---|---|---|
| 0 | 0 | 1 | 0 | 0 | 1 | 1 | 1 |

| 113 | 114 | 115 | 116 | 117 | 118 | 119 | 120 |
|---|---|---|---|---|---|---|---|
| 1 | 0 | 1 | 1 | 1 | 1 | 0 | 1 |

| 121 | 122 | 123 | 124 | 125 | 126 | 127 | 128 |
|---|---|---|---|---|---|---|---|
| 0 | 1 | 1 | 1 | 0 | 0 | 0 | 0 |

| 1 | 1 | 0 | 1 | 0 | 1 | 1 | 0 |
|---|---|---|---|---|---|---|---|
| 13 | | | | 6 | | | |

| 1 | 0 | 1 | 0 | 1 | 1 | 0 | 1 |
|---|---|---|---|---|---|---|---|
| 10 | | | | 11 | | | |

| 0 | 0 | 1 | 0 | 0 | 1 | 1 | 1 |
|---|---|---|---|---|---|---|---|
| 2 | | | | 7 | | | |

| 1 | 1 | 0 | 0 | 0 | 0 | 1 | 1 |
|---|---|---|---|---|---|---|---|
| 12 | | | | 3 | | | |

| 0 | 0 | 0 | 0 | 0 | 1 | 0 | 1 |
|---|---|---|---|---|---|---|---|
| 0 | | | | 5 | | | |

| 1 | 1 | 1 | 1 | 1 | 0 | 0 | 1 |
|---|---|---|---|---|---|---|---|
| 15 | | | | 9 | | | |

| 1 | 0 | 0 | 0 | 0 | 0 | 0 | 1 |
|---|---|---|---|---|---|---|---|
| 8 | | | | 1 | | | |

| 0 | 1 | 0 | 0 | 1 | 1 | 1 | 0 |
|---|---|---|---|---|---|---|---|
| 4 | | | | 14 | | | |

| 13 | 6  | 10 | 11 |
|----|----|----|----|
| 2  | 7  | 12 | 3  |
| 0  | 5  | 15 | 9  |
| 8  | 6  | 1  | 14 |
| 0  | 15 | 11 | 6  |
| 11 | 0  | 10 | 7  |
| 6  | 11 | 2  | 7  |
| 11 | 13 | 7  | 0  |

| 13 | 6 | 10 | 11 |
|----|---|----|----|
| 2  | 7 | 12 | 3  |
| 0  | 5 | 15 | 9  |
| 8  | 6 | 1  | 14 |

| 0 | 0 | 0 | 0 | 1 | 1 | 1 | 1 |
|---|---|---|---|---|---|---|---|
| 0 |   |   |   | 15 |  |   |   |

| 1 | 0 | 1 | 1 | 0 | 1 | 1 | 0 |
|---|---|---|---|---|---|---|---|
| 11 |   |   |   | 6 |   |   |   |

| 1 | 0 | 1 | 1 | 0 | 0 | 0 | 0 |
|---|---|---|---|---|---|---|---|
| 11 |   |   |   | 0 |   |   |   |

| 1 | 0 | 1 | 0 | 0 | 1 | 1 | 1 |
|---|---|---|---|---|---|---|---|
| 10 |   |   |   | 7 |   |   |   |

| 0 | 1 | 1 | 0 | 1 | 1 | 0 | 1 |
|---|---|---|---|---|---|---|---|
| 6 |   |   |   | 11 |   |   |   |

| 0 | 0 | 1 | 0 | 0 | 1 | 1 | 1 |
|---|---|---|---|---|---|---|---|
| 2 |   |   |   | 7 |   |   |   |

| 1 | 0 | 1 | 1 | 1 | 1 | 0 | 1 |
|---|---|---|---|---|---|---|---|
| 11 |   |   |   | 13 |   |   |   |

| 0 | 1 | 1 | 1 | 0 | 0 | 0 | 0 |
|---|---|---|---|---|---|---|---|
| 7 |   |   |   | 0 |   |   |   |

FIG. 13C

SETUP OBJECT 0 (*SO_0*) (256 BITS):

*SO_0* (bit stream):

0011101001001111001011010110110000100111011011100100001001111000
    0011011111011001110101100011111111100100100001000100110110101111
    0100011101011101010001001010101000011000000010101001101100011110
    1010111000011110100100110010111010011001100110100001110110100000

*SO_0* (byte stream):

5C F2 B4 36 E4 76 42 1E EC 9B 6B FC 4F 42 64 EB E2 75 45 AA 30 A0
    B2 71 75 F8 92 E9 32 B3 70 0B

SETUP OBJECT 1 (*SO_1*) (256 INTEGERS, BETWEEN 0 AND 3):

3, 0, 3, 2, 0, 3, 3, 2, 1, 3, 0, 2, 2, 0, 3, 0, 3, 3, 0, 3, 1, 0,
    3, 1, 2, 0, 2, 1, 1, 0, 3, 0, 1, 0, 0, 2, 0, 0, 1, 3, 2, 2, 0, 0,
    3, 1, 0, 1, 0, 2, 0, 3, 1, 3, 3, 1, 1, 0, 3, 0, 0, 3, 1, 1, 1, 1,
    1, 1, 0, 3, 1, 1, 0, 1, 2, 3, 0, 3, 2, 1, 2, 3, 3, 2, 2, 1, 1, 2,
    1, 2, 3, 2, 2, 0, 1, 3, 2, 3, 0, 1, 1, 2, 0, 0, 0, 1, 3, 3, 2, 2,
    0, 3, 1, 3, 0, 3, 2, 2, 2, 3, 2, 1, 3, 0, 2, 3, 3, 2, 2, 2, 2, 1,
    1, 1, 3, 3, 2, 1, 3, 1, 2, 3, 3, 2, 1, 1, 2, 3, 2, 3, 2, 1, 3, 3,
    2, 0, 2, 0, 2, 0, 0, 3, 1, 3, 0, 0, 1, 1, 1, 2, 0, 0, 3, 1, 1, 2,
    3, 2, 0, 2, 0, 1, 0, 2, 3, 3, 3, 2, 2, 3, 1, 0, 1, 1, 3, 0, 0, 2,
    3, 2, 2, 2, 0, 2, 3, 2, 1, 0, 3, 3, 1, 0, 2, 3, 2, 3, 1, 2, 2, 3,
    1, 2, 2, 2, 3, 3, 3, 1, 0, 2, 0, 0, 0, 1, 2, 0, 2, 1, 0, 0, 1, 0,
    2, 1, 0, 1, 2, 0, 0, 2, 2, 3, 0, 2, 3, 0

SETUP OBJECT 2 (*SO_2*) (128 BITS):

*SO_2* (bit stream):

0100001001110110001011110001001010010110000110101010000011110011
    1011110010111100100100111011011101110010010101111110010101010101

*SO_2* (byte stream):

**PROCESS OBJECT 0 (*PO_0*) (288 BITS):**

*PO_0* (bit stream):

1101010110001001111010100011111000101111010000101111000011011111 10
1000011100011000000100111010011100011111111011100100001100011011 10
1011011101001111111011011010100001001011001111001110110010110100 101
1101011101001010101111000111010000001101100010011001000000100010 010
001001111111111111100

*PO_0* (byte stream):

AB 91 57 7C F4 82 1E F6 0B 8F 81 5C 8E 7F 27 8C 5D BB FC 6D 85 34 CF
4D 4B D7 A5 7A 5C 60 23 13 88 44 FE 3F

**PROCESS OBJECT 1 (*PO_1*) (288 BITS):**

*PO_1* (bit stream):

1011111000110001000100001000100010101000110110101011000111000000 101
1011101110111101100010111000101000001001101100111001110010100011 010
1011101110101100001011001110100110101011010001100100011011001011 110
0000001101001000001001011110010010000100011010100111001100100110 001
11000010000011011011

*PO_1* (byte stream):

7D 8C 08 11 15 5B 8D 03 ED EE 8D 8E 82 6C CE 29 56 77 0D CD 65 B5 98
D8 F4 80 25 48 4F 42 AC 9C C9 38 04 DB

**PROCESS OBJECT 2 (*PO_2*) (288 BITS):**

*PO_2* (bit stream):

1011001110101010000010101000011011001100100010111011100100110000 0001
1011001011110100101011011011110110000100101000011101000110010001 01
0000101100110000011011001100100001011011100001011111110110011011 110
0111011110011000111111111111010111011110001011010101110001011 101
00100011100110110100

*PO_2* (byte stream):

**PROCESS OBJECT 3 (*PO_3*) (288 BITS):**

*PO_3* (bit stream):

1101110100101001010001001010011011001101110100010010010010101011
1101010001111101111110001110000010000101001000011100110100011000 10
1101000110111111000010110111010110010000111101101100001101011100 01
0011001100101110011011100111010110000110011111010010011111100011 000
0101010001100010001 1

*PO_3* (byte stream):

BB 94 22 65 B3 8B 48 A9 5E F1 FD 71 10 4A 38 8B D1 62 3F B4 6B C2 DB
60 1D 99 E9 EC 5C C3 7C C9 8F A1 62 C4

**PROCESS OBJECT 4 (*PO_4*) (288 BITS):**

*PO_4* (bit stream):

1100000100011100001100011010110000000101001001110011101100100111 101
1011001001001000111101110010001010100001010101100000000101100110 01
1110111101001001100110000001010101000111001101101101110011000111 000
1011001001110000001000000110001001011011001100011101000001001010 011
0110000100000010011 0

*PO_4* (byte stream):

83 38 8C 35 A0 E4 DC E4 6D 92 F0 4E 54 A8 06 68 E6 BD 64 06 AA 38 DB
CE 38 9A 1C 08 8C B4 19 17 A4 6C 08 64

**PROCESS OBJECT 5 (*PO_5*) (288 BITS):**

*PO_5* (bit stream):

1110010001000110111110101100110000001001111101011011010011011100 01
1001100000011101111001100111110011111101000100010111100001000001 10
0100110111110101100010010101110000010000110011011101100100101010 0
0100001100011010101001010101111000010110010001111110101100101000 11
1110000011111101000 0

*PO_5* (byte stream):

BINARY IV SETUP OBJECT (BIVSO) (256 BITS):

BIVSO (bit stream):

0011011011100001001101011010101001110110100000010110011110110001110
0001101001011000010111100010011100101101010111100100110000101000010
0000100101100101110000101100000011000101000001001111010101100110001
0100010110101001001010010111011101110000011001010001010

BIVSO (Byte stream):

6C 87 AC 55 6E 81 E6 8D C3 D2 A0 47 4E AB 27 43 11 A4 E9 D0 C0 28 C8
AB 19 45 2B 29 DD 1D 4C 51

IV OFFSET VECTOR $(p, q)$:

(2, −3)

PROCESS OBJECT PARAMETERS:

| XOR Block | Position | Source Object | Object Size $\lambda$ | Object Rate $\rho$ |
|---|---|---|---|---|
| A | Front | PO_0 | 269 | 1 |
| B | Front | PO_3 | 281 | 4 |
| C | Front | PO_5 | 257 | 6 |
| D | Back | PO_1 | 277 | 2 |
| E | Back | PO_2 | 271 | 3 |
| F | Back | PO_4 | 263 | 5 |

FIG. 28

MASK (128 BITS):

Mask (bit stream):

00101110100101110001101010111000111000001001101111000111010000010
01111111111101010100110000111001001011100100000000011101100010111

Mask (Byte stream):

DIRECTIONAL SETUP OBJECT (DSO):

DSO (bit stream):

00001100101011100001100011000110010100011110111100100101110001001
11101001001001011010011110111011000000010010111110000100010101
11001111100010110011010101011110000011110001000101011110010110111
00110110101111011001110100000011111101110111010100111100010111010

DSO (Byte stream):

| $i$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| DSO | 0 | 0 | 0 | 0 | 1 | 1 | 0 | 0 | 1 | 0 | 1 | 0 | 1 | 1 | 1 | 0 |
| $SO\_1$ | 3 | 0 | 3 | 2 | 0 | 3 | 3 | 2 | 1 | 3 | 0 | 2 | 2 | 0 | 3 | 0 |

| $i$ | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| DSO | 0 | 0 | 0 | 1 | 1 | 0 | 0 | 0 | 1 | 1 | 0 | 0 | 0 | 1 | 1 | 0 |
| $SO\_1$ | 3 | 3 | 0 | 3 | 1 | 0 | 3 | 1 | 2 | 0 | 2 | 1 | 1 | 0 | 3 | 0 |

| $i$ | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|
| DSO | 0 | 1 | 0 | 1 | 0 | 0 | 0 | 1 | 1 | 1 | 1 | 0 | 1 | 1 | 1 | 1 |
| $SO\_1$ | 1 | 0 | 0 | 2 | 0 | 0 | 1 | 3 | 2 | 2 | 0 | 0 | 3 | 1 | 0 | 1 |

| $i$ | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|
| DSO | 0 | 0 | 1 | 0 | 0 | 1 | 0 | 1 | 1 | 1 | 0 | 0 | 1 | 0 | 0 | 1 |
| $SO\_1$ | 0 | 2 | 0 | 3 | 1 | 3 | 3 | 1 | 1 | 0 | 3 | 0 | 0 | 3 | 1 | 1 |

| $i$ | 64 | 65 | 66 | 67 | 68 | 69 | 70 | 71 | 72 | 73 | 74 | 75 | 76 | 77 | 78 | 79 |
|---|---|---|---|---|---|---|---|---|---|---|---|---|---|---|---|---|
| DSO | 1 | 1 | 1 | 1 | 0 | 1 | 0 | 0 | 1 | 0 | 0 | 1 | 0 | 0 | 1 | 0 |
| $SO\_1$ | 1 | 1 | 1 | 1 | 0 | 3 | 1 | 1 | 0 | 1 | 2 | 3 | 0 | 3 | 2 | 1 |

| $i$ | 80 | 81 | 82 | 83 | 84 | 85 | 86 | 87 | 88 | 89 | 90 | 91 | 92 | 93 | 94 | 95 |
|---|---|---|---|---|---|---|---|---|---|---|---|---|---|---|---|---|
| DSO | 1 | 1 | 0 | 1 | 0 | 0 | 1 | 1 | 1 | 1 | 0 | 1 | 1 | 1 | 0 | 1 |
| $SO\_1$ | 2 | 3 | 3 | 2 | 2 | 1 | 1 | 2 | 1 | 2 | 3 | 2 | 2 | 0 | 1 | 3 |

| $i$ | 96 | 97 | 98 | 99 | 100 | 101 | 102 | 103 | 104 | 105 | 106 | 107 | 108 | 109 | 110 | 111 |
|---|---|---|---|---|---|---|---|---|---|---|---|---|---|---|---|---|
| DSO | 1 | 0 | 0 | 0 | 0 | 0 | 0 | 0 | 1 | 0 | 0 | 1 | 0 | 1 | 1 | 1 |
| $SO\_1$ | 2 | 3 | 0 | 1 | 1 | 2 | 0 | 0 | 0 | 1 | 3 | 3 | 2 | 2 | 0 | 3 |

| $i$ | 112 | 113 | 114 | 115 | 116 | 117 | 118 | 119 | 120 | 121 | 122 | 123 | 124 | 125 | 126 | 127 |
|---|---|---|---|---|---|---|---|---|---|---|---|---|---|---|---|---|
| DSO | 1 | 1 | 0 | 0 | 0 | 0 | 1 | 0 | 0 | 0 | 0 | 1 | 0 | 1 | 0 | 1 |
| $SO\_1$ | 1 | 3 | 0 | 3 | 2 | 2 | 2 | 3 | 2 | 1 | 3 | 0 | 2 | 3 | 3 | 2 |

| $i$ | 128 | 129 | 130 | 131 | 132 | 133 | 134 | 135 | 136 | 137 | 138 | 139 | 140 | 141 | 142 | 143 |
|---|---|---|---|---|---|---|---|---|---|---|---|---|---|---|---|---|
| DSO | 1 | 1 | 0 | 0 | 1 | 1 | 1 | 1 | 1 | 0 | 0 | 0 | 1 | 0 | 1 | 1 |
| $SO\_1$ | 2 | 2 | 2 | 1 | 1 | 1 | 3 | 3 | 2 | 1 | 3 | 1 | 2 | 3 | 3 | 2 |

| $i$ | 144 | 145 | 146 | 147 | 148 | 149 | 150 | 151 | 152 | 153 | 154 | 155 | 156 | 157 | 158 | 159 |
|---|---|---|---|---|---|---|---|---|---|---|---|---|---|---|---|---|
| DSO | 0 | 0 | 1 | 1 | 0 | 1 | 0 | 1 | 0 | 1 | 0 | 1 | 1 | 1 | 1 | 0 |
| $SO\_1$ | 1 | 1 | 2 | 3 | 2 | 3 | 2 | 1 | 3 | 3 | 2 | 0 | 2 | 0 | 2 | 0 |

FIG. 31A

| $i$ | 160 | 161 | 162 | 163 | 164 | 165 | 166 | 167 | 168 | 169 | 170 | 171 | 172 | 173 | 174 | 175 |
|---|---|---|---|---|---|---|---|---|---|---|---|---|---|---|---|---|
| DSO | 0 | 0 | 0 | 0 | 1 | 1 | 1 | 1 | 0 | 0 | 0 | 1 | 0 | 0 | 0 | 1 |
| $SO\_1$ | 0 | 3 | 1 | 3 | 0 | 0 | 1 | 1 | 1 | 2 | 0 | 0 | 3 | 1 | 1 | 2 |

| $i$ | 176 | 177 | 178 | 179 | 180 | 181 | 182 | 183 | 184 | 185 | 186 | 187 | 188 | 189 | 190 | 191 |
|---|---|---|---|---|---|---|---|---|---|---|---|---|---|---|---|---|
| DSO | 0 | 1 | 0 | 1 | 1 | 1 | 1 | 0 | 0 | 1 | 0 | 1 | 1 | 0 | 1 | 1 |
| $SO\_1$ | 3 | 2 | 0 | 2 | 0 | 1 | 0 | 2 | 3 | 3 | 3 | 2 | 2 | 3 | 1 | 0 |

| $i$ | 192 | 193 | 194 | 195 | 196 | 197 | 198 | 199 | 200 | 201 | 202 | 203 | 204 | 205 | 206 | 207 |
|---|---|---|---|---|---|---|---|---|---|---|---|---|---|---|---|---|
| DSO | 0 | 0 | 1 | 1 | 0 | 1 | 1 | 0 | 1 | 0 | 1 | 1 | 1 | 1 | 0 | 1 |
| $SO\_1$ | 1 | 1 | 3 | 0 | 0 | 2 | 3 | 2 | 2 | 2 | 0 | 2 | 3 | 2 | 1 | 0 |

| $i$ | 208 | 209 | 210 | 211 | 212 | 213 | 214 | 215 | 216 | 217 | 218 | 219 | 220 | 221 | 222 | 223 |
|---|---|---|---|---|---|---|---|---|---|---|---|---|---|---|---|---|
| DSO | 1 | 0 | 0 | 1 | 1 | 1 | 0 | 1 | 0 | 0 | 0 | 0 | 0 | 0 | 1 | 1 |
| $SO\_1$ | 3 | 3 | 1 | 0 | 2 | 3 | 2 | 3 | 1 | 2 | 2 | 3 | 1 | 2 | 2 | 2 |

| $i$ | 224 | 225 | 226 | 227 | 228 | 229 | 230 | 231 | 232 | 233 | 234 | 235 | 236 | 237 | 238 | 239 |
|---|---|---|---|---|---|---|---|---|---|---|---|---|---|---|---|---|
| DSO | 1 | 1 | 1 | 1 | 0 | 1 | 1 | 1 | 0 | 1 | 1 | 1 | 0 | 1 | 0 | 1 |
| $SO\_1$ | 3 | 3 | 3 | 1 | 0 | 2 | 0 | 0 | 0 | 1 | 2 | 0 | 2 | 1 | 0 | 0 |

| $i$ | 240 | 241 | 242 | 243 | 244 | 245 | 246 | 247 | 248 | 249 | 250 | 251 | 252 | 253 | 254 | 255 |
|---|---|---|---|---|---|---|---|---|---|---|---|---|---|---|---|---|
| DSO | 0 | 0 | 1 | 1 | 1 | 1 | 0 | 0 | 0 | 1 | 0 | 1 | 1 | 0 | 1 | 0 |
| $SO\_1$ | 1 | 0 | 2 | 1 | 0 | 1 | 2 | 0 | 0 | 2 | 2 | 3 | 0 | 2 | 3 | 0 |

FIG. 31B

| Sub-Screen | $i_B$ | $i_R$ | $\Delta x$ | $\Delta y$ | $(\Delta x, \Delta y)$ |
|---|---|---|---|---|---|
| 1 | 0 | 0 | 3 | 0 | (3,0) |
| 1 | 1 | 1 | 3 | 2 | (3,2) |
| 1 | 2 | 2 | 0 | -3 | (0,-3) |
| 1 | 3 | 3 | 3 | 2 | (3,2) |
| 1 | 4 | 4 | -1 | 3 | (-1,3) |
| 1 | 5 | 5 | 0 | 2 | (0,2) |
| 1 | 6 | 6 | -2 | 0 | (-2,0) |
| 1 | 7 | 7 | -3 | 0 | (-3,0) |
| 1 | 8 | 8 | 3 | 3 | (3,3) |
| 1 | 9 | 9 | 0 | -3 | (0,-3) |
| 1 | 10 | 10 | -1 | 0 | (-1,0) |
| 1 | 11 | 11 | 3 | 1 | (3,1) |
| 1 | 12 | 12 | -2 | 0 | (-2,0) |
| 1 | 13 | 13 | 2 | 1 | (2,1) |
| 1 | 14 | 14 | 1 | 0 | (1,0) |
| 1 | 15 | 15 | -3 | 0 | (-3,0) |
| 2 | 16 | 0 | 1 | 0 | (1,0) |
| 2 | 17 | 1 | 0 | -2 | (0,-2) |
| 2 | 18 | 2 | 0 | 0 | (0,0) |
| 2 | 19 | 3 | 1 | -3 | (1,-3) |
| 2 | 20 | 4 | -2 | -2 | (-2,-2) |
| 2 | 21 | 5 | 0 | 0 | (0,0) |
| 2 | 22 | 6 | -3 | -1 | (-3,-1) |
| 2 | 23 | 7 | 0 | -1 | (0,-1) |
| 2 | 24 | 8 | 0 | 2 | (0,2) |
| 2 | 25 | 9 | 0 | 3 | (0,3) |
| 2 | 26 | 10 | 1 | -3 | (1,-3) |
| 2 | 27 | 11 | 3 | -1 | (3,-1) |
| 2 | 28 | 12 | -1 | 0 | (-1,0) |
| 2 | 29 | 13 | 3 | 0 | (3,0) |
| 2 | 30 | 14 | 0 | 3 | (0,3) |
| 2 | 31 | 15 | 1 | -1 | (1,-1) |
| 3 | 32 | 0 | -1 | -1 | (-1,-1) |
| 3 | 33 | 1 | -1 | -1 | (-1,-1) |
| 3 | 34 | 2 | 0 | -3 | (0,-3) |
| 3 | 35 | 3 | 1 | 1 | (1,1) |
| 3 | 36 | 4 | 0 | 1 | (0,1) |
| 3 | 37 | 5 | 2 | -3 | (2,-3) |
| 3 | 38 | 6 | 0 | 3 | (0,3) |
| 3 | 39 | 7 | -2 | 1 | (-2,1) |
| 3 | 40 | 8 | -2 | -3 | (-2,-3) |
| 3 | 41 | 9 | 3 | -2 | (3,-2) |
| 3 | 42 | 10 | 2 | 1 | (2,1) |
| 3 | 43 | 11 | -1 | -2 | (-1,-2) |
| 3 | 44 | 12 | -1 | -2 | (-1,-2) |
| 3 | 45 | 13 | 3 | -2 | (3,-2) |
| 3 | 46 | 14 | -2 | 0 | (-2,0) |
| 3 | 47 | 15 | 1 | -3 | (1,-3) |
| 4 | 48 | 0 | -2 | 3 | (-2,3) |
| 4 | 49 | 1 | 0 | 1 | (0,1) |
| 4 | 50 | 2 | 1 | 2 | (1,2) |
| 4 | 51 | 3 | 0 | 0 | (0,0) |
| 4 | 52 | 4 | 0 | 1 | (0,1) |
| 4 | 53 | 5 | 3 | -3 | (3,-3) |
| 4 | 54 | 6 | 2 | -2 | (2,-2) |
| 4 | 55 | 7 | 0 | -3 | (0,-3) |
| 4 | 56 | 8 | -1 | -3 | (-1,-3) |
| 4 | 57 | 9 | 0 | 3 | (0,3) |
| 4 | 58 | 10 | 2 | 2 | (2,2) |
| 4 | 59 | 11 | -2 | 3 | (-2,3) |
| 4 | 60 | 12 | 2 | 1 | (2,1) |
| 4 | 61 | 13 | 3 | 0 | (3,0) |
| 4 | 62 | 14 | 2 | -3 | (2,-3) |
| 4 | 63 | 15 | 3 | -2 | (3,-2) |
| 5 | 64 | 0 | -2 | -2 | (-2,-2) |
| 5 | 65 | 1 | 2 | 1 | (2,1) |
| 5 | 66 | 2 | -1 | -1 | (-1,-1) |
| 5 | 67 | 3 | -3 | -3 | (-3,-3) |
| 5 | 68 | 4 | -2 | 1 | (-2,1) |
| 5 | 69 | 5 | 3 | 1 | (3,1) |

FIG. 32A

| Sub-Screen | $i_B$ | $i_R$ | $\Delta x$ | $\Delta y$ | $(\Delta x, \Delta y)$ |
|---|---|---|---|---|---|
| 5 | 70 | 6 | -2 | 3 | (-2,3) |
| 5 | 71 | 7 | -3 | -2 | (-3,-2) |
| 5 | 72 | 8 | 1 | 1 | (1,1) |
| 5 | 73 | 9 | -2 | -3 | (-2,-3) |
| 5 | 74 | 10 | 2 | -3 | (2,-3) |
| 5 | 75 | 11 | 2 | -1 | (2,-1) |
| 5 | 76 | 12 | 3 | -3 | (3,-3) |
| 5 | 77 | 13 | 2 | 0 | (2,0) |
| 5 | 78 | 14 | -2 | 0 | (-2,0) |
| 5 | 79 | 15 | -2 | 0 | (-2,0) |
| 6 | 80 | 0 | 0 | 3 | (0,3) |
| 6 | 81 | 1 | 1 | 3 | (1,3) |
| 6 | 82 | 2 | 0 | 0 | (0,0) |
| 6 | 83 | 3 | -1 | -1 | (-1,-1) |
| 6 | 84 | 4 | 1 | 2 | (1,2) |
| 6 | 85 | 5 | 0 | 0 | (0,0) |
| 6 | 86 | 6 | 3 | 1 | (3,1) |
| 6 | 87 | 7 | 1 | -2 | (1,-2) |
| 6 | 88 | 8 | 3 | -2 | (3,-2) |
| 6 | 89 | 9 | 0 | -2 | (0,-2) |
| 6 | 90 | 10 | 0 | -1 | (0,-1) |
| 6 | 91 | 11 | 0 | 2 | (0,2) |
| 6 | 92 | 12 | 3 | -3 | (3,-3) |
| 6 | 93 | 13 | 3 | -2 | (3,-2) |
| 6 | 94 | 14 | -2 | 3 | (-2,3) |
| 6 | 95 | 15 | -1 | 0 | (-1,0) |
| 7 | 96 | 0 | 1 | 1 | (1,1) |
| 7 | 97 | 1 | -3 | 0 | (-3,0) |
| 7 | 98 | 2 | 0 | -2 | (0,-2) |
| 7 | 99 | 3 | -3 | 2 | (-3,2) |
| 7 | 100 | 4 | -2 | 2 | (-2,2) |
| 7 | 101 | 5 | 0 | -2 | (0,-2) |
| 7 | 102 | 6 | -3 | -2 | (-3,-2) |
| 7 | 103 | 7 | 1 | 0 | (1,0) |
| 7 | 104 | 8 | -3 | 3 | (-3,3) |
| 7 | 105 | 9 | 1 | 0 | (1,0) |
| 7 | 106 | 10 | -2 | -3 | (-2,-3) |
| 7 | 107 | 11 | 2 | -3 | (2,-3) |
| 7 | 108 | 12 | 1 | 2 | (1,2) |
| 7 | 109 | 13 | 2 | 3 | (2,3) |
| 7 | 110 | 14 | 1 | 2 | (1,2) |
| 7 | 111 | 15 | -2 | -2 | (-2,-2) |
| 8 | 112 | 0 | -3 | -3 | (-3,-3) |
| 8 | 113 | 1 | -3 | -1 | (-3,-1) |
| 8 | 114 | 2 | 0 | -2 | (0,-2) |
| 8 | 115 | 3 | 0 | 0 | (0,0) |
| 8 | 116 | 4 | 0 | -1 | (0,-1) |
| 8 | 117 | 5 | -2 | 0 | (-2,0) |
| 8 | 118 | 6 | 2 | -1 | (2,-1) |
| 8 | 119 | 7 | 0 | 0 | (0,0) |
| 8 | 120 | 8 | 1 | 0 | (1,0) |
| 8 | 121 | 9 | -2 | -1 | (-2,-1) |
| 8 | 122 | 10 | 0 | -1 | (0,-1) |
| 8 | 123 | 11 | 2 | 0 | (2,0) |
| 8 | 124 | 12 | 0 | -2 | (0,-2) |
| 8 | 125 | 13 | 2 | -3 | (2,-3) |
| 8 | 126 | 14 | 0 | 2 | (0,2) |
| 8 | 127 | 15 | -3 | 0 | (-3,0) |

FIG. 32B

Mask (Sub-Screen 1)

|   | A | B | C | D |
|---|---|---|---|---|
| 1 | 0 | 1 | 1 | 1 |
| 2 | 0 | 1 | 0 | 0 |
| 3 | 1 | 0 | 0 | 1 |
| 4 | 0 | 1 | 1 | 1 |

Mask (Sub-Screen 2)

|   | A | B | C | D |
|---|---|---|---|---|
| 1 | 0 | 0 | 0 | 1 |
| 2 | 1 | 0 | 1 | 0 |
| 3 | 1 | 0 | 1 | 1 |
| 4 | 1 | 0 | 0 | 0 |

Mask (Sub-Screen 3)

|   | A | B | C | D |
|---|---|---|---|---|
| 1 | 1 | 1 | 1 | 0 |
| 2 | 0 | 0 | 0 | 0 |
| 3 | 1 | 0 | 0 | 1 |
| 4 | 1 | 0 | 1 | 1 |

Mask (Sub-Screen 4)

|   | A | B | C | D |
|---|---|---|---|---|
| 1 | 1 | 1 | 0 | 0 |
| 2 | 0 | 1 | 1 | 1 |
| 3 | 0 | 1 | 0 | 0 |
| 4 | 0 | 0 | 1 | 0 |

Mask (Sub-Screen 5)

|   | A | B | C | D |
|---|---|---|---|---|
| 1 | 0 | 1 | 1 | 1 |
| 2 | 1 | 1 | 1 | 1 |
| 3 | 1 | 1 | 1 | 1 |
| 4 | 0 | 1 | 0 | 1 |

Mask (Sub-Screen 6)

|   | A | B | C | D |
|---|---|---|---|---|
| 1 | 0 | 1 | 0 | 0 |
| 2 | 1 | 1 | 0 | 0 |
| 3 | 0 | 0 | 1 | 1 |
| 4 | 1 | 0 | 0 | 1 |

Mask (Sub-Screen 7)

|   | A | B | C | D |
|---|---|---|---|---|
| 1 | 0 | 0 | 1 | 0 |
| 2 | 1 | 1 | 1 | 0 |
| 3 | 0 | 1 | 0 | 0 |
| 4 | 0 | 0 | 0 | 0 |

Mask (Sub-Screen 8)

|   | A | B | C | D |
|---|---|---|---|---|
| 1 | 0 | 0 | 0 | 1 |
| 2 | 1 | 1 | 0 | 1 |
| 3 | 1 | 0 | 0 | 1 |
| 4 | 0 | 1 | 1 | 1 |

FIG. 33

Before Instruction 15

| | A | B | C | D |
|---|---|---|---|---|
| 1 | 11 | x | 7 | 6 |
| 2 | 3 | 9 | 1 | 4 |
| 3 | 10 | 2 | 8 | 12 |
| 4 | 5 | 13 | 0 | 14 |

Instruction 15

| | 0 | 1 | 2 | 3 |
|---|---|---|---|---|
| 0 | 0 | 1 | 2 | 3 |
| -1 | 4 | 5 | 6 | 7 |
| -2 | 8 | 9 | 10 | 11 |
| -3 | 12 | 13 | 14 | |

| i | |
|---|---|
| 15 | |
| D4 | |

| x | 3 | -3 | y |
|---|---|---|---|
| Δx | -3 | 0 | Δy |
| p | 2 | -3 | q |
| x+Δx+p | 2 | -6 | y+Δy+q |
| x' | 2 | -2 | y' |

| i' | Contents |
|---|---|
| 10 | 8 |
| C3 | |

Sub-Screen 1

| | A | B | C | D |
|---|---|---|---|---|
| 1 | 11 | 15 | 7 | 6 |
| 2 | 3 | 9 | 1 | 4 |
| 3 | 10 | 2 | 8 | 12 |
| 4 | 5 | 13 | 0 | 14 |

| final |
|---|
| 1 |
| B1 |

FIG. 34D

Sub-Screen 1

| | A | B | C | D |
|---|---|---|---|---|
| 1 | 11 | 15 | 7 | 6 |
| 2 | 3 | 9 | 1 | 4 |
| 3 | 10 | 2 | 8 | 12 |
| 4 | 5 | 13 | 0 | 14 |

Sub-Screen 2

| | A | B | C | D |
|---|---|---|---|---|
| 1 | 13 | 10 | 14 | 15 |
| 2 | 5 | 6 | 7 | 1 |
| 3 | 11 | 4 | 12 | 3 |
| 4 | 9 | 2 | 8 | 0 |

Sub-Screen 3

| | A | B | C | D |
|---|---|---|---|---|
| 1 | 4 | 7 | 0 | 1 |
| 2 | 6 | 8 | 10 | 12 |
| 3 | 13 | 2 | 3 | 14 |
| 4 | 15 | 5 | 9 | 11 |

Sub-Screen 4

| | A | B | C | D |
|---|---|---|---|---|
| 1 | 4 | 0 | 8 | 10 |
| 2 | 11 | 12 | 2 | 13 |
| 3 | 14 | 15 | 6 | 1 |
| 4 | 9 | 3 | 5 | 7 |

Sub-Screen 5

| | A | B | C | D |
|---|---|---|---|---|
| 1 | 14 | 15 | 9 | 8 |
| 2 | 2 | 0 | 10 | 6 |
| 3 | 12 | 13 | 1 | 3 |
| 4 | 4 | 7 | 5 | 11 |

Sub-Screen 6

| | A | B | C | D |
|---|---|---|---|---|
| 1 | 1 | 3 | 0 | 5 |
| 2 | 6 | 11 | 12 | 13 |
| 3 | 10 | 14 | 15 | 7 |
| 4 | 4 | 2 | 8 | 9 |

Sub-Screen 7

| | A | B | C | D |
|---|---|---|---|---|
| 1 | 15 | 14 | 10 | 7 |
| 2 | 9 | 2 | 11 | 3 |
| 3 | 4 | 12 | 6 | 0 |
| 4 | 1 | 5 | 8 | 13 |

Sub-Screen 8

| | A | B | C | D |
|---|---|---|---|---|
| 1 | 1 | 5 | 7 | 12 |
| 2 | 14 | 2 | 4 | 6 |
| 3 | 8 | 9 | 10 | 11 |
| 4 | 0 | 13 | 3 | 15 |

FIG. 35

Screen

| | | A | B | C | D | E | F | G | H | I | J | K | L | M | N | O | P |
|---|---|---|---|---|---|---|---|---|---|---|---|---|---|---|---|---|---|
| from Sub-Screen 1 --> | 1 | 11 | 15 | 7 | 6 | 3 | 9 | 1 | 4 | 10 | 2 | 8 | 12 | 5 | 13 | 0 | 14 |
| from Sub-Screen 2 --> | 2 | 29 | 26 | 30 | 31 | 21 | 22 | 23 | 17 | 27 | 20 | 28 | 19 | 25 | 18 | 24 | 16 |
| from Sub-Screen 3 --> | 3 | 36 | 39 | 32 | 33 | 38 | 40 | 42 | 44 | 45 | 34 | 35 | 46 | 47 | 37 | 41 | 43 |
| from Sub-Screen 4 --> | 4 | 52 | 48 | 56 | 58 | 59 | 60 | 50 | 61 | 62 | 63 | 54 | 49 | 57 | 51 | 53 | 55 |
| from Sub-Screen 5 --> | 5 | 78 | 79 | 73 | 72 | 66 | 64 | 74 | 70 | 76 | 77 | 65 | 67 | 68 | 71 | 69 | 75 |
| from Sub-Screen 6 --> | 6 | 81 | 83 | 80 | 85 | 86 | 91 | 92 | 93 | 90 | 94 | 95 | 87 | 84 | 82 | 88 | 89 |
| from Sub-Screen 7 --> | 7 | 111 | 110 | 106 | 103 | 105 | 98 | 107 | 99 | 100 | 108 | 102 | 96 | 97 | 101 | 104 | 109 |
| from Sub-Screen 8 --> | 8 | 113 | 117 | 119 | 124 | 126 | 114 | 116 | 118 | 120 | 121 | 122 | 123 | 112 | 125 | 115 | 127 |

FIG. 36

Screen

| | A | B | C | D | E | F | G | H | I | J | K | L | M | N | O | P |
|---|---|---|---|---|---|---|---|---|---|---|---|---|---|---|---|---|
| 1 | 11 | 15 | 7 | 6 | 3 | 9 | 1 | 4 | 10 | 2 | 8 | 12 | 5 | 13 | 0 | 14 |
| 2 | 29 | 26 | 30 | 31 | 21 | 22 | 23 | 17 | 27 | 20 | 28 | 19 | 25 | 18 | 24 | 16 |
| 3 | 36 | 39 | 32 | 33 | 38 | 40 | 42 | 44 | 45 | 34 | 35 | 46 | 47 | 37 | 41 | 43 |
| 4 | 52 | 48 | 56 | 58 | 59 | 60 | 50 | 61 | 62 | 63 | 54 | 49 | 57 | 51 | 53 | 55 |
| 5 | 78 | 79 | 73 | 72 | 66 | 64 | 74 | 70 | 76 | 77 | 65 | 67 | 68 | 71 | 69 | 75 |
| 6 | 81 | 83 | 80 | 85 | 86 | 91 | 92 | 93 | 90 | 94 | 95 | 87 | 84 | 82 | 88 | 89 |
| 7 | 111 | 110 | 106 | 103 | 105 | 98 | 107 | 99 | 100 | 108 | 102 | 96 | 97 | 101 | 104 | 109 |
| 8 | 113 | 117 | 119 | 124 | 126 | 114 | 116 | 118 | 120 | 121 | 122 | 123 | 112 | 125 | 115 | 127 |

| | A | B | C | D | E | F | G | H | I | J | K | L | M | N | O | P |
|---|---|---|---|---|---|---|---|---|---|---|---|---|---|---|---|---|
| 1 | L1 | P1 | H1 | G1 | D1 | J1 | B1 | E1 | K1 | C1 | I1 | M1 | F1 | N1 | A1 | O1 |
| 2 | N2 | K2 | O2 | P2 | F2 | G2 | H2 | B2 | L2 | E2 | M2 | D2 | J2 | C2 | I2 | A2 |
| 3 | E3 | H3 | A3 | B3 | G3 | I3 | K3 | M3 | N3 | C3 | D3 | O3 | P3 | F3 | J3 | L3 |
| 4 | E4 | A4 | I4 | K4 | L4 | M4 | C4 | N4 | O4 | P4 | G4 | B4 | J4 | D4 | F4 | H4 |
| 5 | O5 | P5 | J5 | I5 | C5 | A5 | K5 | G5 | M5 | N5 | B5 | D5 | E5 | H5 | F5 | L5 |
| 6 | B6 | D6 | A6 | F6 | G6 | L6 | M6 | N6 | K6 | O6 | P6 | H6 | E6 | C6 | I6 | J6 |
| 7 | P7 | O7 | K7 | H7 | J7 | C7 | L7 | D7 | E7 | M7 | G7 | A7 | B7 | F7 | I7 | N7 |
| 8 | B8 | F8 | H8 | M8 | O8 | C8 | E8 | G8 | I8 | J8 | K8 | L8 | A8 | N8 | D8 | P8 |

FIG. 37

Inverse Screen

| | A | B | C | D | E | F | G | H | I | J | K | L | M | N | O | P |
|---|---|---|---|---|---|---|---|---|---|---|---|---|---|---|---|---|
| 1 | 14 | 6 | 9 | 4 | 7 | 12 | 3 | 2 | 10 | 5 | 8 | 0 | 11 | 13 | 15 | 1 |
| 2 | 31 | 23 | 29 | 27 | 25 | 20 | 21 | 22 | 30 | 28 | 17 | 24 | 26 | 16 | 18 | 19 |
| 3 | 34 | 35 | 41 | 42 | 32 | 45 | 36 | 33 | 37 | 46 | 38 | 47 | 39 | 40 | 43 | 44 |
| 4 | 49 | 59 | 54 | 61 | 48 | 62 | 58 | 63 | 50 | 60 | 51 | 52 | 53 | 55 | 56 | 57 |
| 5 | 69 | 74 | 68 | 75 | 76 | 78 | 71 | 77 | 67 | 66 | 70 | 79 | 72 | 73 | 64 | 65 |
| 6 | 82 | 80 | 93 | 81 | 92 | 83 | 84 | 91 | 94 | 95 | 88 | 85 | 86 | 87 | 89 | 90 |
| 7 | 107 | 108 | 101 | 103 | 104 | 109 | 106 | 99 | 110 | 100 | 98 | 102 | 105 | 111 | 97 | 96 |
| 8 | 124 | 112 | 117 | 126 | 118 | 113 | 119 | 114 | 120 | 121 | 122 | 123 | 115 | 125 | 116 | 127 |

| | A | B | C | D | E | F | G | H | I | J | K | L | M | N | O | P |
|---|---|---|---|---|---|---|---|---|---|---|---|---|---|---|---|---|
| 1 | O1 | G1 | J1 | E1 | H1 | M1 | D1 | C1 | K1 | F1 | I1 | A1 | L1 | N1 | P1 | B1 |
| 2 | P2 | H2 | N2 | L2 | J2 | E2 | F2 | G2 | O2 | M2 | B2 | I2 | K2 | A2 | C2 | D2 |
| 3 | C3 | D3 | J3 | K3 | A3 | N3 | E3 | B3 | F3 | O3 | G3 | P3 | H3 | I3 | L3 | M3 |
| 4 | B4 | L4 | G4 | N4 | A4 | O4 | K4 | P4 | C4 | M4 | D4 | E4 | F4 | H4 | I4 | J4 |
| 5 | F5 | K5 | E5 | L5 | M5 | O5 | H5 | N5 | D5 | C5 | G5 | P5 | I5 | J5 | A5 | B5 |
| 6 | C6 | A6 | N6 | B6 | M6 | D6 | E6 | L6 | O6 | P6 | I6 | F6 | G6 | H6 | J6 | K6 |
| 7 | L7 | M7 | F7 | H7 | I7 | N7 | K7 | D7 | O7 | E7 | C7 | G7 | J7 | P7 | B7 | A7 |
| 8 | M8 | A8 | F8 | O8 | G8 | B8 | H8 | C8 | I8 | J8 | K8 | L8 | D8 | N8 | E8 | P8 |

FIG. 38

| Input Block (p) | XOR Block | Start Bit (i) | XOR Block Contents (bit stream, 128 bits) | XOR Block Contents (Byte stream, 16 Bytes) |
|---|---|---|---|---|
| 0 | A PO_0 size 269 rate 1 | 0 | 11010101100010011110101000111110 00101111010000101111000011011111 11010000111100011000000100111010 01110001111111101110010000110001 | AB 91 57 7C F4 82 1E F6 0B 8F 81 5C 8E 7F 27 8C |
| | B PO_3 size 281 rate 4 | 0 | 10111010010100101000100101001100 11001101110001000100101001010101 01111010100011111011111110001110 00001000010100100001110011010001 | BB 94 22 65 B3 8B 48 A9 5E F1 FD 71 10 4A 38 8B |
| | C PO_5 size 257 rate 6 | 0 | 11100010001001101111101011001100 00001001111101101101010011011100 00110011000000011101111001100111 11001111110100010001011110000100 | 27 62 5F 33 90 AF 2D 3B CC 80 7B E6 F3 8B E8 21 |
| | D PO_1 size 277 rate 2 | 0 | 10111110001100010001000010001000 10100011011010101100111000000 10110111011101111011000101110001 01000001001101100111001110010100 | 7D 8C 08 11 15 5B 8D 03 ED EE 8D 8E 82 6C CE 29 |
| | E PO_2 size 271 rate 3 | 0 | 10110011010101000010101010000110 11001100010011101100100110000 00110110010111101001010110110111 10110000100101000011101000110001 | CD 55 50 61 33 D1 4D 06 6C 7A A9 ED 0D 29 B8 98 |
| | F PO_4 size 263 rate 5 | 0 | 11000001000111000011000110101100 00000101001001110011101100100111 10110110010010000111101110010 00101010000101011000000010110 | 83 38 8C 35 A0 E4 DC E4 6D 92 F0 4E 54 A8 06 68 |
| 1 | A PO_0 size 269 rate 1 | 1 | 10101011000100111101010001111100 01011110100000101111000110111111 10100001111000110000010011101000 11100011111111011100100001100011 | D5 C8 2B 3E 7A 41 0F FB 85 C7 40 2E C7 BF 13 C6 |
| | B PO_3 size 281 rate 4 | 4 | 11010010100101000100101001101100 11011100010001001010010101011 10101000111110111111100011100000 10000101001000011100110100011000 | 4B 29 52 36 BB 88 94 EA 15 DF 1F 07 A1 84 B3 18 |
| | C PO_5 size 257 rate 6 | 6 | 00010001101111101011001100000010 01111010110100110111000011 11000000011101110011001111100 11110100010001011110000100000110 | 88 7D CD 40 BE B6 EC 30 03 EE 99 CF 2F A2 87 60 |
| | D PO_1 size 277 rate 2 | 2 | 11111000110001000100001000100010 10100011011010101100111000000 10 11011101110111101110001011100010 000010011011001110011001010001 | B7 F2 28 05 3A B1 FE 19 4D 93 AE 50 B3 33 D4 24 |
| | E PO_2 size 271 rate 3 | 3 | 10011101010100001010100001101100 11001000101110110010011000000 10110010111101001010110110111101 10001001010000111010001100100 | B9 0A 2A 6C 26 BA C9 80 4D 2F B5 BD 21 05 17 13 |
| | F PO_4 size 263 rate 5 | 5 | 00100011000011000110101100000000 10100100111001101100100111101100 11001001001000011110111001000101 01000010101011000000010110011000 | C4 61 AC 01 25 E7 26 6F 93 84 77 A2 42 35 40 33 |

FIG. 39A

| Input Block (p) | XOR Block | Start Bit (i) | XOR Block Contents (bit stream, 128 bits) | XOR Block Contents (Byte stream, 16 Bytes) |
|---|---|---|---|---|
| 2 | A<br>PO_0<br>size 269<br>rate 1 | 2 | 01010110001001111010100011111000<br>10111101000010111100001101111111<br>01000011100011000000100111010 01<br>11000111111110111001000011000110 | 6A E4 15 1F BD A0<br>87 FD C2 63 20 97<br>E3 DF 09 63 |
|  | B<br>PO_3<br>size 281<br>rate 4 | 8 | 00101001010001001010011011001101<br>10100010001001010010101011110 10<br>10001111011111110001110000010 00<br>01010010000111001101000110001011 | 94 22 65 B3 8B 48<br>A9 5E F1 FD 71 10<br>4A 38 8B D1 |
|  | C<br>PO_5<br>size 257<br>rate 6 | 12 | 01101111101011001100000010011111<br>01011011010011011100001100110000<br>00011101111001100111110011111101<br>00010001011110000100000110010011 | F6 35 03 F9 DA B2<br>C3 0C B8 67 3E BF<br>88 1E 82 C9 |
|  | D<br>PO_1<br>size 277<br>rate 2 | 4 | 11100011000100010000100010001010<br>10001101101010110001110000001011<br>01110111011110110001011100010100<br>00010011011001110011001010 00110 | C7 88 10 51 B1 D5<br>38 D0 EE DE E8 28<br>C8 E6 9C 62 |
|  | E<br>PO_2<br>size 271<br>rate 3 | 6 | 11101010100000101010001101100011<br>00010001011101100100110000000110 1<br>10010111101001010110110111101100<br>00100101000001110100011001000101 | 57 41 85 CD 44 37<br>19 B0 E9 A5 B6 37<br>A4 E0 62 A2 |
|  | F<br>PO_4<br>size 263<br>rate 5 | 10 | 01110000110001101011000000010100<br>10011100110110010011110110110 01<br>00100100001111011100100010101000<br>01010101100000000101100110011110 | 0E 63 0D 28 39 37<br>79 9B 24 BC 13 15<br>AA 01 9A 79 |

DATA ENCRYPTION AND DECRYPTION USING OBJECT-BASED SCREENS AND LOGIC BLOCKS

CROSS-REFERENCE TO RELATED APPLICATIONS

This application claims priority to and is a continuation-in-part of U.S. patent application Ser. No. 17/156,775, filed on Jan. 25, 2021, which claims priority to and is a continuation of U.S. patent application Ser. No. 16/153,917, filed on Oct. 8, 2018 (now U.S. Pat. No. 10,902,142), both of which are incorporated herein by reference in their entireties.

STATEMENT REGARDING FEDERALLY SPONSORED RESEARCH OR DEVELOPMENT

Not applicable.

BACKGROUND OF THE INVENTION

1. Field of the Invention

The present invention relates generally to data security and, more specifically, to methods and systems for encrypting data for secure storage or transport while allowing the encrypted data to remain accessible to the appropriate users and systems.

2. Description of Related Art

The sheer volume and accessibility of data has risen rapidly in recent years. Organizations and individual users increasingly look to electronic data as a primary source of information—rather than tangible documents such as paper—because of the persistence, availability, searchability, and accessibility of electronic data. Also, robust networking and communications technologies have made data accessible to user devices in a variety of contexts, including when a user device establishes a remote connection to a primary network that hosts the accessed data. Further, business and legal requirements have demanded the retention and general availability of historic data.

While vast quantities of data are constantly created and persisted, organizations and individual users must have the ability to access the data. The provision of data access does cause a significant actual and perceived risk from data breaches caused by unauthorized users. While access control methods exist to mitigate improper access, the wide variety of methods of data access make it nearly impossible to prevent at least some unauthorized users from accessing data that they should not be able to access. For example, data is routinely saved on network storage, on local devices, on remote storage devices outside a network, and on removable storage devices such as universal serial bus (USB) drives. Because data is often resident in multiple locations with varying degrees of security, there is a persistent risk of improper data access. There are generally no available techniques of ensuring that data stored on disparate media will be secured using a repeated framework. Further, organizations and individual users face business and legal requirements to ensure that their data is secured in the face of these risks.

Conventional methods have attempted to address these problems through the issuance of secret keys that are used to encrypt and decrypt data blocks. For example, the Advanced Encryption Standard (AES) established by the U.S. National Institute of Standards and Technology provides an encryption scheme that uses a fixed block size of 128 bits and a key size of 128, 192, or 256 bits. The key size specifies the number of transformation rounds required to encrypt each data block to provide an acceptable level of data security. Specifically, AES uses 10 transformation rounds for 128-bit keys, 12 transformation rounds for 192-bit keys, and 14 transformation rounds for 256-bit keys. Each transformation round consists of several processing steps, including byte substitution, shifting rows, mixing columns, and round key addition. A set of reverse transformation rounds are applied to decrypt each encrypted data block using the same key.

While conventional methods have provided adequate data security, they lack the ability to provide robust encryption in an efficient manner. For example, the multiple transformation rounds used in AES increase the computational complexity required for the encryption and decryption of data. Also, the encryption and decryption schemes of AES do not provide flexibility to support scalable solutions. Thus, there remains a need in the art for an improved encryption and decryption method that overcomes some or all of the drawbacks associated with existing methods and/or that offers other advantages compared to existing methods.

BRIEF SUMMARY OF THE INVENTION

The present invention is directed to methods and systems for encrypting and decrypting data using object-based screens and logic blocks. Various examples of encryption and decryption schemes are provided. Each encryption scheme includes a series of transformations that convert a data block into an encrypted data block by (a) applying at least one screen in accordance with a bit remapping operation and (b) applying one or more logic blocks in accordance with a bit modification operation. Each decryption scheme includes a series of transformations that convert a previously-encrypted data block into the original data block by (a) applying at least one inverse screen in accordance with an inverse bit remapping operation and (b) applying the one or more logic blocks in accordance with the bit modification operation. Preferably, the encryption and decryption schemes each utilize a single round of transformation steps to provide a high level of data security while allowing access to the data by authorized users and systems.

In some embodiments, the one or more logic blocks used in the encryption and decryption schemes are generated from one or more process objects—wherein the number of process objects equals the number of logic blocks generated for each data block. Each process object comprises a sequence of process bits that is used to generate a different logic block for each data block. The logic blocks are generated by cyclically shifting a start bit within the sequence of process bits of each of the process objects. For each process object, the start bit is calculated for a particular data block based on a data block number, as well as an effective object size and object rate associated with the process object. The logic blocks generated for each data block are applied in an order determined by an object position associated with each process object—e.g., a position before or after the bit remapping operation or inverse bit remapping operation.

The present invention improves the functionality of computer devices by providing increased data security while minimizing the computational complexity of the encryption and decryption schemes. Also, the invention provides an improvement in computer technology by storing or transporting data within data blocks that have been encrypted using a unique encryption scheme while enabling access to the data via a corresponding decryption scheme.

Various embodiments of the present invention are described in detail below, or will be apparent to one skilled in the art based on the disclosure provided herein, or may be learned from the practice of the invention. It should be understood that the above brief summary of the invention is not intended to identify key features or essential components of the embodiments of the present invention, nor is it intended to be used as an aid in determining the scope of the claimed subject matter as set forth below.

BRIEF DESCRIPTION OF THE DRAWINGS

Various exemplary embodiments of the present invention are described in detail below with reference to the attached drawing figures, wherein:

FIG. 1 depicts an index block with cell references;

FIG. 2 depicts a binary object;

FIG. 3 depicts a mask that is generated based on the binary object of FIG. 2;

FIG. 5 depicts a movement instructions table that is generated based on the binary object of FIG. 2 and the integer object of FIG. 4;

FIGS. 6A-6D depict a screen comprising a set of remapping instructions provided in a table format, which are generated based on the movement instructions table of FIG. 5 in combination with the mask of FIG. 3;

FIG. 7 depicts a screen comprising a set of remapping instructions provided in a block format, which are generated based on the movement instructions table of FIG. 5 in combination with the mask of FIG. 3;

FIG. 9 depicts a data block to be encrypted;

FIG. 10 depicts an encrypted data block that is generated by applying the screen of FIG. 7 to the data block of FIG. 9;

FIG. 11 depicts an encrypted data block that is generated by applying the logic block of FIG. 8 to the encrypted data block of FIG. 10;

FIGS. 12A-12C depict a set of bits from which binary and integer objects are derived;

FIGS. 13A-13C depict a set of integers from which binary and integer objects are derived;

FIG. 26 depicts setup objects including a binary setup object 0, an integer setup object 1, and a binary setup object 2;

FIGS. 27A-27B depict process objects including a process object 0, a process object 1, a process object 2, a process object 3, a process object 4, and a process object 5;

FIG. 28 depicts an initialization vector including a binary IV setup object, an IV offset vector, and process object parameters;

FIG. 29 depicts a mask generated from the binary IV setup object of FIG. 28 and the binary setup object 2 of FIG. 26;

FIG. 30 depicts a directional setup object generated from the binary IV setup object of FIG. 28 and the binary setup object 0 of FIG. 26;

FIGS. 31A-31B depicts the bitwise pairing of the directional setup object of FIG. 30 and the integer setup object 1 of FIG. 26;

FIGS. 32A and 32B depict movement instructions for sub-screens 1-8 that are generated using the process of FIG. 18;

FIG. 33 depicts the masks to be used with sub-screens 1-8 that are generated from the mask of FIG. 29;

FIGS. 34A-34D depict the process of generating the remapping relationships for sub-screen 1 using the process of FIG. 20;

FIG. 35 depicts sub-screens 1-8 that are generated using the process of FIG. 20;

FIG. 36 depicts a screen that is generated from assembling sub-screens 1-8 of FIG. 35;

FIG. 37 depicts the screen of FIG. 36 provided with both index positions and cell references;

FIG. 38 depicts the inverse screen corresponding to the screen of FIG. 37 provided with both index positions and cell references;

FIGS. 39A-39B depict the generation of XOR blocks for input data block 0, input data block 1, and input data block 2 using the process objects of FIGS. 27A-27B and the process object parameters of FIG. 28;

Figure 40A:
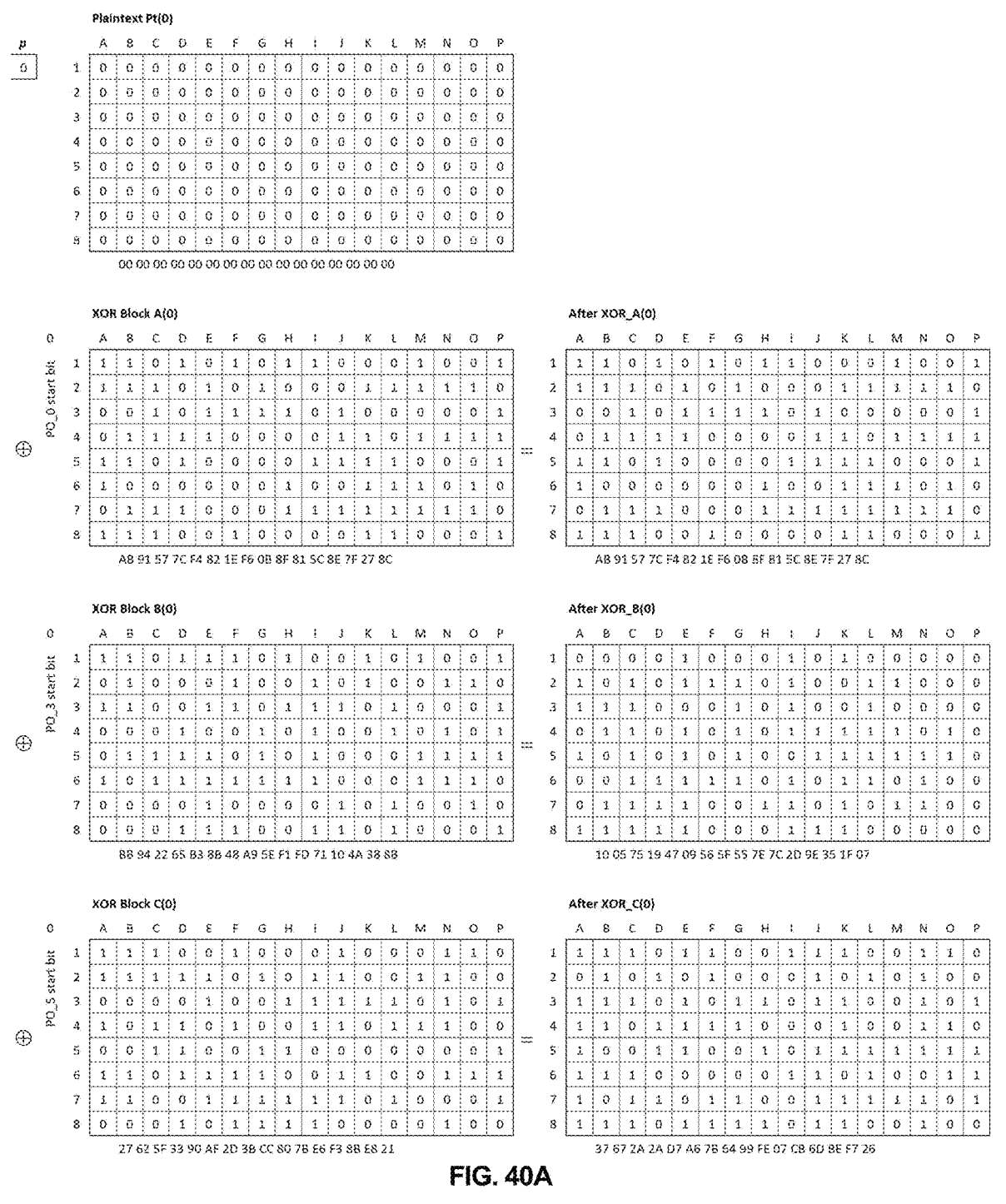
Figure 40B:
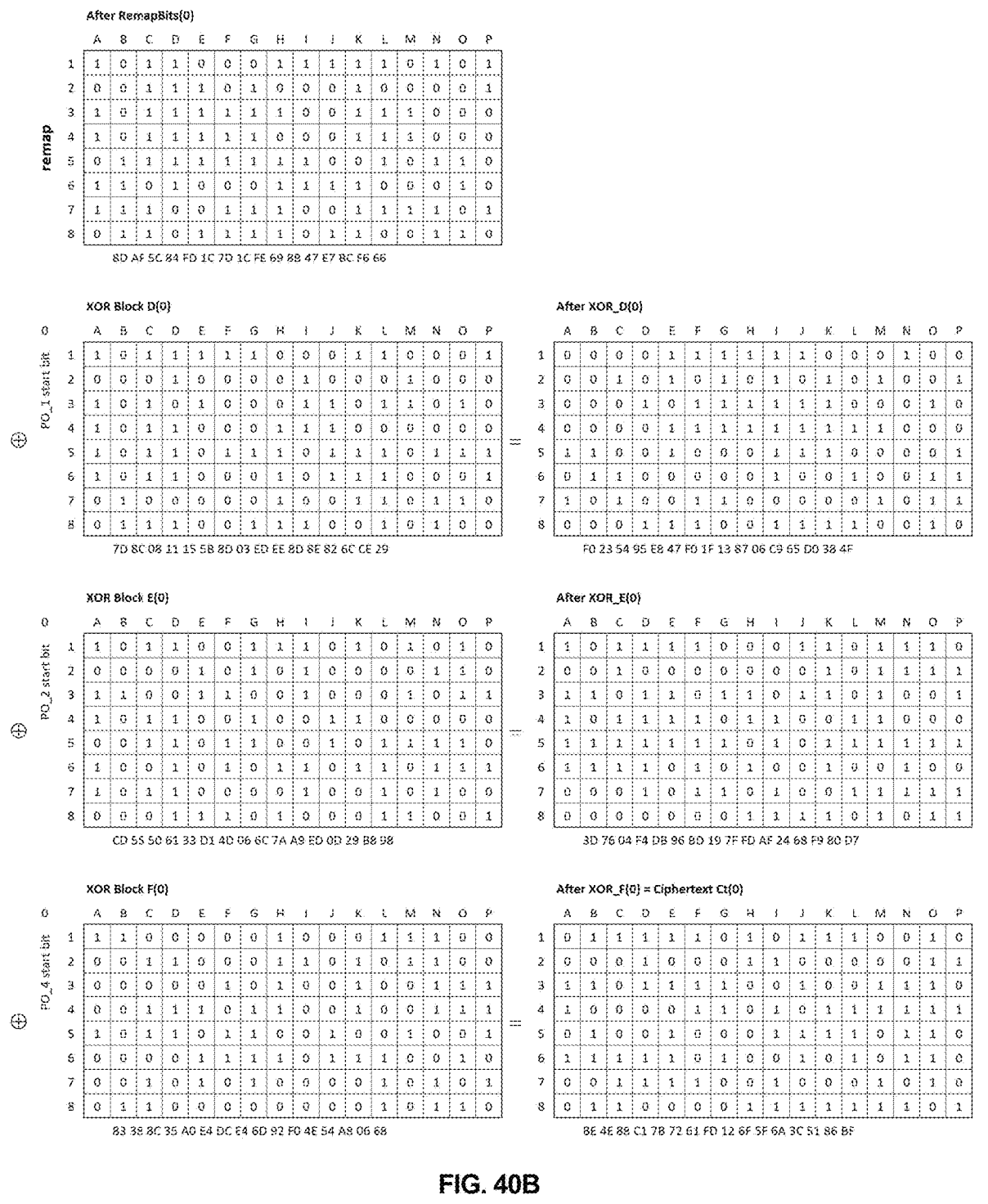
Figure 40C:
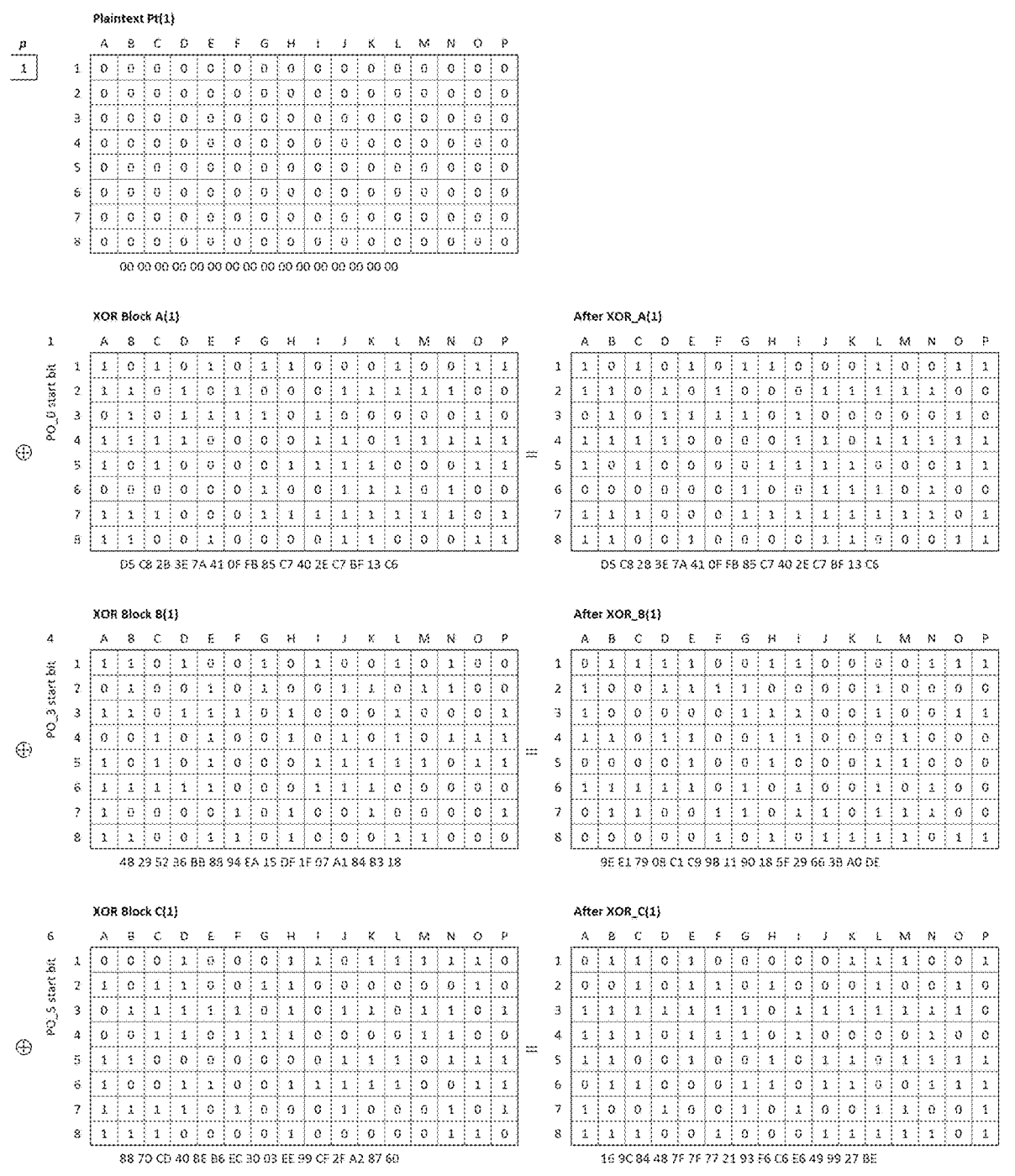
Figure 40D:
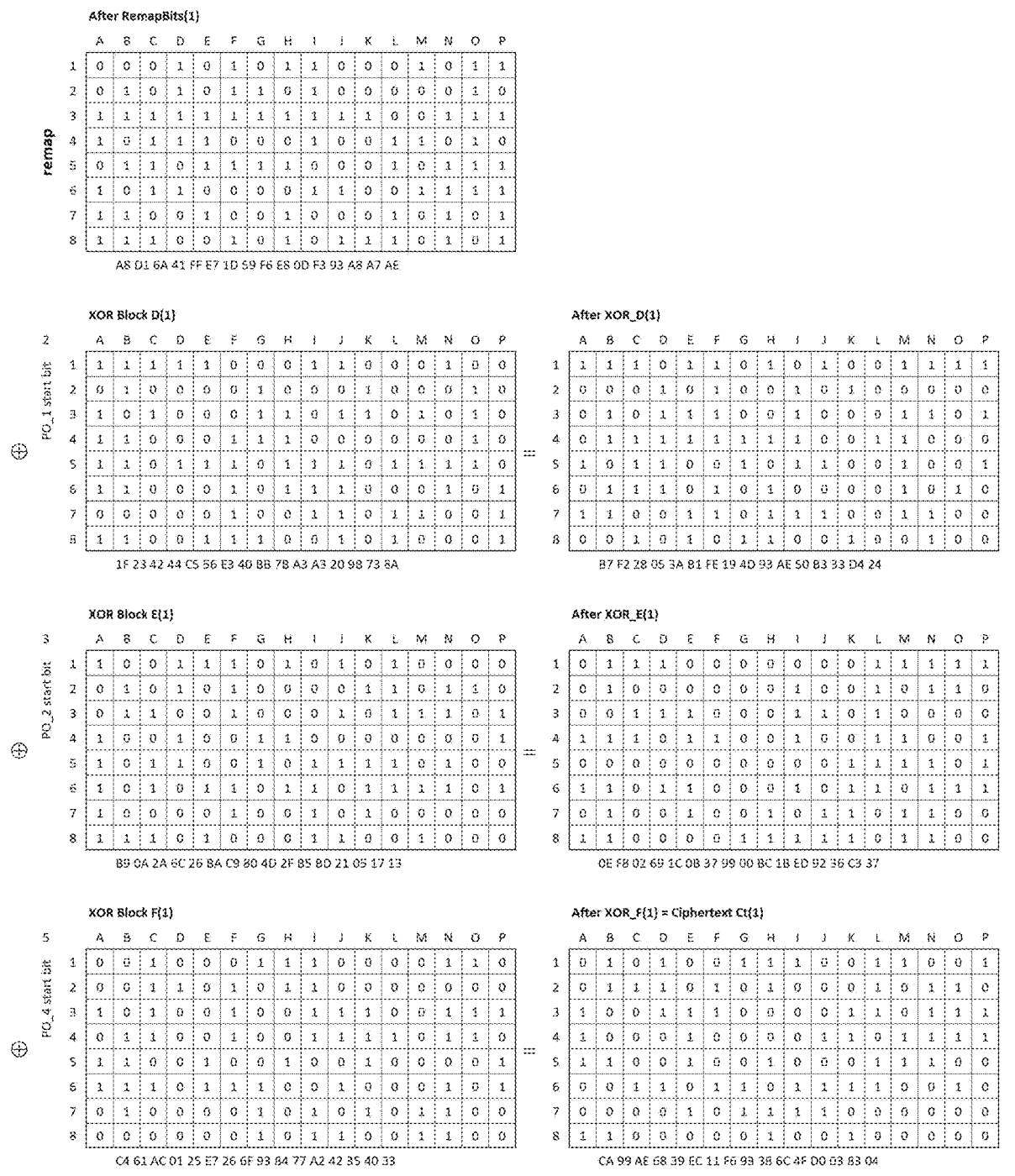
Figure 40E:
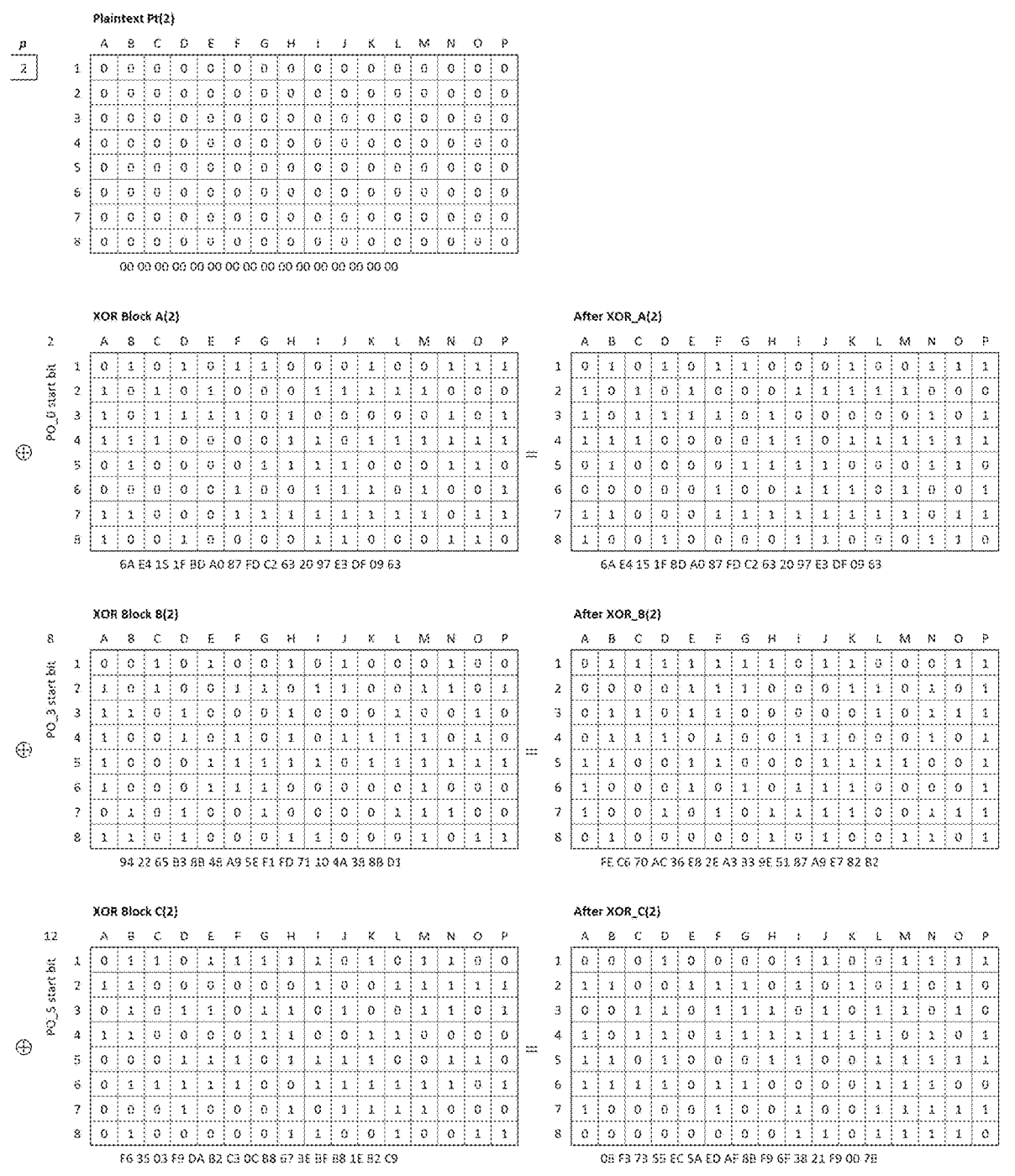
Figure 40F:
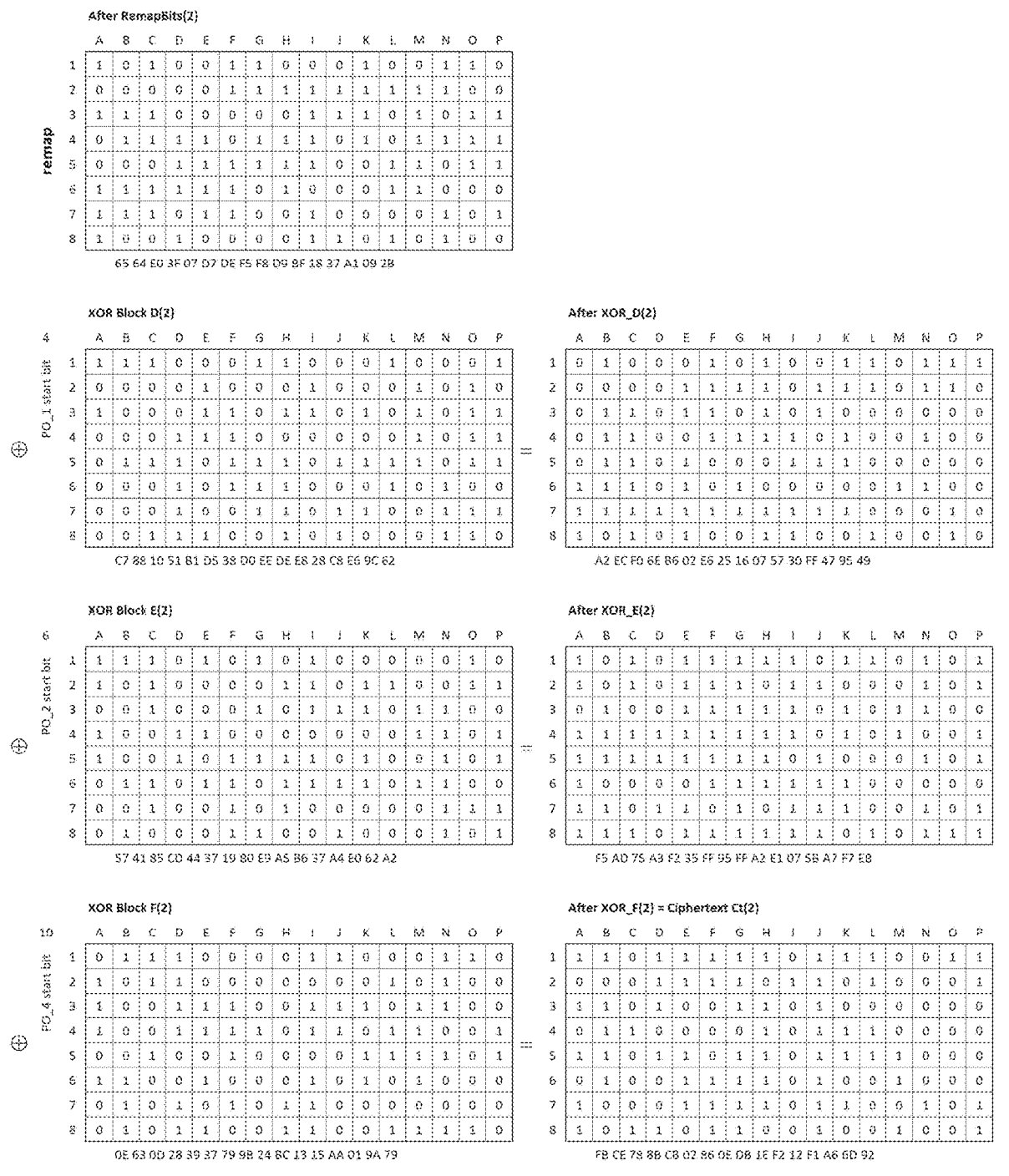

FIGS. 40A-40F depict the process of encrypting input data block 0, input data block 1, and input data block 2 using the screen of FIG. 37 and the XOR blocks of FIGS. 39A-39B in accordance with the encryption scheme of FIG. 23;

Figure 41A:
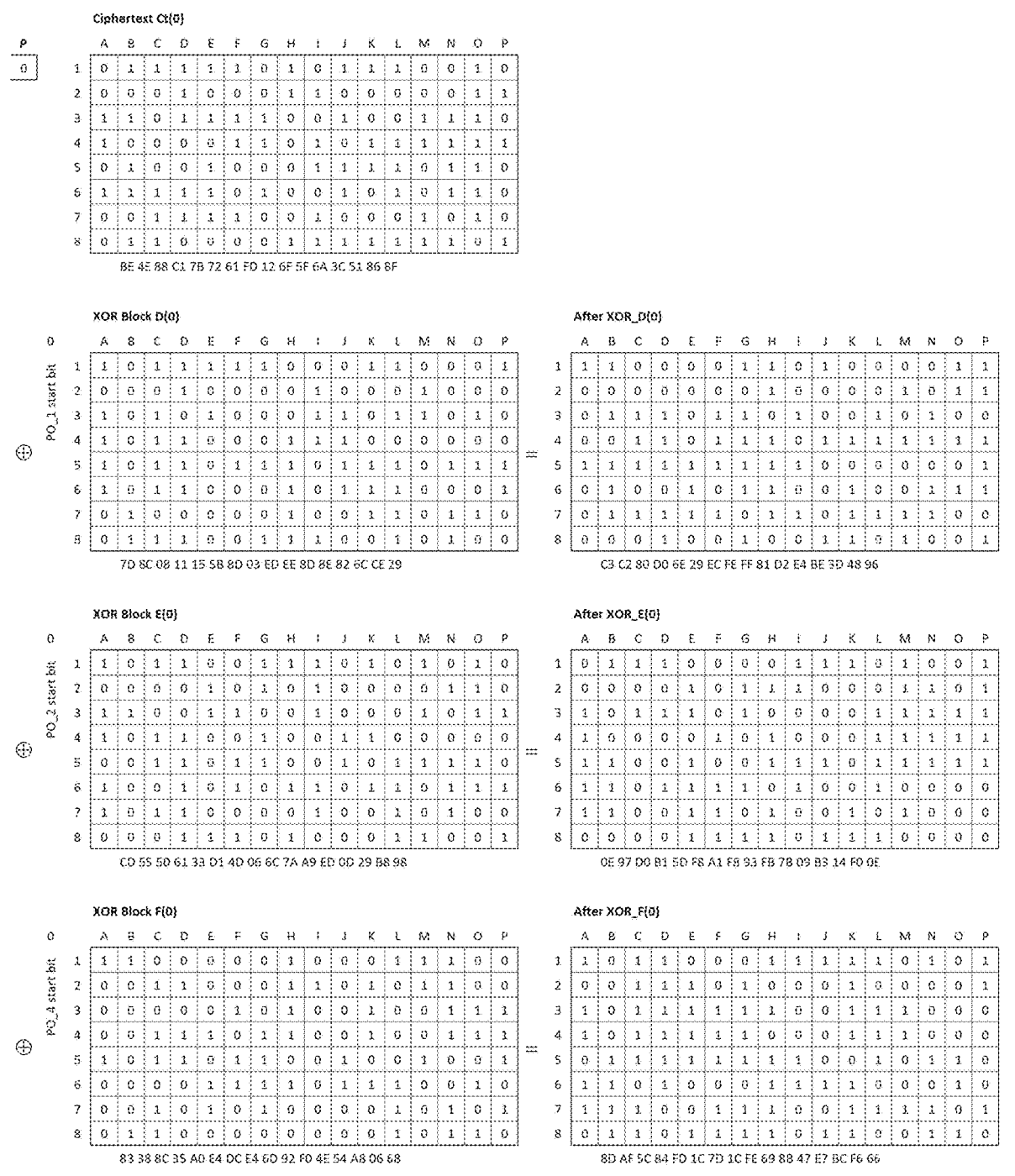
Figure 41B:
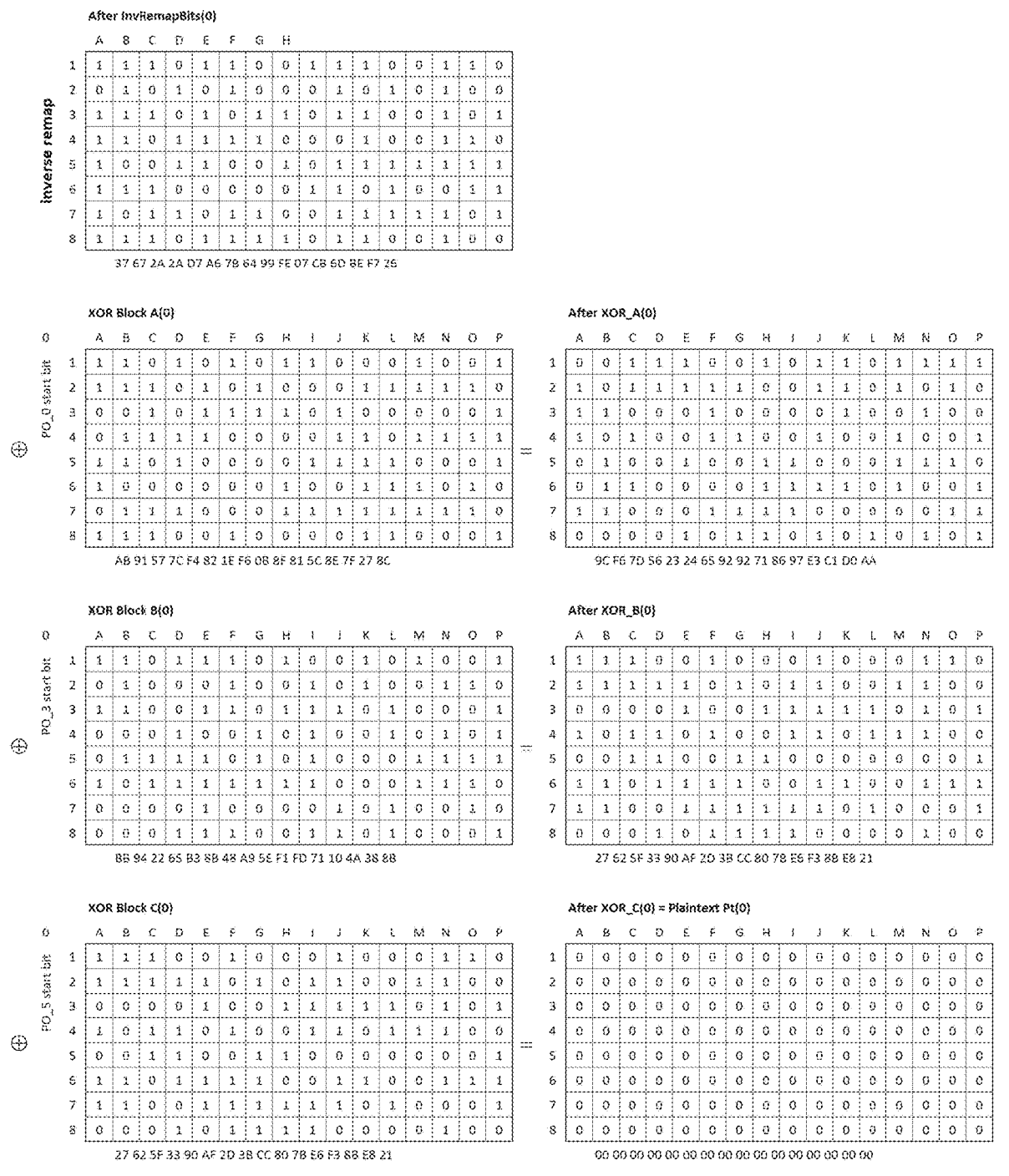
Figure 41C:
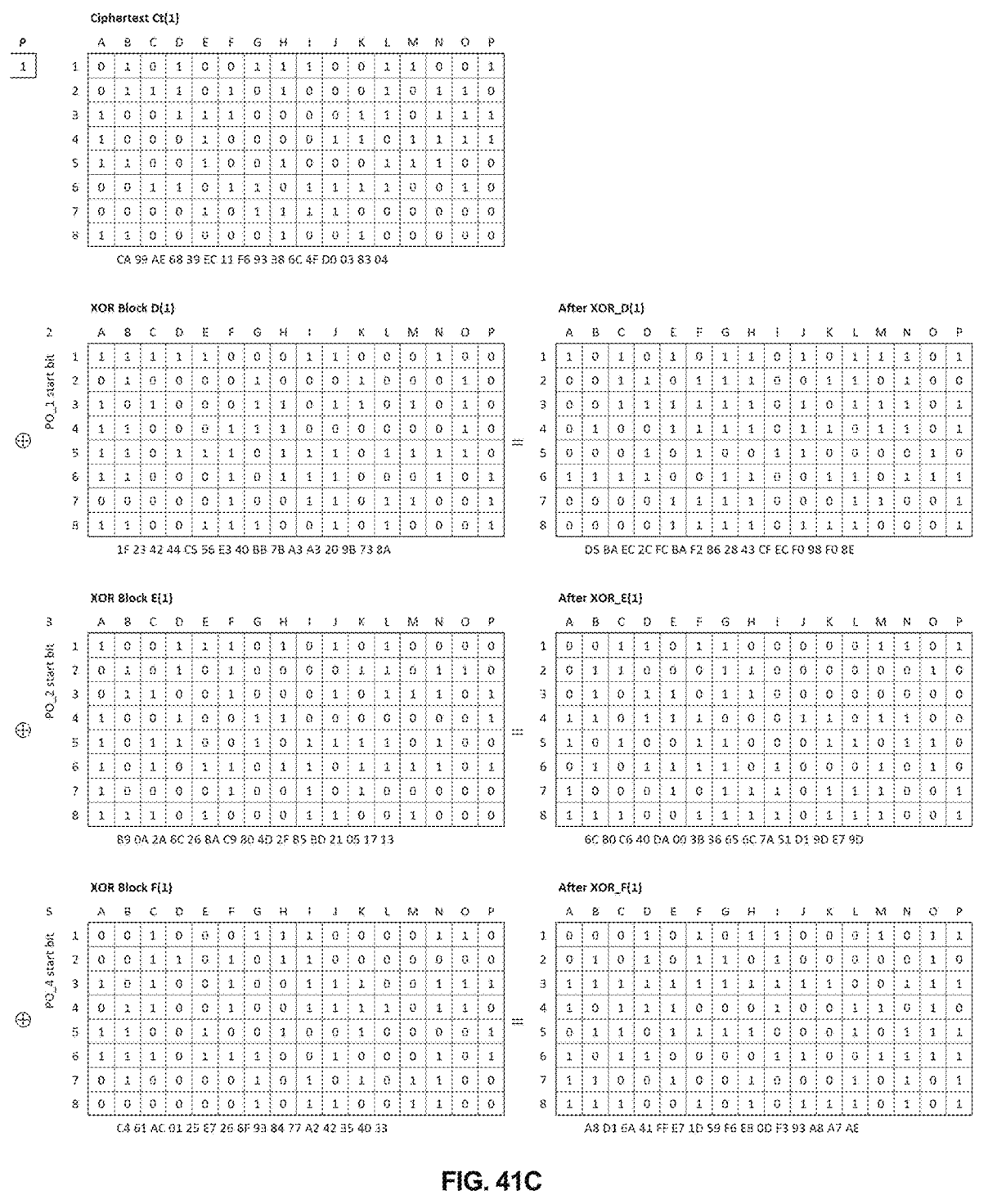
Figure 41D:
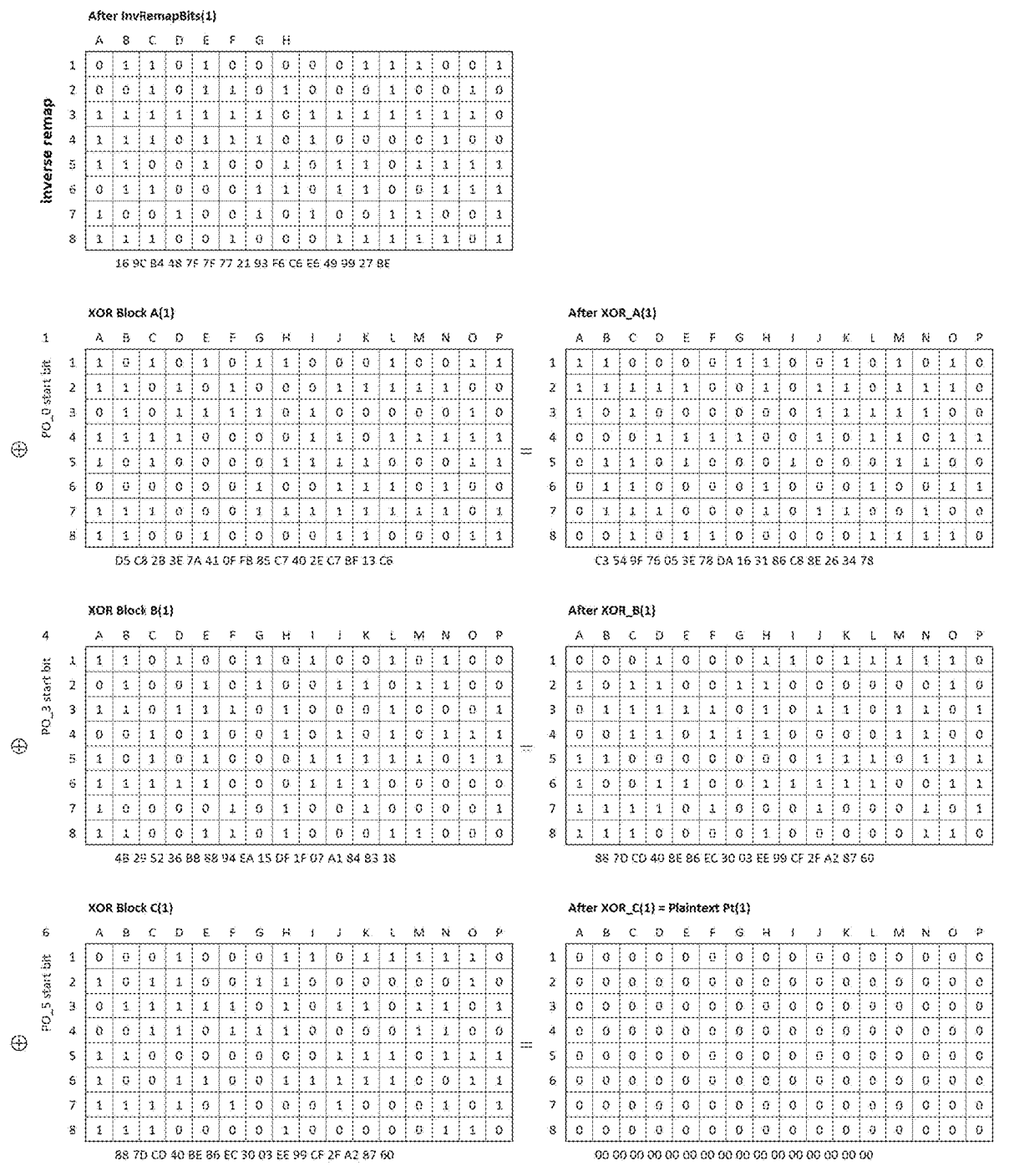
Figure 41E:
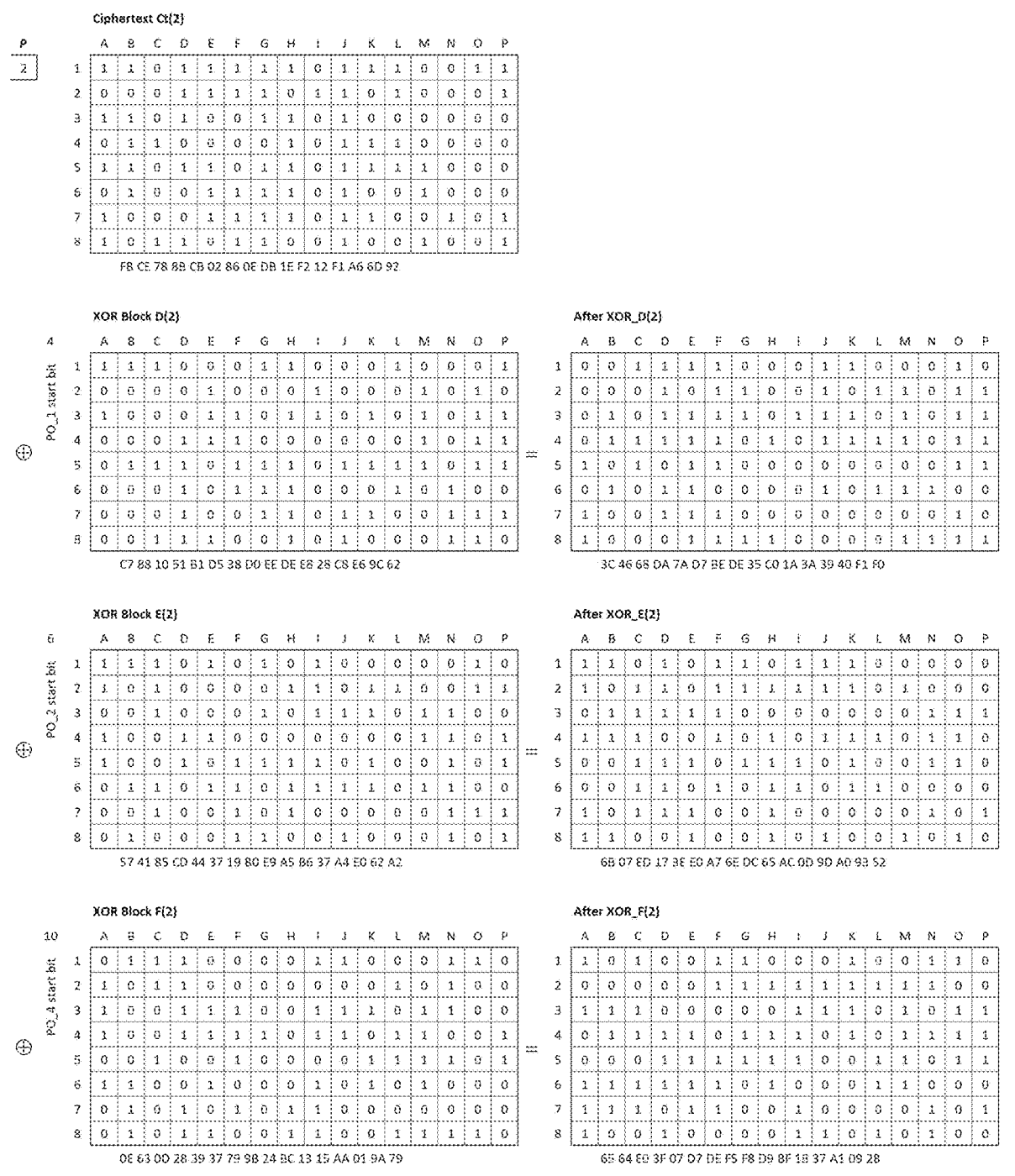
Figure 41F:
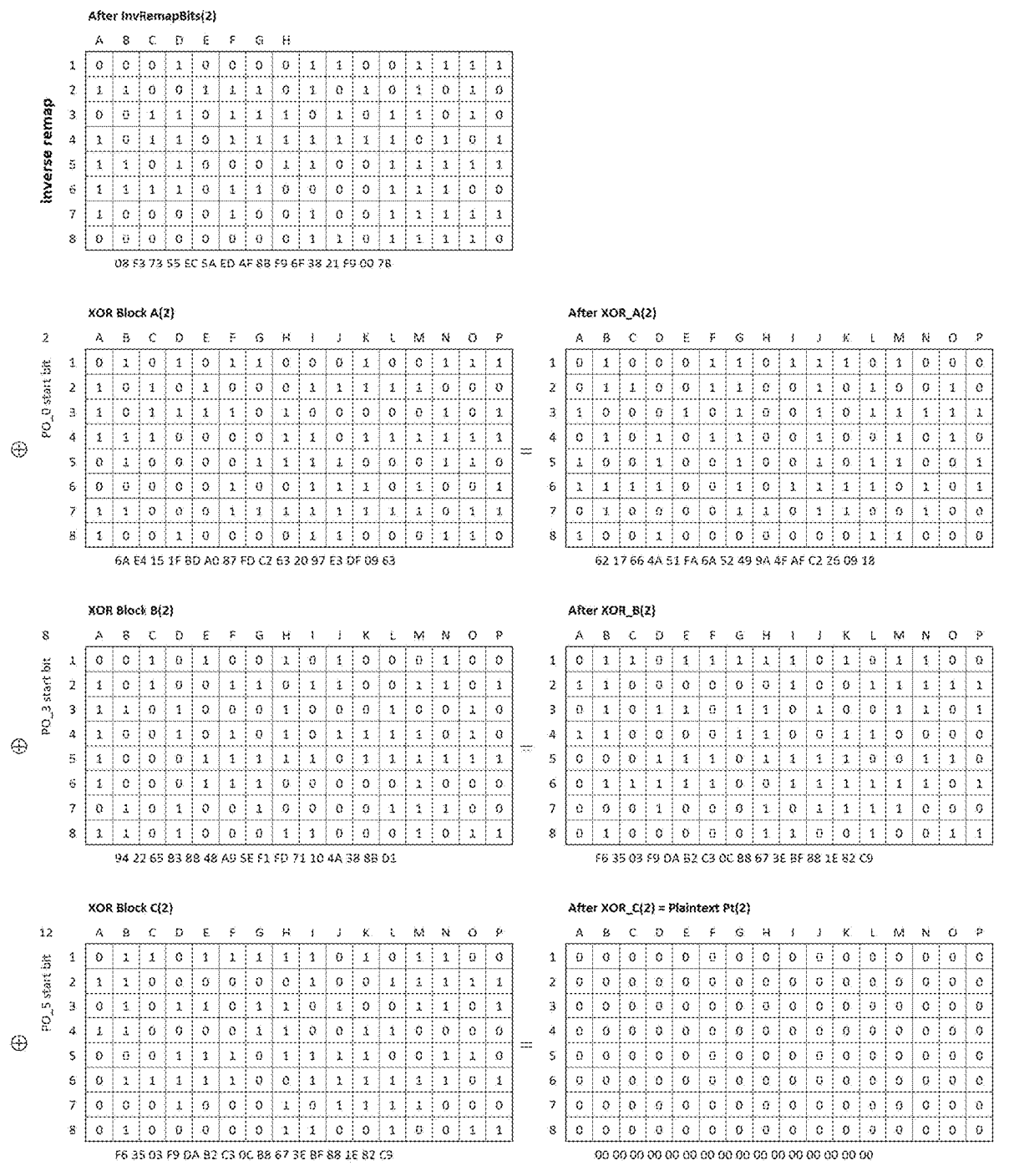

FIGS. 41A-41F depict the process of decrypting input data block 0, input data block 1, and input data block 2 using the inverse screen of FIG. 38 and the XOR blocks of FIGS. 39A-39B in accordance with the decryption scheme of FIG. 24;

DETAILED DESCRIPTION OF EXEMPLARY EMBODIMENTS

Figure 4:
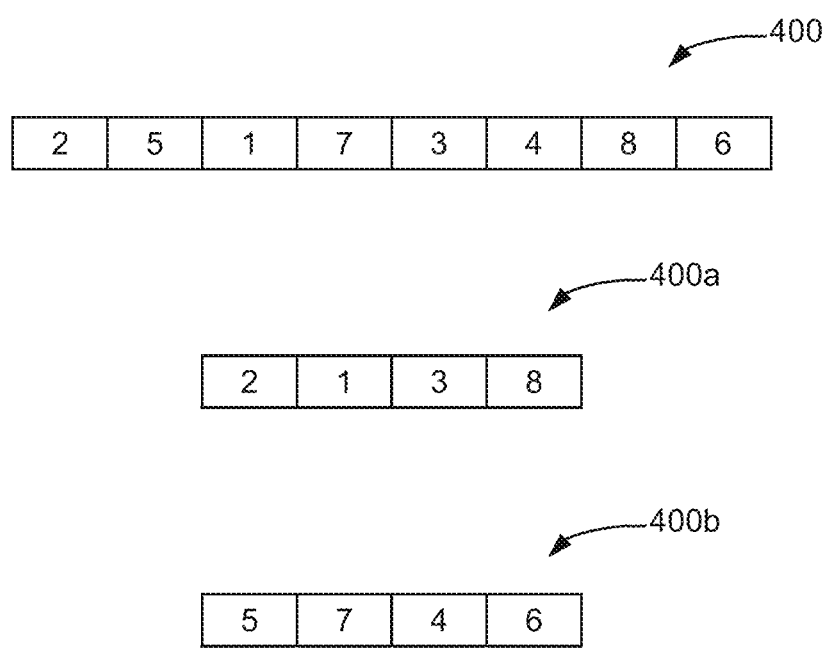
FIG. 4 depicts an integer object.

The present invention is directed to methods and systems for encrypting and decrypting data using object-based screens and logic blocks. While the invention will be described in detail below with reference to various exemplary embodiments, it should be understood that the invention is not limited to the specific configurations or methodologies of these embodiments. In addition, although the exemplary embodiments are described as embodying several different inventive features, one skilled in the art will appreciate that any one of these features could be implemented without the others in accordance with the present invention.

In the present disclosure, references to "one embodiment," "an embodiment," "an exemplary embodiment," or "embodiments" mean that the feature or features being described are included in at least one embodiment of the invention. Separate references to "one embodiment," "an embodiment," "an exemplary embodiment," or "embodiments" in this disclosure do not necessarily refer to the same embodiment and are also not mutually exclusive unless so stated and/or except as will be readily apparent to one skilled in the art from the description. For example, a feature, structure, function, etc. described in one embodiment may also be included in other embodiments, but is not necessarily included. Thus, the present invention can include a variety of combinations and/or integrations of the embodiments described herein.

The disclosure provided below uses various terms to describe the encryption and decryption schemes of the present invention. The meaning of these terms should be understood from the context of the disclosure as further defined in Table 1 below:

TABLE 1

| Term | Definition |
| --- | --- |
| Binary Object | An object consisting of a tuple of random bits. |
| Bit | A binary digit having a value of 0 or 1. |
| Bit Modification Operation | A logical operation in which first and second input bits determine an output bit. The logical operation is its own inverse to enable use in both a cipher and inverse cipher. Examples of such a logical operation include an XOR logical operation and an XNOR logical operation. |
| Bit Remapping Operation | Transformation used in a cipher that remaps each bit from its current index position to a destination index position. |
| Block | A block-sized tuple of bits positioned within an index block. |
| Block Size | Length or size of a block (in bits), denoted as "B." |
| Cipher | A series of transformations that converts plaintext to ciphertext in accordance with an encryption scheme that applies at least one screen and at least one logic block to each data block. |
| Ciphertext | Data output from a cipher or input to an inverse cipher. |
| Data Block | A block containing a segment of plaintext. |
| Index Block | A block-sized tuple of index positions. |
| Index Position | An integer representing the position of a specific bit within an index block, denoted as "i." |
| Initialization Vector | Initialization data used to generate a screen, inverse screen, and/or logic blocks, denoted as "IV." |
| Integer Object | An object consisting of a tuple of random non-negative decimal integers. |
| Inverse Bit Remapping Operation | Transformation used in an inverse cipher that is the inverse of a bit remapping operation. |
| Inverse Cipher | A series of transformations that converts ciphertext to plaintext in accordance with a decryption scheme that applies at least one inverse screen and at least one logic block to each encrypted data block. |
| Inverse Screen | A block-sized tuple of rearranged index positions for use in performing an inverse bit remapping operation. |
| Logic Block | A block containing a plurality of bits for use in performing a bit modification operation. Examples of such a block include an XOR block and an XNOR block. |
| Mask | A block containing a plurality of mask bits for use in generating a screen and inverse screen. |
| Movement Instructions | A set of instructions describing where to move each index position within an index block for use in generating a screen and inverse screen. |
| Object | A secret, cryptographic tuple of data that may be used by a cipher or inverse cipher. |
| Object Length or Object Size | For a binary object, the length or size of the object in bits. For an integer object, the number of integer elements that comprise the object. |
| Offset Vector | An xy-coordinate that shifts each movement instruction by a fixed amount for use in generating a screen and inverse screen. |

TABLE 1-continued

| Term | Definition |
| --- | --- |
| Plaintext | Data input to a cipher or output from an inverse cipher. |
| Process Object | A binary object used to generate logic blocks, denoted as "PO." |
| Screen | A block-sized tuple of rearranged index positions for use in performing a bit remapping operation. |
| Setup Object | A binary object or integer object used to generate a screen or inverse screen, denoted as "SO." |
| Sub-Block | A sub-block-sized subset of a block. |
| Sub-Block Size | Length or size of a sub-block (in bits), denoted as "R". The sub-block size R is a factor of the block size B, such that R = B/x for some positive integer x. |
| Sub-Screen | A sub-block-sized subset of a screen. Multiple sub-screens are combined to create a screen. |
| Tuple | A collection of elements that is ordered (i.e., a sequence) and may have duplicate elements. |
| XNOR Block | A logic block for use in performing an XNOR logical operation. |
| XNOR Logical Operation | Exclusive-NOR operation. |
| XOR Block | A logic block for use in performing an XOR logical operation. |
| XOR Logical Operation | Exclusive-OR operation. |

As described below, the present invention is implemented on a computing device configured to identify data to be encrypted (i.e., the plaintext). For example, data may be identified for encryption if the data is being stored locally or remotely in a context that requires encryption or transported in a context that requires encryption. The context that requires encryption may be based, for example, on a policy associated with one or more of the computing device, a user, an organization, a network, a software application, or any other attributes.

The computing device is configured to divide the identified data into multiple data segments based upon a selected block size. It can be appreciated that the number of data segments is dependent on the size of the identified data and the selected block size. For example, if the computing device identifies a file of 1 megabyte for encryption and the selected block size is 128 bits, the computing device will divide the file into 62,500 data segments. Exemplary block sizes are 32 bits, 64 bits, 128 bits, 256 bits, 512 bits, 1,024 bits, 2,048 bits, 4,096 bits, 8,192 bits, 16,384 bits, 32,768 bits, 65,536 bits or greater. Of course, other block sizes may be used within the scope of the present invention.

The computing device is also configured to position the bits of each data segment within an index block to create a data block. The index block is a virtual structure that identifies a plurality of index positions arranged in a predetermined manner. The virtual structure may comprise a one-dimensional array (i.e., a linear array of data), a two-dimensional array (i.e., data arranged in rows and columns), a three-dimensional array (i.e., an array of two-dimensional arrays), or any other type of data structure known in the art. Each index position may contain a single bit or a plurality of bits (e.g., eight bits) of the data segment.

The computing device is also configured to implement a cipher comprising a series of transformations that converts plaintext to ciphertext. The cipher utilizes an encryption scheme that applies at least one screen and at least one logic block to each data block. The screen is applied in connection with a bit remapping operation that remaps the bits in each data block, and the logic block is applied in connection with a bit modification operation that modifies certain bits in each data block. Preferably, the cipher applies the transformations in a single transformation round.

The computing device is further configured to implement an inverse cipher comprising a series of transformations that converts ciphertext to plaintext. The inverse cipher utilizes a decryption scheme that applies at least one inverse screen and at least one logic block to each previously-encrypted data block. The inverse screen is applied in connection with an inverse bit remapping operation that remaps the bits in each encrypted data block, and the logic block is applied in connection with a bit modification operation that modifies certain bits in each encrypted data block. Preferably, the inverse cipher applies the transformations in a single transformation round.

Examples of different encryption and decryption schemes that may be implemented in accordance with the present invention are provided in Table 2 below:

TABLE 2

| Encryption Scheme | Decryption Scheme |
| --- | --- |
| Step 1: Apply Logic Block | Step 1: Apply Inverse Screen |
| Step 2: Apply Screen | Step 2: Apply Logic Block |
| Step 1: Apply Screen | Step 1: Apply Logic Block |
| Step 2: Apply Logic Block | Step 2: Apply Inverse Screen |
| Step 1: Apply Logic Block Group | Step 1: Apply Inverse Screen |
| Step 2: Apply Screen | Step 2: Apply Logic Block Group |
| Step 1: Apply Screen | Step 1: Apply Logic Block Group |
| Step 2: Apply Logic Block Group | Step 2: Apply Inverse Screen |
| Step 1: Apply Logic Block A | Step 1: Apply Logic Block B |
| Step 2: Apply Screen | Step 2: Apply Inverse Screen |
| Step 3: Apply Logic Block B | Step 3: Apply Logic Block A |
| Step 1: Apply Logic Block Group A | Step 1: Apply Logic Block Group B |
| Step 2: Apply Screen | Step 2: Apply Inverse Screen |
| Step 3: Apply Logic Block Group B | Step 3: Apply Logic Block Group A |

With reference to Table 2, it can be seen that the same logic block(s) are used in both the encryption and decryption schemes—i.e., the bit modification operation performed by each logic block is its own inverse. It can also be seen that the logic block(s) may be applied before and/or after the screen/inverse screen, as shown, and may comprise a single logic block or a logic block group (i.e., two or more logic blocks). The encryption and decryption schemes shown in Table 2 apply a single screen and a single inverse screen, respectively; however, multiple screens and inverse screens may be applied in other schemes. Of course, other encryption and decryption schemes that apply at least one screen/inverse screen and at least one logic block—and optionally other types of transformations (including, but not limited to, one or more stumbling blocks as described in U.S. Pat. No. 10,902,142)—will be apparent to one skilled in the art.

The same screen/inverse screen and logic block(s) may be applied to all of the data blocks during an encryption/decryption session, or, the screen/inverse screen and/or logic block(s) may be unique to each data block that is processed during the encryption/decryption session. For example, in some embodiments, the encryption scheme uses the same screen and logic block(s) to encrypt all of the data blocks during an encryption session and, similarly, the decryption scheme uses the same inverse screen and logic block(s) to decrypt all of the encrypted data blocks during a decryption session. In other embodiments, the encryption scheme uses the same screen to encrypt all of the data blocks during an encryption session and, similarly, the decryption scheme uses the same inverse screen to decrypt all of the encrypted data blocks during a decryption session. However, the data blocks are encrypted and decrypted using different logic block(s)—e.g., the encryption and decryption schemes uses logic block(s) that are unique to each data block during the encryption/decryption session. In yet other embodiments, the encryption scheme uses different screens and logic block(s) to encrypt the data blocks during an encryption session and, similarly, the decryption scheme uses different inverse screens and logic block(s) to decrypt the encrypted data blocks during a decryption session—e.g., the screen, inverse screen, and logic block(s) are unique to each data block during the encryption/decryption session.

In a preferred embodiment, the encryption scheme encrypts each of the data blocks by applying one or more logic blocks, then applying a screen, and then applying one or more logic blocks. Conversely, the decryption scheme decrypts each of the previously-encrypted data blocks by applying one or more logic blocks, then applying an inverse screen, and then applying one or more logic blocks. The logic blocks applied before the screen during the encryption process are the same logic blocks applied after the inverse screen during the decryption process and, similarly, the logic blocks applied after the screen during the encryption process are the same logic blocks applied before the inverse screen during the decryption process. In this embodiment, the same screen is used to encrypt all of the data blocks during an encryption session and, similarly, the same inverse screen is used to decrypt all of the encrypted data blocks during a decryption session. However, the logic blocks are unique to each data block during the encryption/decryption session.

The length of an encryption/decryption session may comprise any period of time determined by a particular implementation. For example, an encryption/decryption session may begin when a user opens a software application and end when the user closes the software application. As another example, an encryption/decryption session may comprise a defined period of time. As yet another example, an encryption/decryption session may be determined by the amount of data processed by a computing device—e.g., a session may end when the amount of processed data reaches a predetermined number of bytes. Of course, other ways to determine the length of an encryption/decryption session will be apparent to one skilled in the art.

As described in greater detail below, the screen and inverse screen are generated based on movement instructions created from a binary object and an integer object. In some embodiments, the binary object and integer object comprise independent objects. In other embodiments, the binary object and integer object are derived from a single set of values (e.g., a single set of bits or a single set of integers). In yet other embodiments, the binary object and integer object are derived from a combination of public and private data such as an initialization vector and setup objects.

The screen and inverse screen may also be generated based on a mask created from one or more binary objects. In some embodiments, the mask is created from the same binary object used to generate the screen and inverse screen. In other embodiments, the mask is created from a binary object that is different than the binary object used to generate the screen and inverse screen. In yet other embodiments, the mask is created from a combination of public and private setup objects.

As described in greater detail below, each logic block is generated based on one or more binary objects. In some embodiments, the logic block is created from the same binary object used to generate the screen and inverse screen. In other embodiments, the logic block is created from a binary object that is different than the binary object used to generate the screen and inverse screen. In yet other embodiments, logic blocks are created from one or more process objects, wherein each process object is used to create a unique logic block for each data block to be processed. Thus, the number of process objects equals the number of logic blocks generated for each data block during the encryption/decryption session (although additional process objects may be provided that are not used to generate logic blocks, as described below).

One type of logic block is an XOR block. Specifically, an XOR block may be used to perform an XOR logical operation in which the output is true only when the inputs are different, as shown in Table 3 below:

TABLE 3

| Input 1 | Input 2 | Output |
|---------|---------|--------|
| 0 | 0 | 0 |
| 1 | 1 | 0 |
| 0 | 1 | 1 |
| 1 | 0 | 1 |

Another type of logic block is an XNOR block. Specifically, an XNOR block may be used to perform an XNOR logical operation in which the output is true only when the inputs are the same, as shown in Table 4 below:

TABLE 4

| Input 1 | Input 2 | Output |
|---------|---------|--------|
| 0 | 0 | 1 |
| 1 | 1 | 1 |
| 0 | 1 | 0 |
| 1 | 0 | 0 |

Thus, it can be appreciated that an XNOR block is equivalent to an XOR block in the context of the present invention—i.e., an XNOR logical operation is simply an XOR logical operation in which the output is inverted. Notably, an XOR block and an XNOR block are their own inverse and can be used in both the cipher and inverse cipher as described herein.

Provided in Section I below is a detailed description of various exemplary embodiments of encryption and decryption schemes that may be used in accordance with the present invention. Also provided in Section II below is a detailed description of exemplary computing devices and methods that may be used to encrypt and decrypt data blocks for secure storage or transport of data in accordance with the present invention.

I. EXEMPLARY ENCRYPTION AND DECRYPTION SCHEMES

A. First Exemplary Embodiment

1. Index Block

In this embodiment, the index block comprises a plurality of index positions representing the position of a specific bit within an index block arranged as a two-dimensional array—i.e., the index positions consist of consecutive integers from 1 to B, starting in the top-left corner and increasing from left to right and then row-wise in carriage-return fashion, with B in the bottom-right corner. Thus, this embodiment utilizes a 1-based numbering scheme (although a 0-based numbering scheme could alternatively be used).

FIG. 1 shows an example of an index block 100 formatted as a square and having 16 rows (rows 1-16) and 16 columns (columns A-P) to provide 256 index positions, as shown, wherein each index position may be referenced by its column and row position within index block 100. One skilled in the art will appreciate that index block 100 may be used to create a data block containing 256 bits (if a single bit is placed in each index position) or a data block containing 2,048 bits (if a byte is placed in each index position). Of course, other block sizes may be used in accordance with the present invention.

2. Object Set

In this embodiment, the encryption and decryption schemes use an object set comprising a single binary object and a single integer object—i.e., independent objects that are not derived from other objects or value sets.

The binary object comprises a sequence of random bits having an object length x so as to provide $2^x$ possible permutations of random bits. FIG. 2 shows an example of a binary object 200 having an object length of 64 bits. In other examples, the binary object may have an object length of a multiple of 64 bits, such as 128 or 256 bits. Of course, the binary object may have other object lengths in accordance with the present invention.

The integer object comprises a sequence of random non-negative decimal integers having an object length y. The integers range from 1 to y and each integer is used only once within the object (i.e., the integers are not repeated). As such, there are y-factorial (or y!) possible combinations of integers for the integer object. FIG. 4 shows an example of an integer object 400 that, for simplicity, is shown in abbreviated form to have an object length of 8 integers. It should be noted that a more typical object length would be 64 integers or a multiple thereof. Of course, the integer object may have other object lengths in accordance with the present invention. In addition, in other embodiments, the integer object could use one or more integers that are repeated and/or could use non-sequential integers.

In the example shown in FIG. 4, it can be seen that the odd numbered elements of integer object 400 are identified as reference number 400a, and the even numbered elements of integer object 400 are identified as reference number 400b. It will be seen that the screen is created, in part, based on the use of odd numbered elements 400a to denote horizontal movement of index positions within the index block and the use of even numbered elements 400b to denote vertical movement of index positions within the index block, as described below.

The object set may provide identity-based encryption and decryption. For example, the object set may be associated with an identity of a computing device, a user identity, an organizational identity, a network identity, a biometric signature, a software application, a timestamp, a geographic location, or any other attributes.

In some embodiments, the object set is assigned by an organization, software manufacturer, trusted authority, or other third party. For example, the information technology (IT) department of an organization could assign an object set to each employee when issuing a computing device for use at the organization. As another example, a software manufacturer could provide an object set associated with the operating system (OS) installed on a computing device, wherein the computing device may not be used without the object set. As yet another example, a trusted authority could manage the assignment of object sets.

In some embodiments, the object set is assigned based on the context of a data storage or transport event. For example, the object set could be assigned based on the identity of a user associated with the event, the identity of an organization associated with the event, the identity of a network associated with the event, a software application associated with the event, the time associated with the event, or the geographic location of the computing device associated with the event.

The object set could be stored on the computing device used to store and/or transport the data. However, the object set is preferably stored on a storage device separate from the computing device. In one example, the object set is stored on a mobile phone that communicates with the computing device using Bluetooth low-energy (BLE), near-field communication (NFC), or similar wireless technologies. In another example, the object set is stored on a removable storage device, such as a Universal Serial Bus (USB) drive that is connectable to a USB port of the computing device. In yet another example, the object set is stored on a smart card, chip card, integrated circuit chip (ICC) card or other secured token. In yet a further example, the object set may be stored on a remote storage device in networked communication with the computing device. Of course, the object set should only be transmitted over a network if the object set cannot be readily determined. For example, the object set could be delivered within an additionally encrypted session or in an otherwise secure fashion.

3. Generation of Screen and Inverse Screen

The object set described above is used to generate a screen to be used in a bit remapping operation and an inverse screen to be used in an inverse bit remapping operation. Specifically, each screen provides a set of remapping instructions that identifies a correspondence between a plurality of original index positions and a plurality of destination index positions within the index block. In this embodiment, the original index positions are transposed to the destination index positions in accordance with the following steps: (1) generate a mask derived from the bits of the binary object, as described below in connection with FIG. 3; (2) generate movement instructions based on an interaction between the bits of the binary object and the integers of the integer object, as described below in connection with FIG. 5; and then (3) apply the movement instructions in conjunction with the mask to generate the screen, as described below in connection with FIGS. 6A-6D and FIG. 7. Each of these steps will now be described in greater detail.

First, a mask is generated based on the bits of the binary object. FIG. 3 shows an example of a mask 300 that is generated by striping the bits of the binary object 200 shown in FIG. 2 across the index block 100 shown in FIG. 1. In this example, the index block 100 may be used to store 256 mask bits (i.e., a 16×16 block) and the binary object 200 includes 64 bits. As such, the mask 300 comprises the 64 bits of the binary object 200 striped four times across the index block 100. In other examples, the striping may optionally begin with an offset that is determined, for example, based on the sum of the bits of the binary object. Of course, it should be understood that the invention is not limited to the use of the mask 300 shown in FIG. 3 and that other masks may also be used.

Second, movement instructions are generated based on an interaction between the bits of the binary object and the integers of the integer object. The movement instructions may be provided in a variety of different formats. FIG. 5 shows an example of movement instructions 500 provided in a table format, which is generated based on an interaction between the bits of the binary object 200 shown in FIG. 2 and the integers of the integer object 400 shown in FIG. 4.

In this example, the movement instructions 500 are generated by successively pairing each sequential bit of the binary object 200 with each sequential integer of the integer object 400. The object length of the binary object 200 (64 bits) is greater than the object length of the integer object 400 (8 integers). Thus, the integers of the integer object 400 are repeated eight times to obtain a pairing for each bit of the binary object 200. Specifically, the 8 integers of the integer object 400 are successively paired with each group of 8 bits of the binary object 200, i.e., the bits contained in positions 1-8, positions 9-16, positions 17-24, positions 25-32, positions 33-40, positions 41-48, positions 49-56, and positions 57-64, as shown. Of course, it should be understood that this same approach may be used in connection with any objects having different object lengths, including those in which the object length of the integer object is greater than the object length of the binary object.

It should be understood that other pairing techniques may be used that do not involve successive pairing of the integers of the integer object with the bits of the binary object. As an example, a pairing technique may be used in which every other group of elements in an object requires a reverse pairing of the corresponding elements in the other object. For example, the 8 integers of the integer object 400 could be paired in reverse order with every other group of 8 bits of the binary object 200, i.e., the bits contained in positions 9-16, positions 25-32, positions 41-48, and positions 57-64. One skilled in the art will appreciate that a variety of other pairing techniques may be used within the scope of the present invention.

Referring still to FIG. 5, it can be seen that each of the integers of the integer object 400 are associated with a directional designation, i.e., left, right, up, or down. As discussed above in connection with FIG. 4, the odd numbered elements 400a of the integer object 400 denote horizontal movement of index positions (either left or right) within the index block, and the even numbered elements 400b of the integer object 400 denote vertical movement of index positions (either up or down) within the index block. The bit of the binary object 200 determines whether the directional designation is left or right (for the odd numbered elements 400a of the integer object 400) or up or down (for the even numbered elements 400b of the integer object 400).

In this example, a bit of zero (0) within the binary object 200 indicates movement of index positions right or up within the index block, and a bit of one (1) within the binary object 200 indicates movement of index positions left or down within the index block.

Thus, the movement instructions provide the initial remapping instructions for each of the index positions in the index block in terms of horizontal and vertical movement. For a given index position, the movement instructions indicate a direction of movement based on the associated bit from the binary object, as well as an offset based on the associated integer from the integer object. For example, the movement instructions 500 shown in FIG. 5 indicate that the first index position of the index block should move right 2 positions and down 5 positions, the second index position of the index block should move right 1 position and down 7 positions, the third index position of the index block should move right 3 positions and up 4 positions, etc.

If the movement required by the movement instructions would cause an index position to move past any of the outer boundary edges of the index block, a resolution instruction may be applied that requires the index position to wrap around to the opposite end of the applicable row or column in order to complete the required movement. For example, the movement instructions 500 shown in FIG. 5 indicate that the third index position of the index block should move right 3 positions and up 4 positions. The third index position is located at column C, row 1. Thus, while the index position can move right 3 positions to the index position located at column F, row 1, it cannot move up 4 positions without moving past the upper boundary edge of the index block. In this case, the "upward" movement will cause the index position to move to the bottom end of column F and then up 4 positions to the index position located at column F, row 13. One skilled in the art will appreciate that a variety of other resolution instructions may be used within the scope of the present invention.

Third, the movement instructions are applied in conjunction with the mask to generate a screen. The screen may be provided in a variety of different formats. FIGS. 6A-6D show an example of a screen in which the remapping instructions are provided in a table format (see tables 600a-600d). FIG. 7 shows an example of a screen in which the same remapping instructions are provided in a block format. In both examples, the remapping instructions are generated based on the movement instructions 500 shown in FIG. 5 and the mask 300 shown in FIG. 3, as described below.

In this example, the screen is generated by applying the movement instructions 500 that provide the initial remapping instructions (as described above) and then applying the mask 300 to further move certain index positions in the index block. In this example, the mask bits in the mask 300 are used to determine if such further movement is required. Specifically, a mask bit of zero (0) in an index position indicates that no further movement is required. However, a mask bit of one (1) in an index position indicates that further movement is required. The further movement of the index position involves moving the destination index position to the next available index position, which may be any index position identified by a pre-defined horizontal or vertical movement from the destination index position. In this example, the next available index position is defined as the index position immediately to the right of the destination index position (even if that next available index position contains a mask bit of one (1)). The mask bit in the next available index position is then changed to a mask bit of zero (0).

For example, the movement instructions 500 shown in FIG. 5 indicate that the first index position of the index block should move right 2 positions and down 5 positions, i.e., from the original index position located at column A, row 1 to the destination index position located at column C, row 6. However, the mask bit located at column C, row 6 is a one (1). Thus, the destination index position must move 1 position to the right to the index position located at column D, row 6. The mask bit located at column D, row 6 is a zero (0). Therefore, no further movement is required. As such, the remapping instructions would require movement of the original index position of column A, row 1 to the destination index position of column D, row 6. These remapping instructions can be seen in the screen shown in FIG. 6A. This same information can be seen in the screen shown in FIG. 7, wherein the original index position of "1" located at column A, row 1 is shown in the destination index position of column D, row 6.

If the further movement would cause an index position to move past the right boundary edge of the index block (i.e., to the right of column P), a resolution instruction may be applied that requires movement to the right and wrapping to the next row down in carriage-return fashion within the index block. For example, the movement instructions 500 shown in FIG. 5 indicate that the nineteenth index position of the index block should move left 3 positions and up 4 positions, i.e., from the original index position located at column C, row 2 to the destination index position located at column P, row 14 (using the boundary edge resolution rules described above). However, the mask bit located at column P, row 14 is a one (1). Thus, the destination index position must move 1 position to the right. Because the destination index position cannot move 1 position to the right without moving past the right boundary edge of the index block, the destination index position will move to the first index position of the next row down within the index block, i.e., the index position located at column A, row 15. The mask bit located at column A, row 15 is a zero (0). Therefore, no further movement is required. As such, the remapping instructions would require movement from the original index position of column C, row 2 to a destination index position of column A, row 15. These remapping instructions can be seen in the screen shown in FIG. 6A. This same information can be seen in the screen shown in FIG. 7, wherein the original index position of "19" located at column C, row 2 is shown in the destination index position of column A, row 15. One skilled in the art will appreciate that a variety of other resolution schemes may also be used within the scope of the present invention.

It should be noted that the resolution scheme described above may also be used when application of the movement instructions 500 and mask 300 would cause an original index position to move to a destination index position that already contains another original index position.

While the screen of this embodiment is generated by applying movement instructions 500 in conjunction with mask 300 to provide the remapping instructions, it should be understood that the invention is not limited to this method of generating a screen. For example, a screen may be generated that is based solely on movement instructions (i.e., a mask would not be applied). In this case, the movement instructions would function as the remapping instructions. Of course, one skilled in the art will understand that other methods of generating a screen may be used in accordance with the present invention.

4. Generation of Logic Block

Figure 8:
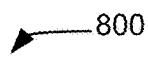
FIG. 8 depicts a logic block that is generated based on the binary object of FIG. 2.

The binary object of the object set described above is also used to generate a logic block to be used in a bit modification operation. In this embodiment, the logic block contains all or a portion of the bits in the binary object. FIG. 8 shows an example XOR block 800 that is generated by striping the bits in positions 1-32 of the binary object 200 shown in FIG. 2 eight times across the index block 100 shown in FIG. 1. In other examples, the striping may optionally begin with an offset that is determined, for example, based on the sum of the bits of the binary object. Of course, all or any portion of the 64 bits of the binary object 200 may be used to generate the XOR block 800. Further, it should be understood that the invention is not limited to the use of the XOR block 800 shown in FIG. 8 and that other logic blocks may also be used.

5. Encryption and Decryption of Data Blocks

For each data segment identified for encryption, the bits of the data segment are positioned within the index block to generate a data block. For example, if the index block 100 shown in FIG. 1 is used for encryption, then a data segment having 256 bits of data is projected into the 256 index positions of index block 100 to generate the data block—assuming that a single bit is placed within each index position (as noted above, a plurality of bits could also be placed within each index position).

A cipher is then used to encrypt the data blocks in accordance with an encryption scheme that applies a screen to remap the positions of the bits in each data block in accordance with a remapping operation. Specifically, each of the bits in a data block is moved from its original index position to its destination index position as defined by the remapping instructions of the screen. The encryption screen also applies a logic block to modify certain bits in each data block in accordance with a bit modification operation.

An example of this encryption scheme can be seen with reference to FIGS. 9 to 11. FIG. 9 shows an original data block prior to any encryption. FIG. 10 shows a first encrypted data block that has been generated by applying the screen shown in FIG. 7 to the original data block shown in FIG. 9. Further, FIG. 11 shows a second encrypted data block that has been generated by applying the XOR block shown in FIG. 8 to the first encrypted data block shown in FIG. 10.

Because each data block is encrypted with the screen and logic block described above, a computing device may decrypt the data block only if that computing device has access to the binary object and integer object used for encryption. When such objects are available, the computing device uses an inverse cipher to decrypt the previously encrypted data block in accordance with a decryption scheme that reverse the process described above to restore the encrypted data block to its original form. Thus, the present invention provides a robust mechanism for encrypting data for secure storage or transport and allowing the secure accessibility of that data.

B. Second Exemplary Embodiment

The encryption and decryption schemes of this embodiment are the same as those of the first exemplary embodiment, with the exception that the binary object and integer object are derived from a single object having a single set of values. The single object may be randomly generated, mechanically generated, or otherwise generated using any methods known in the art.

In some embodiments, the binary object and integer object are derived from a single set of bits. FIG. 12A shows an example set of bits 1200a that includes various bits located in positions 1-128, as shown, from which the binary object and integer object may be derived.

Figure 12B:
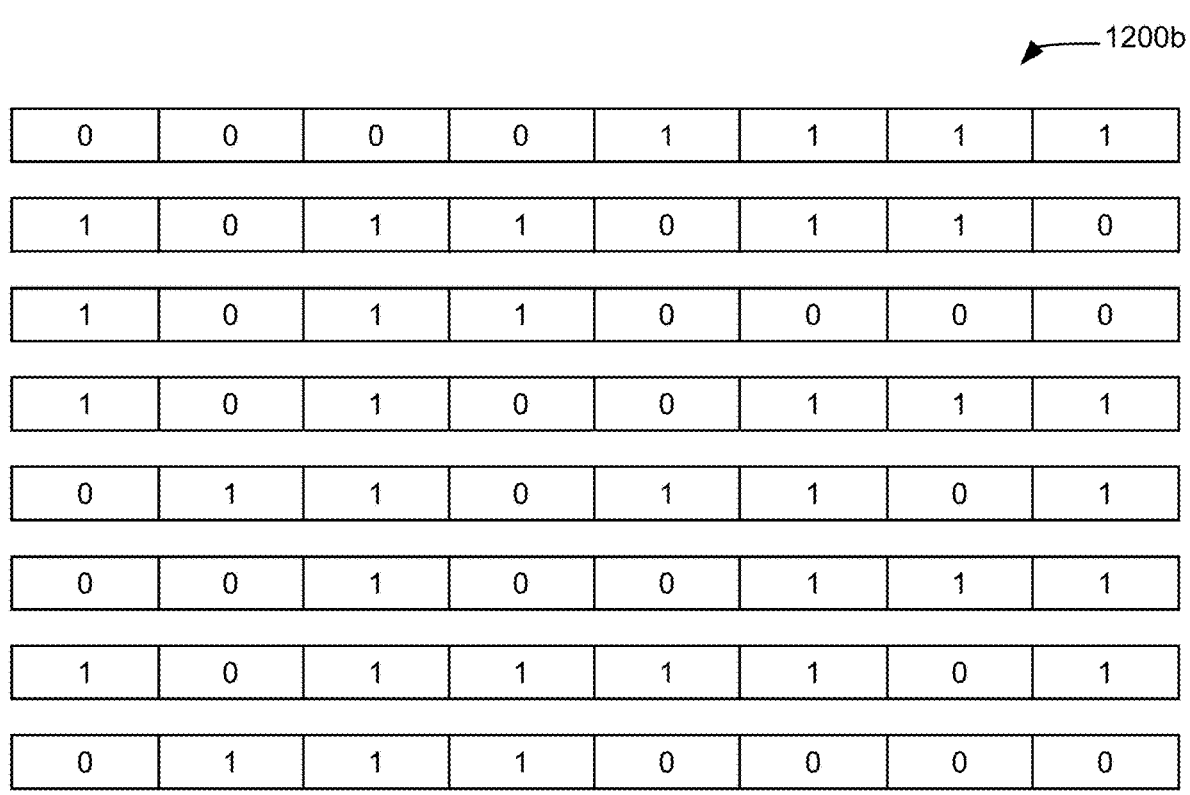

FIG. 12B shows a binary object 1200b comprised of the bits in positions 65-128 of the set of bits 1200a shown in FIG. 12A. Thus, binary object 1200b comprises a sequence of 64 bits. Of course, the binary object may have other object lengths in accordance with the present invention. For example, the binary object could comprise all or any portion of the bits included in the set of bits 1200a shown in FIG. 12A.

FIG. 12C shows an integer object 1200c comprised of integers derived from the bits in positions 1-64 of the set of bits 1200a shown in FIG. 12A. In this embodiment, the integers are derived from the bits using a binary-to-decimal conversion. For example, bits 1101 are converted to integer 13, bits 0110 are converted to integer 6, bits 1010 are converted to integer 10, bits 1101 are converted to integer 11, etc. Thus, integer object 1200c comprises a sequence of 16 integers (0 to 15) and each integer is used only once within the sequence (i.e., the integers are not repeated). Of course, the integer object may include one or more integers that are repeated and/or could use non-sequential integers. In addition, the integer object may have other object lengths in accordance with the present invention. For example, the integer object could comprise integers that are derived from all or any portion of the bits included in the set of bits 1200a shown in FIG. 12A.

In other embodiments, the binary object and integer object are derived from a single set of integers. FIG. 13A shows an example set of integers 1300a that includes 32 integers, as shown, from which the binary object and integer object may be derived.

FIG. 13B shows an integer object 1300b comprised of the first half of integers of the set of integers 1300a shown in FIG. 13A. Thus, integer object 1300b comprises a sequence of 16 integers between 0 and 15, wherein the integer 4 is not used at all and the integer 6 is used twice. Of course, the integer object may include sequential integers that are not repeated. In addition, the integer object may have other object lengths in accordance with the present invention. For example, the integer object could comprise all or any portion of the integers included in the set of integers 1300a shown in FIG. 13A.

FIG. 13C shows a binary object 1300c comprised of bits derived from the second half of integers of the set of integers 1300a shown in FIG. 13A. In this embodiment, the bits are derived from the integers using a decimal-to-binary conversion. For example, the integer 0 is converted to bits 0000, the integer 6 is converted to bits 0110, the integer 10 is converted to bits 1010, the integer 11 is converted to bits 0101, etc. Thus, the binary object 1300c comprises a sequence of 64 bits. Of course, the binary object may have other object lengths in accordance with the present invention. For example, the binary object could comprise bits that are derived from all or any portion of the integers included in the set of integers 1300a shown in FIG. 13A.

C. Third Exemplary Embodiment

1. Index Block

In this embodiment, the index block comprises a plurality of index positions representing the position of a specific bit within an index block arranged as a two-dimensional array—i.e., the index positions consist of consecutive integers from 0 to B−1, starting in the top-left corner and increasing from left to right and then row-wise in carriage-return fashion, with B−1 in the bottom-right corner. Thus, this embodiment utilizes a 0-based numbering scheme (although a 1-based numbering scheme could alternatively be used).

Figure 14:
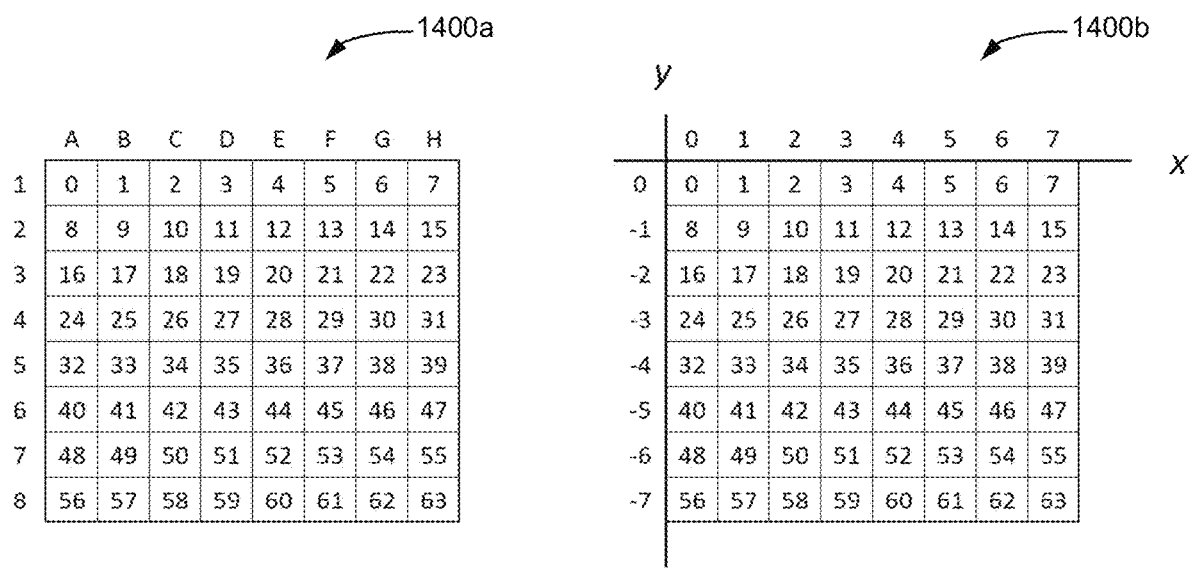
FIG. 14 depicts an index block with both cell references and index coordinates.

FIG. 14 shows an example of an index block 1400a formatted as a square and having 8 rows (rows 1-8) and 8 columns (columns A-H) to provide 64 index positions, as shown, wherein each index position may be referenced by its column and row position within index block 1400a. FIG. 14 shows an example of an alternative index block 1400b that is situated in Quadrant IV of the rectangular coordinate plane, wherein each index position may be referenced by its xy-coordinate within index block 1400b. One skilled in the art will appreciate that index blocks 1400a and 1400b may be used to create a data block containing 64 bits (if a single bit is placed in each index position) or a data block containing 512 bits (if eight bits are placed in each index position). Of course, other block sizes may be used in accordance with the present invention.

2. Object Sets

In this embodiment, the encryption and decryption schemes use two object sets—a setup object set and a process object set. The setup object set includes a binary setup object 0 (SO_0), an integer setup object 1 (SO_1), and optionally a binary setup object 2 (SO_2). The process object set includes a plurality of process objects (PO_0, PO_1, etc.). Each object consists of a sequence of cryptographically random bits or integers.

The binary setup object 0 (SO_0) is used to generate movement instructions in connection with the sub-screen generation process. In this embodiment, the binary setup object 0 (SO_0) comprises a sequence of bits having a length of 2B.

The integer setup object 1 (SO_1) is also used to generate movement instructions in connection with the sub-screen generation process. In this embodiment, the integer setup object 1 (SO_1) comprises a sequence of positive integers having a length of 2B, wherein the integers preferably cover the entire range of possible integer values with equal probability. For a sub-block having a size R with m rows and n columns, the integer setup object 1 (SO_1) may be expressed as follows:

$$\text{For odd } i: 0 \leq SO\_1_i < n$$

$$\text{For even } i: 0 \leq SO\_1_i < m$$

The binary setup object 2 (SO_2) is optionally used to generate a mask in connection with the sub-screen generation process. In this embodiment, the binary setup object 2 (SO_2) comprises a sequence of bits having a length of B.

It should be understood that the setup objects may be larger than the lengths specified above, especially when it is desirable to maintain flexibility to enable the utilization of multiple different block sizes. In that case, only the first B or 2B elements—bits or integers—in the sequence will be considered to be SO_n for use in connection with the sub-screen generation process.

The process objects (PO_0, PO_1, etc.) are used to create logic blocks in connection with the logic block generation process. In this embodiment, each process object comprises a sequence of bits having a length that is greater than or equal to the maximum effective length (λ) identified in the process object parameters contained in the initialization vector, as described below. Each process object is used to create a plurality of logic blocks—one for each of the data blocks. Thus, the number of process objects equals the number of logic blocks created for each of the data blocks in accordance with the encryption/decryption schemes. Of course, in other embodiments, the process object set could include a larger number of process objects, some of which will not be used to create logic blocks. For example, if there are eight process objects but the encryption/decryption scheme only requires the creation of six logic blocks for each of the data blocks, then only six of the eight process objects will be used.

In some embodiments, the object sets are assigned by an organization, software manufacturer, or other third party. For example, the Information Technology (IT) department of an organization could assign the object sets to each employee when issuing a computing device for use at the organization. As another example, a software manufacturer could provide the object sets associated with the operating system (OS) installed on a computing device, wherein the computing device may not be used without those object sets. Thus, the objects in the object sets are private objects that may be used across different encryption/decryption sessions. It should be understood that the object sets could be stored on the computing device or on a storage device separate from the computing device.

3. Initialization Vector (IV)

In this embodiment, the encryption and decryption schemes use an initialization vector that includes three components: (1) a binary IV setup object (BIVSO), (2) an IV offset vector, and (3) process object parameters. These components are provided by a trusted authority (i.e., public data) for use during a single encryption/decryption session. In some embodiments, the initialization vector is manipulated such that an attacker would not be able to parse the components (e.g., the complexity of the initialization vector or the amount of interaction with the initialization vector could be greater to increase unknown variables).

The binary IV setup object is used in connection with the sub-screen generation process. In this embodiment, the binary IV setup object comprises a sequence of bits having a length of 2B.

The IV offset vector is also used in connection with the sub-screen generation process. In this embodiment, the IV offset vector comprises two integers (p, q). For a sub-block having a size R with m rows and n columns, the two integers (p, q) of the IV offset vector may be expressed as follows:

$$p \in \mathbb{Z} : 0 \leq p < n$$

$$q \in \mathbb{Z} : -m < q \leq 0$$

The process object parameters are used in connection with the logic block generation process. In this embodiment, the process object parameters specify four types of information for each logic block:

1. The specific process object (PO_n) from which the bits shall be retrieved.
2. The position of a specified process object's corresponding logic block within the cipher. Logic blocks placed before the screen are said to be at the "front" of the cipher, while logic blocks placed after the screen are said to be at the "back" of the cipher.
3. The effective object length (λ) comprising the truncated length of a specified process object in bits. The effective object length (λ) is a distinct integer equal to one of the first N prime numbers greater than 2B, which may be expressed as follows:

$$\lambda \in \{\lambda_1, \lambda_2, \lambda_3, \ldots, \lambda_N\} \lambda \text{ is a prime number: } \lambda > 2B$$

4. The object rate (φ) comprising the number of bits to increment the start bit (i) between data blocks for a specified process object and initialization vector configuration. The object rate (φ) is a distinct integer between 1 and N, which may be expressed as follows:

$$\rho \in \{\rho_1, \rho_2, \rho_3, \ldots, \rho_n\} : \rho \in \mathbb{Z} : 1 \leq \rho \leq N$$

It should be understood that one or more of the above parameters—e.g., the position of the logic block within the cipher and/or the object rate (ρ)—may be set in the overall configuration settings of the encryption/decryption scheme and excluded from the initialization vector configuration.

An example set of process object parameters for a block size B of 128 bits and a logic block quantity (N) of 6 is shown in Table 5 below:

TABLE 5

| Logic Block | Process Object | Object Position | Object Size (bits) | Object Rate (bits) |
|---|---|---|---|---|
| A | PO_0 | Front | 269 | 1 |
| B | PO_3 | Front | 281 | 4 |
| C | PO_5 | Front | 257 | 6 |
| D | PO_1 | Back | 277 | 2 |
| E | PO_2 | Back | 271 | 3 |
| F | PO_4 | Back | 263 | 5 |

Of course, it should be understood that the block size B and logic block quantity (N) will vary between different implementations. For example, as discussed above, it is possible to use a single logic block at the front of the cipher and a single logic block at the back of the cipher within the scope of the present invention.

4. Generation of Screen and Inverse Screen

The object sets and initialization vector described above are used to generate a screen for a bit remapping operation and an inverse screen for an inverse bit remapping operation. Each screen provides a set of remapping instructions that identifies a correspondence between a plurality of original index positions and a plurality of destination index positions within an index block.

In this embodiment, a sub-screen generation process is used to generate an integer quantity (x) of unique sub-screens, each of size R, which are then combined to assemble a full screen of size B, as follows:

$$R = B/x : x \in \mathbb{Z} : R \geq 16 \text{ bits}$$

One skilled in the art will appreciate that the generation of sub-screens requires less hardware and increases performance compared to the generation of a full screen, but does not have a significant impact on the level of data security. Of course, in other embodiments, the process used to generate the sub-screens may be used to generate the full screen, in which case the sub-screen assembly process would not be required.

a. Generation of Sub-Screens

In this embodiment, the sub-screens are generated in accordance with the following steps: (1) obtain the objects and information needed to generate the sub-screens, as described below in connection with FIG. 15; (2) generate a directional setup object (DSO), as described below in connection with FIG. 16; (3) generate a mask, as described below in connection with FIG. 17; (4) generate movement instructions, as described below in connection with FIGS. 18 and 19; and (5) generate each sub-screen based on the movement instructions, the mask, and the offset vector, as described below in connection with FIGS. 20-22. Each of these steps will now be described in greater detail.

Figure 15:
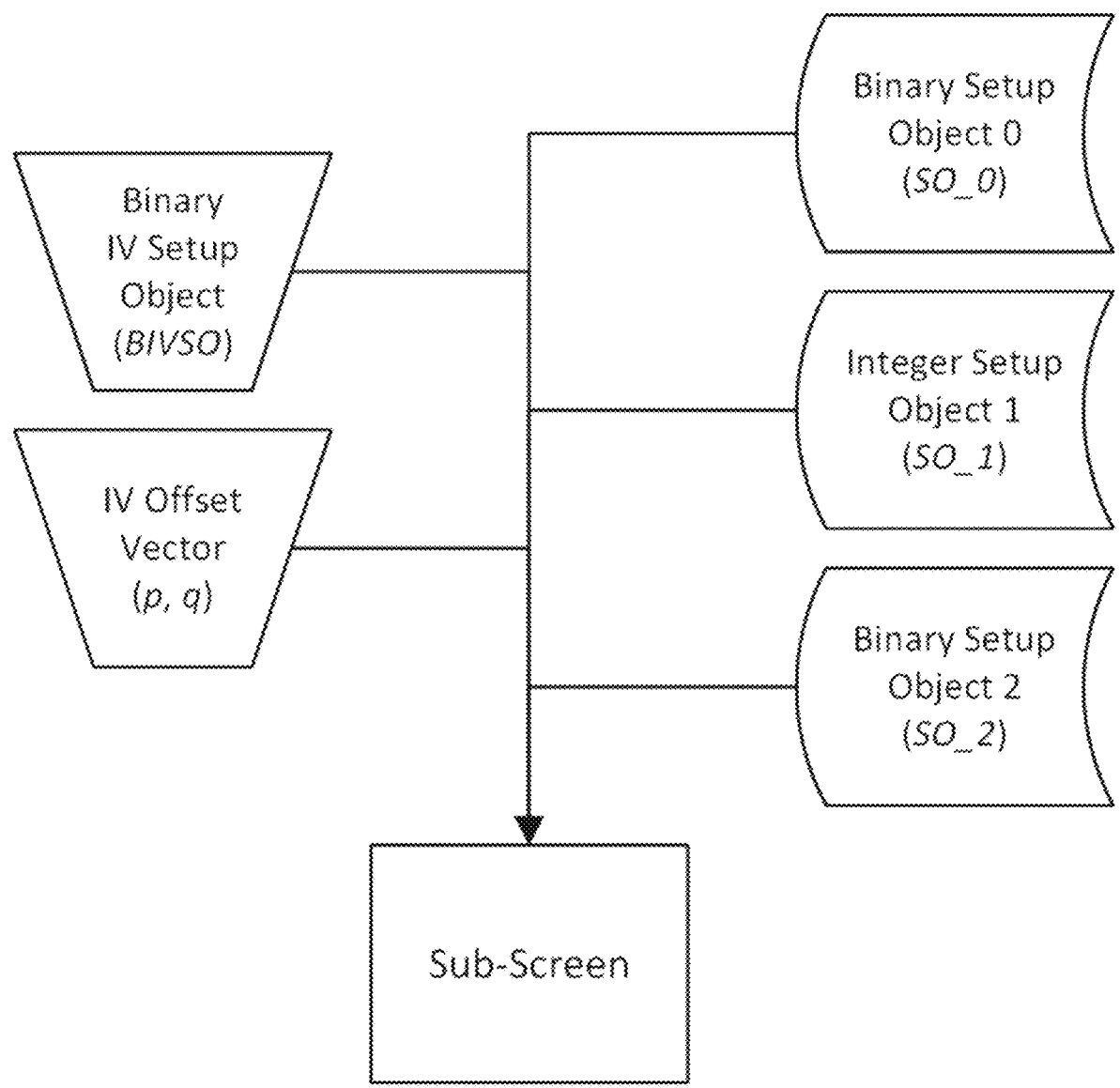
FIG. 15 depicts the components used in a sub-screen generation process, including the components of an initialization vector (a Binary IV setup object and an IV offset vector) and three setup objects (a binary setup object 0, an integer setup object 1, and a binary setup object 2)

First, the objects and information needed to generate the sub-screens are obtained, as shown in FIG. 15. In this embodiment, the objects and information include the binary setup object 0 (SO_0), the integer setup object 1 (SO_1), the binary setup object 2 (SO_2), the binary IV setup object (BIVSO), and the IV offset vector (p, q).

Figure 16:
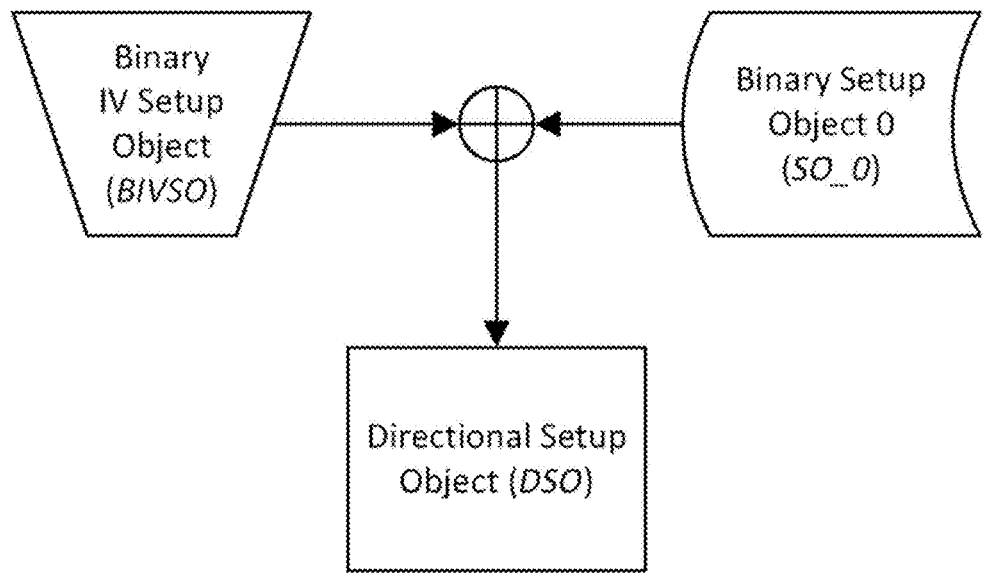
FIG. 16 depicts a process for generating a binary object based on the Binary IV setup object and the binary setup object 0 of FIG. 15.

Second, as shown in FIG. 16, a directional setup object (DSO) is created by implementing an XOR operation in which (1) the binary IV setup object (BIVSO) and the binary setup object 0 (SO_0) are the inputs to the XOR operation and (2) the directional setup object (DSO) is the output of the XOR operation. It can be appreciated that the XOR operation is applied on an index position-by-index position basis—e.g., the bit contained is the first index position of the binary IV setup object (BIVSO) is XOR-ed with the bit in the first index position of the binary setup object 0 (SO_0) to generate the bit in the first index position of the directional setup object (DSO), etc. Of course, in other embodiments, an XNOR operation may be used instead of the XOR operation.

Figure 17:
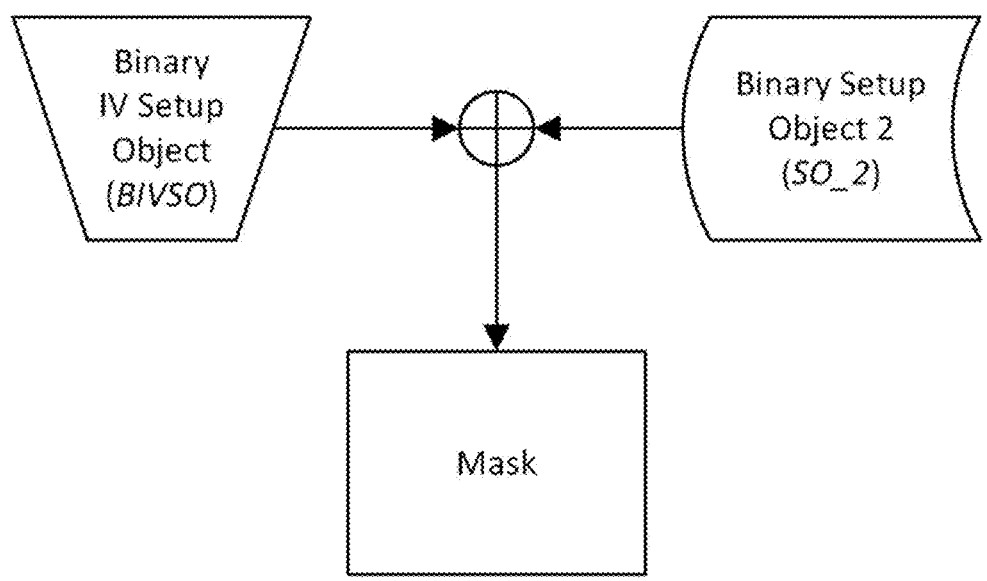
FIG. 17 depicts a process for generating a mask based on the Binary IV setup object and the binary setup object 2 of FIG. 15.

Third, as shown in FIG. 17, the mask is created by implementing an XOR operation in which (1) the binary IV setup object (BIVSO) and the binary setup object 2 (SO_2) are the inputs to the XOR operation and (2) the mask is the output of the XOR operation. It can be appreciated that the XOR operation is applied on an index position-by-index position basis e.g., the bit contained is the first index position of the binary IV setup object (BIVSO) is XOR-ed with the bit in the first index position of the binary setup object 2 (SO_2) to generate the bit in the first index position of the mask, etc. It can be appreciated that only B bits of the binary IV setup object (BIVSO) are used to generate the mask. In other embodiments, the binary setup object 2 (SO_2) is not used and B bits of the binary setup object 0 (SO_0) are used in its place to generate the mask. Of course, in other embodiments, an XNOR operation may be used instead of the XOR operation.

Figure 18:
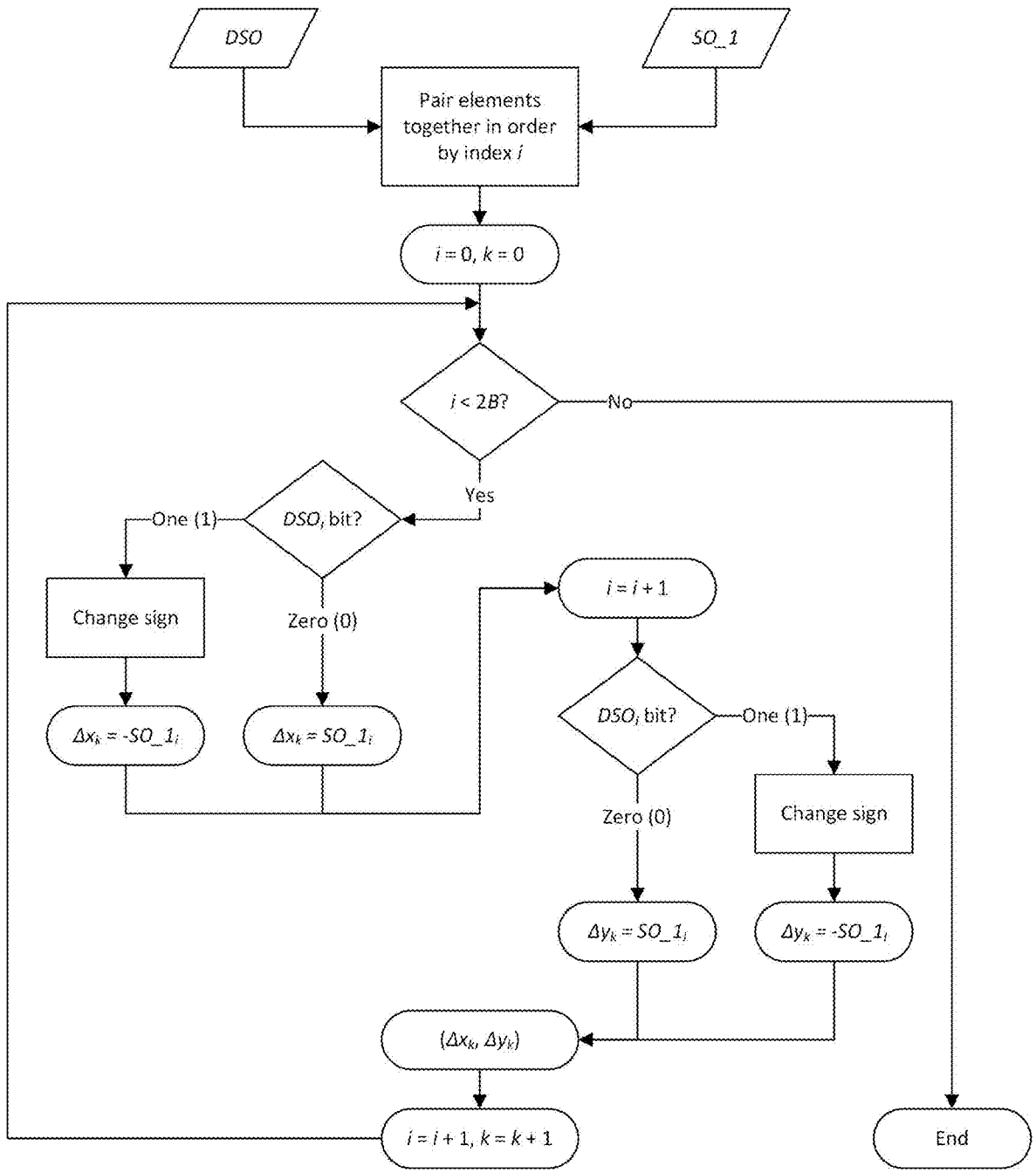
FIG. 18 depicts a process for generating a movement instructions table based on the binary object of FIG. 16 and the integer setup object 1 of FIG. 15.

Fourth, the movement instructions are generated in accordance with the flow chart shown in FIG. 18. As can be seen, the bits of the directional setup object (DSO) and the integers of the integer setup object 1 (SO_1) are paired together by index position. Examples of four such pairings are shown in Table 6 below:

TABLE 6

| Index Position (i) | 0 | 1 | 2 | 3 |
|---|---|---|---|---|
| DSO | 0 | 1 | 0 | 1 |
| SO_1 | 7 | 6 | 1 | 2 |

As shown in the flow chart, two successive pairings are interpreted as a movement instruction—i.e., an xy-coordinate representing a shift in each direction for a particular index position, denoted as ($\Delta x$, $\Delta y$). The bit of the directional setup object (DSO) determines the sign of the corresponding integer of the integer setup object 1 (SO_1)—i.e., a bit of "0" is positive and a bit of "1" is negative.

Figure 19:
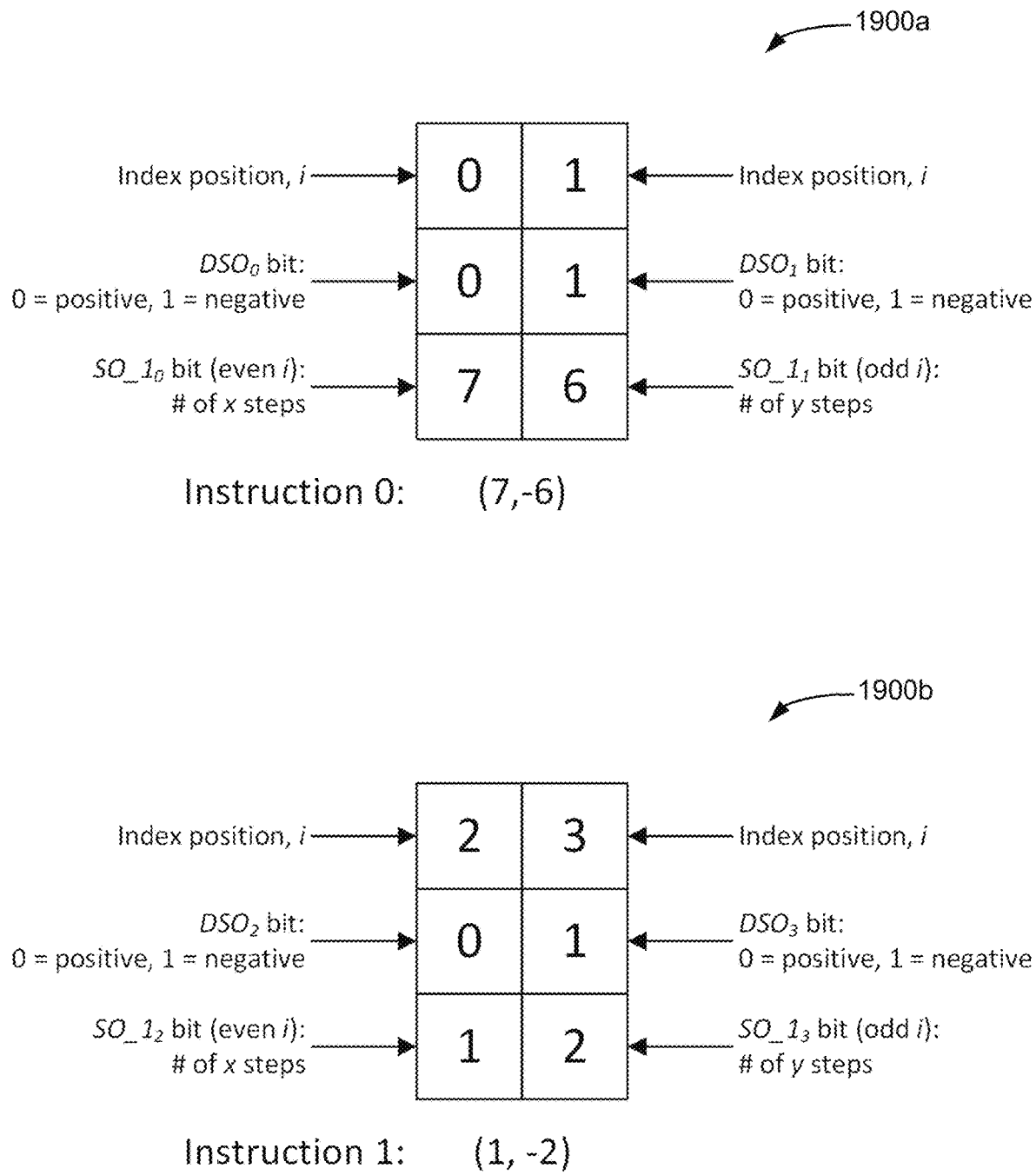
FIG. 19 depicts exemplary movement instructions that are generated using the process of FIG. 18.

Two exemplary movement instructions corresponding to the four pairings of Table 6 are shown in FIG. 19 as reference numbers 1900a and 1900b. As can be seen, the bit of $DSO_0$ (i.e., a "0" bit) and the integer of $SO\_1_0$ (i.e., the integer "7") are converted to a $\Delta x$ of 7, and the bit of $DSO_1$ (i.e., a "1" bit) and the integer of $SO\_1_1$ (i.e., the integer "6") are converted to a $\Delta y$ of −6. Thus, movement instruction 0 is (7, −6), indicating that the input index position should move right 7 positions and down 6 positions within the index block. Similarly, the bit of $DSO_2$ (i.e., a "0" bit) and the integer of $SO\_1_2$ (i.e., the integer "1") are converted to a $\Delta x$ of 1, and the bit of $DSO_3$ (i.e., a "1" bit) and the integer of $SO\_1_3$ (i.e., the integer "6") are converted to a $\Delta y$ of −2. Thus, movement instruction 1 is (1, −2), indicating that the input index position should move right 1 position and down 2 positions within the index block. This process continues until all the bits of the directional setup object (DSO) and all the integers of integer setup object 1 (SO_1) have been converted to movement instructions as described above. It should be understood that the movement instructions provide the initial remapping instructions for each of the index positions of the index block in terms of horizontal and vertical movement.

Figure 20:
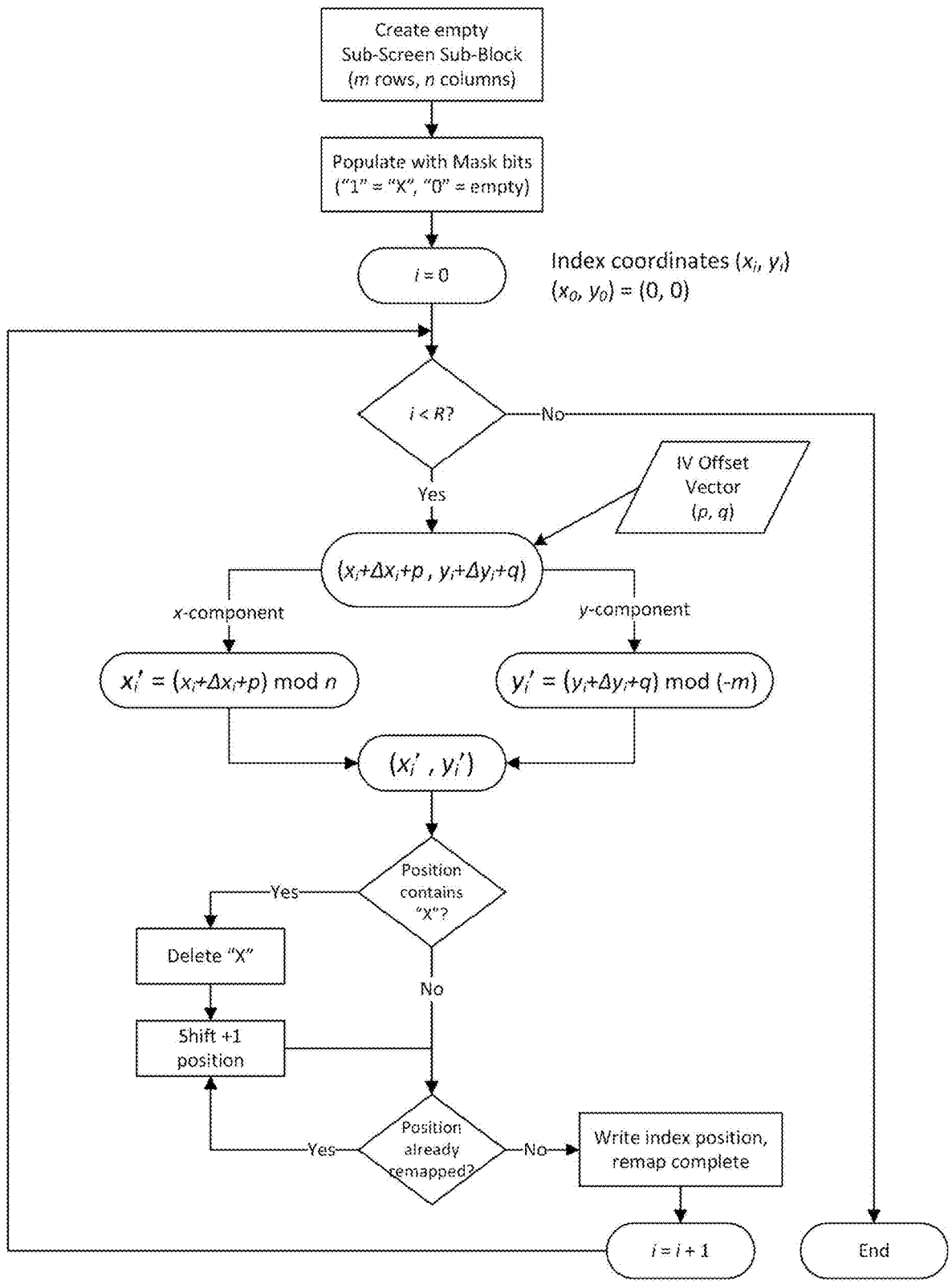
FIG. 20 depicts a process for generating sub-screen remapping relationships.

Fifth, the movements instructions, the mask, and the offset vector are used to generate the remapping relationships for each sub-screen in accordance with the flow chart shown in FIG. 20. Each sub-screen is given a number from 1 to B/R based on its order within the final full screen. Sub-screen 1 includes index positions 0 through (R−1) of the full screen, sub-screen 2 includes index positions R through (2R−1) of the full screen, sub-screen 3 includes index positions 2R through (3R−1) of the full screen, etc.

As shown in the flow chart, the process of creating the remapping relationships for each sub-screen begins by creating an empty sub-block of sub-block size R, with m rows and n columns, and pre-populating the index positions of the sub-block with the corresponding mask bits. A mask bit of "1" causes an "X" to be placed in the index position and a mask bit of "0" causes the index position to remain empty. Working in sequential order through each of the index positions, the process adds the coordinates of the input index position ($x_i, y_i$), the movement instruction ($\Delta x_i, \Delta y_i$), and the IV offset vector (p, q) to find the coordinates of the destination index position ($x_i'$, $y_i'$), as shown in the following equations:

$$x_i'=(x_i+\Delta x_i+p)\mod n$$

$$y_i'=(y_i+\Delta y_i+q)\mod(-m)$$

All x- and y-components must fall within the sub-block, and values falling outside the sub-block are adjusted using modular arithmetic.

The process then checks the contents of the destination index position ($x_i'$, $y_i'$) and proceeds in accordance with the following rules:

1. If the destination index position is empty (i.e., does not contain an "X" or a remapped input index position), then the input index position is written into that index position. The remapping relationship between the input index position and destination index position is complete, and the process starts over with the next input index position.
2. If the destination index position contains an "X," the "X" is deleted from that index position. The input index position is then shifted to the next larger index position, one position at a time, until it arrives at a destination index position that does not already contain a remapped input index position (i.e., a destination position that is either empty or contains an "X"). The input index position is then written into that index position. The remapping relationship between the input index position and destination index position is complete, and the process starts over with the next input index position.

3. If the destination index position contains a remapped input index position, the input index position is shifted to the next larger index position, one position at a time, until it arrives at a destination index position that does not already contain a remapped input index position (i.e., a destination position that is either empty or contains an "X"). The input index position is then written into that index position. The remapping relationship between the input index position and destination index position is complete, and the process starts over with the next input index position.

In the above rules, any shifting of an input index position to the next larger index position requires movement to the right and wrapping to the next row down in carriage-return fashion within the sub-block. It can be appreciated that the above process is repeated until every index position in the sub-screen contains a remapped input index position.

Figures 21, 22:
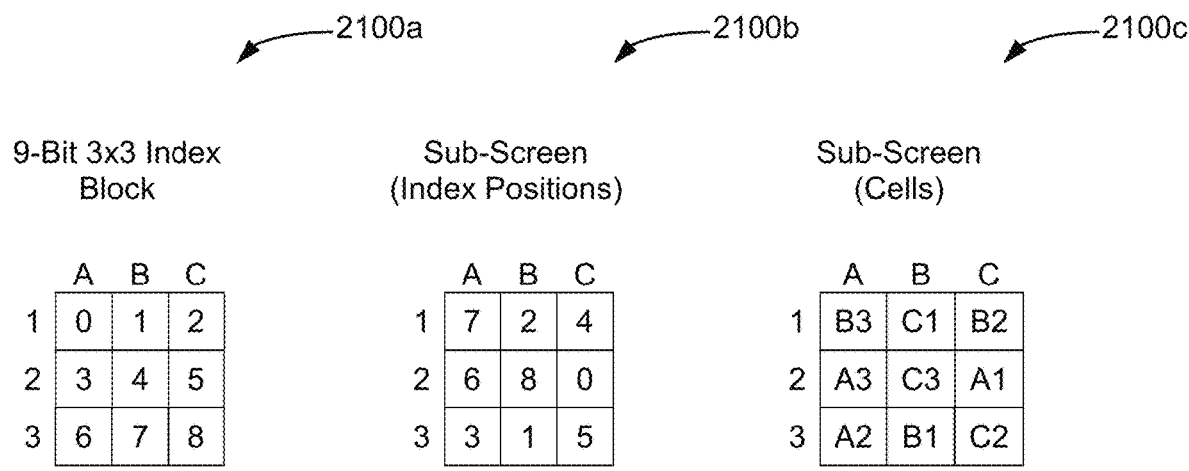
FIG. 21 depicts an index block and sub-screens with remapping relationships generated using the process of FIG. 20.
FIG. 22 depicts the sub-screen remapping relationships of FIG. 21 provided in a table format.

FIG. 21 depicts an index block 2100a having 3 rows (rows 1-3) and 3 columns (columns A-C) along with sub-screens 2100b and 2100c that were generated using the process of FIG. 20. Sub-screen 2100b shows the remapping relationships in an index position format (in which each input index position is shown in the cell of its destination index position) and sub-screen 2100c shown the remapping relationships in a cell format (in which the column and row position of each input index position is shown in the cell of its destination index position). FIG. 22 depicts these same remapping relationships in a table format.

b. Screen Assembly

Once the sub-screens of sub-block size R have been generated, they are combined to create a full screen of block size B. For the case where R=B, the full screen is the same as the single sub-screen. The screen index positions, $i_B$, relate to the sub-screen index positions, $i_R$, using the following relationship (where the sub-screens are numbered from 1 to B/R, as described above):

$$i_B = i_R + (\text{SubScreen Number} - 1) \times R$$

It should be understood that the inverse screen is generated from the screen by reversing its remapping relationships.

5. Generation of Logic Blocks

The process object set and process object parameters described above are used to generate a unique set of logic blocks for each of the data blocks to be encrypted during an encryption/decryption session. The number of logic blocks generated for each data block equals the number of process objects in the process object set (although additional process objects may be provided that are not used to generate logic blocks, as described above).

In this embodiment, each process object is used to generate a unique logic block for each of the data blocks by cyclically shifting the start bit i within the sequence of bits of the process object. For each logic block, the starting bit number i can be determined from the input block number (p), the object rate ($\rho$) of the process object, and the effective object length ($\lambda$) of the process object, using the equation provided below (wherein i and p are 0-based):

$i = p\rho \bmod \lambda$

The logic block is then populated from B bits of its source process object (truncated to X bits) starting from bit i. If there are insufficient bits remaining between i and the end of the truncated process object, the process will wraparound to the beginning of the process object.

6. Encryption and Decryption of Data Blocks

For each data segment identified for encryption, the bits of the data segment are projected into the index positions of the index block to generate a data block. As discussed above, a single bit or multiple bits may be placed in each index position. A cipher is then used to encrypt the data blocks in accordance with an encryption scheme that applies the screen and logic blocks as described above—wherein the number and order of application of the screen and logic blocks will vary depending on the implementation.

Figure 23:
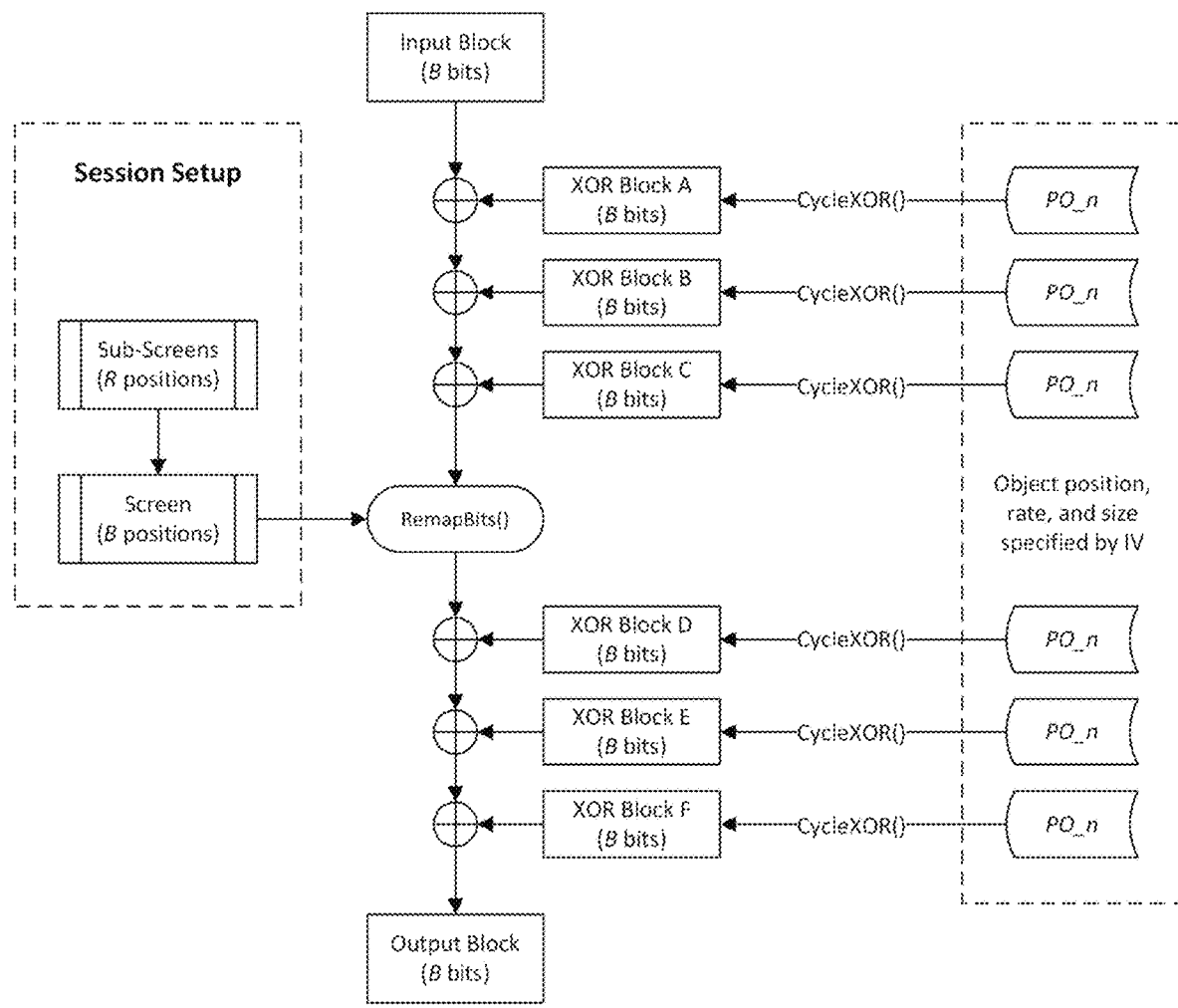
FIG. 23 depicts an exemplary encryption scheme of a cipher.

FIG. 23 depicts an exemplary encryption scheme of a cipher that utilizes the following operations: (1) a CycleXOR( ) operation that generates the XOR block for each successive input data block by cyclically shifting the start bit of the corresponding project object; (2) an AddXOR( ) operation (shown by the XOR symbol $\oplus$) that adds an XOR block to the input data block or an intermediate state data block using a bitwise XOR logical operation; and (3) a RemapBits( ) operation that applies the screen to an intermediate state data block using a bit remapping operation that may be performed bitwise or bytewise.

In this example, the encryption scheme uses one screen and six XOR blocks—i.e., three XOR blocks (XOR Block A, XOR Block B and XOR Block C) are positioned before the RemapBits( ) operation at the front of the cipher and three XOR blocks (XOR Block D, XOR Block E and XOR Block F) are positioned after the RemapBits( ) operation at the back of the cipher. As described above, the process object parameters in the initialization vector include an object position for each process object, which determines the position of the XOR block within the cipher. Alternately, this position information may be set in the overall configuration of the encryption scheme and excluded from the initialization vector.

The encryption scheme occurs in one transformation round that includes the following steps: (1) the AddXOR( ) operation adds the front XOR blocks to the input data block to generate a first intermediate state data block; (2) the RemapBits( ) operation applies the screen to the first intermediate state data block to generate a second intermediate state data block; and (3) the AddXOR( ) operation adds the back XOR blocks to the second intermediate state block to generate the output data block. The front three XOR blocks may be added to the input data block in any order due to the commutative property of the XOR logical operation. Similarly, the back three XOR blocks may be added to the second intermediate state data block in any order due to the commutative property of the XOR logical operation.

In this embodiment, the maximum number of input data blocks ($\Phi$) that can be securely sent through the encryption scheme in one encryption session is dependent on the number of process objects (N) used in the encryption scheme and the effective object length ($\lambda$) of each process object (wherein the effective object length ($\lambda$) of each process object is a distinct integer equal to a prime number greater than 2B), as follows:

$$\Phi = \prod_{n=0}^{N-1} \lambda_n$$

It should be understood that the maximum number of input data blocks (Φ) represents the maximum number of unique permutations of the bits of the process objects that are used to create the XOR blocks. Of course, a larger number of input data blocks may be sent through the encryption scheme in one encryption session in implementations that do not require such a high level of data security. A smaller number of input data blocks may also be used.

Figure 24:
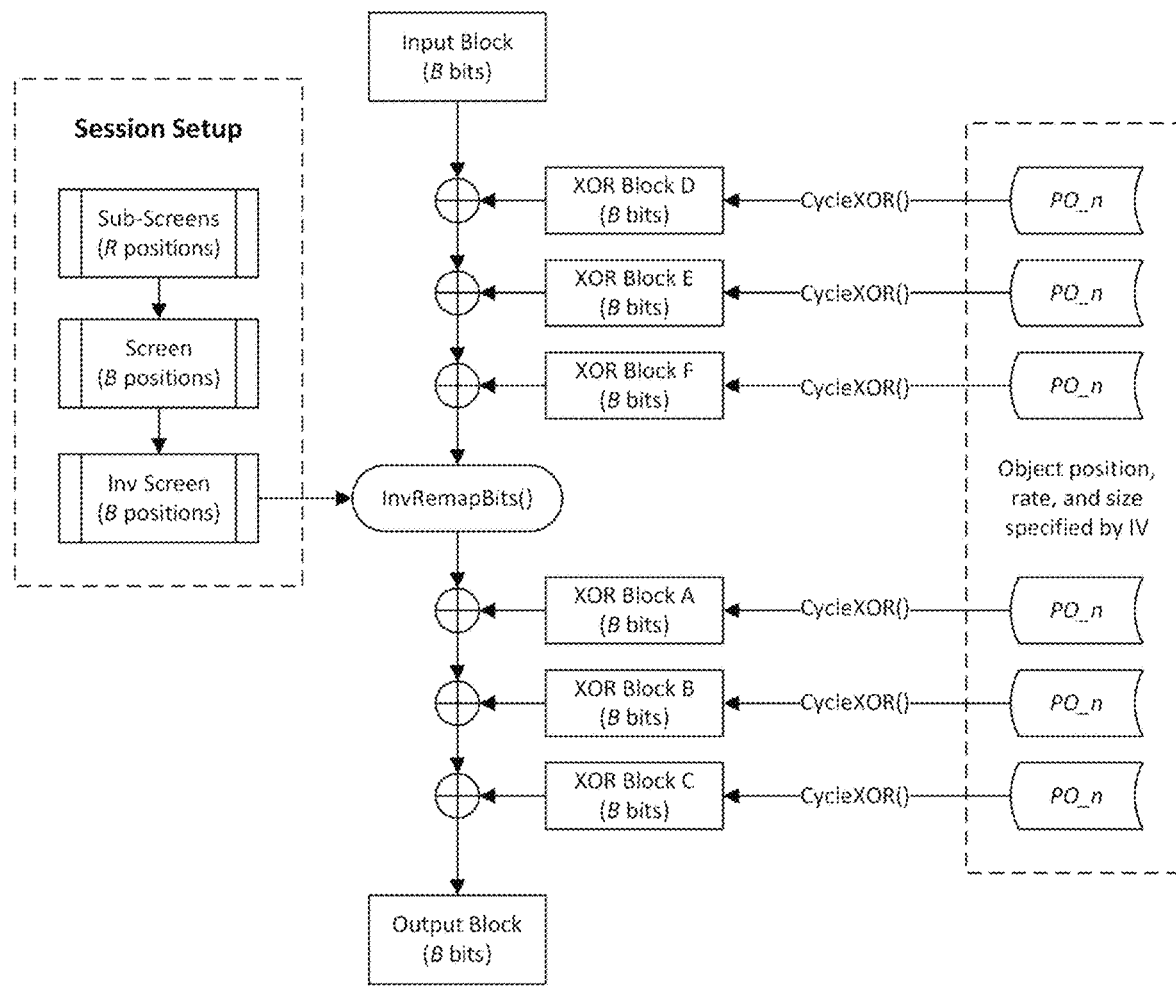
FIG. 24 depicts an exemplary decryption scheme of an inverse cipher.

FIG. 24 depicts an exemplary decryption scheme of an inverse cipher that utilizes the following operations: (1) a CycleXOR( ) operation that generates the XOR block for each successive input data block by cyclically shifting the start bit of the corresponding project object; (2) an AddXOR( ) operation (shown by the XOR symbol ⊕) that adds an XOR block to the input data block or an intermediate state data block using a bitwise XOR logical operation; and (3) an InvRemapBits( ) operation that applies the inverse screen to an intermediate state data block using a bit remapping operation that may be performed bitwise or bytewise.

In this example, the decryption scheme uses one inverse screen and the six XOR blocks used in the encryption scheme—i.e., three XOR blocks (XOR Block D, XOR Block E and XOR Block F) are positioned before the InvRemapBits( ) operation at the front of the inverse cipher and three XOR blocks (XOR Block A, XOR Block B and XOR Block C) are positioned after the InvRemapBits( ) operation at the back of the inverse cipher. Notably, the positions of the front and back XOR blocks are reversed compared to the positions of those same XOR blocks in the encryption scheme.

The decryption scheme occurs in one transformation round that includes the following steps: (1) the AddXOR( ) operation adds the front three XOR blocks to the input data block to generate a first intermediate state data block; (2) the InvRemapBits( ) operation applies the inverse screen to the first intermediate state data block to generate a second intermediate state data block; and (3) the AddXOR( ) operation adds the back three XOR blocks to the second intermediate state block to generate the output data block. The front three XOR blocks may be added to the input data block in any order due to the commutative property of the XOR logical operation. Similarly, the back three XOR blocks may be added to the second intermediate state data block in any order due to the commutative property of the XOR logical operation.

7. Example

Figure 25:
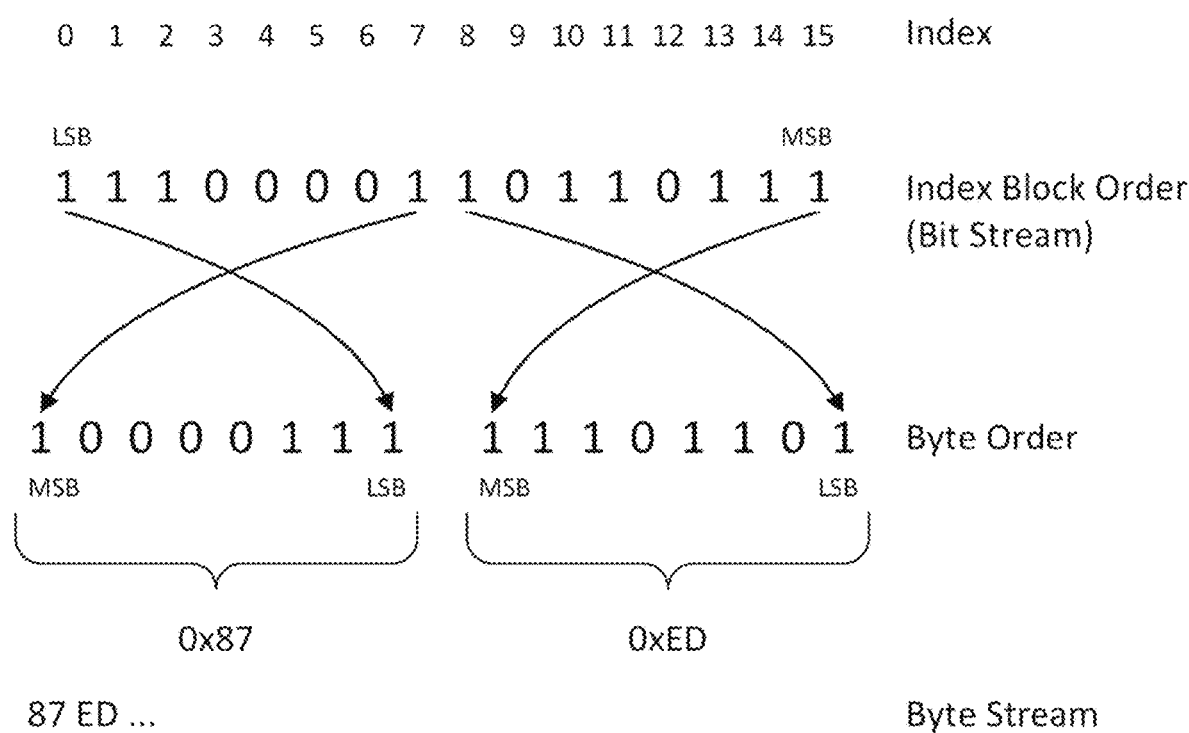
FIG. 25 depicts a bit stream and byte stream notation.
Figure 34A:
Figure 34B:
Figure 34C:

An example of this embodiment will be described with reference to FIGS. 26 to 41A-41F, some of which depict data as both a bit stream and a byte stream. As shown in FIG. 25, a bit stream is shown in index block order, with the Least-Significant Bit (i=0) on the left end of the stream and the Most-Significant Bit on the right end of the stream. To create a byte stream, the bits of the bit stream are grouped so that each group contains 8 bits, the bits are reversed within each 8-bit group, and each 8-bit group is converted to hexadecimal.

Configuration:

The configuration to be used in this example includes the block size, sub-block size, number of sub-blocks, and number of XOR blocks shown in Table 7 below:

TABLE 7

| Block Size (B) | Sub-Block Size (R) | # Sub-Blocks (B/R) | # XOR Blocks (N) |
|---|---|---|---|
| 128 bits (8 × 16) | 16 bits (4 × 4) | 8 | 6 |

Setup Object Set, Process Object Set, and Initialization Vector:

FIG. 26 depicts the setup object set to be used in this example—i.e., a binary setup object 0 (SO_0), an integer setup object 1 (SO_1), and a binary setup object 2 (SO_2). FIGS. 27A-27B depict the process object set to be used in this example—i.e., a process object 0 (PO_0), a process object 1 (PO_1), a process object 2 (PO_2), a process object 3 (PO_3), a process object 4 (PO_4), and a process object 5 (PO_5). FIG. 28 depicts an initialization vector to be used in this example—i.e., a binary IV setup object (BIVSO), an IV offset vector (p, q), and process object parameters.

Generation of Mask and DSO:

FIG. 29 depicts a mask generated in accordance with the XOR logical operation shown in FIG. 17 using the binary IV setup object (BIVSO) of FIG. 28 and the binary setup object 2 (SO_2) of FIG. 26. FIG. 30 depicts a directional setup object (DSO) generated in accordance with the XOR logical operation shown in FIG. 16 using the binary IV setup object (BIVSO) of FIG. 28 and the binary setup object 0 (SO_0) of FIG. 26.

Generation of Movement Instructions and Masks for Sub-Screens:

FIGS. 31A-31B depicts the bitwise pairing of the directional setup object (DSO) of FIG. 30 and the integer setup object 1 (SO_1) of FIG. 26. FIGS. 32A and 32B depict movement instructions for sub-screens 1-8 that are generated using the process of FIG. 18. FIG. 33 depicts the masks to be used with sub-screens 1-8 that are generated from the mask of FIG. 29. It can be seen that each "1" mask bit is shown as an "X" and each "0" mask bit is shown as blank.

Generation of Sub-Screens:

FIGS. 34A-34D depict the process of generating the remapping relationships for sub-screen 1 using the process of FIG. 20. For each index position in sub-screen 1, an instruction is provided that shows the initial position, the preliminary position prior to application of the mask for sub-screen 1, and the final position after application of the mask for sub-screen 1. Note that a mask bit that was previously a "1" but was changed to a "0" (in accordance with the process for checking the contents of the destination index position $(x_i', y_i')$, as described above) is shown as a "Y." It should be understood that the same process may be used to generate the remapping relationships for sub-screens 2-8. FIG. 35 depicts sub-screens 1-8 that are generated using the process of FIG. 20.

Generation of Screen and Inverse Screen:

FIG. 36 depicts a screen that is generated from assembling sub-screens 1-8 of FIG. 35. FIG. 37 depicts the screen of FIG. 36 provided with both index positions and cell references. FIG. 38 depicts the inverse screen corresponding to the screen of FIG. 37 provided with both index positions and cell references.

Generation of XOR Blocks:

FIGS. 39A-39B depict the generation of XOR blocks for input data block 0, input data block 1, and input data block 2 (i.e., six XOR blocks for each input data block) using the process objects of FIGS. 27A-27B and the process object parameters of FIG. 28. It should be understood that the same approach may be used to generate the six XOR blocks for each of the additional input data blocks.

Data Encryption and Decryption:

FIGS. 40A-40F depict the process of encrypting input data block 0, input data block 1, and input data block 2 using the screen of FIG. 37 and the XOR blocks of FIGS. 39A-39B in accordance with the encryption scheme of FIG. 23. It should be understood that the same process may be used to encrypt additional input data blocks. FIGS. 41A-41F depict the process of decrypting input data block 0, input data block 1, and input data block 2 using the inverse screen of FIG. 38 and the XOR blocks of FIGS. 39A-39B in accordance with the decryption scheme of FIG. 24. It should be understood that the same process may be used to decrypt additional input data blocks.

It should be understood that implementation of this embodiment is not limited to the example provided above and that a variety of other examples are possible within the scope of the present invention. For example, the configuration may use other block sizes, sub-block sizes, number of sub-blocks, and number of XOR blocks. Also, XNOR blocks may be used in place of XOR blocks. In addition, other encryption and decryption schemes may be used. Other modifications will be apparent to one skilled in the art.

II. COMPUTING DEVICES AND SYSTEMS

Figure 42:
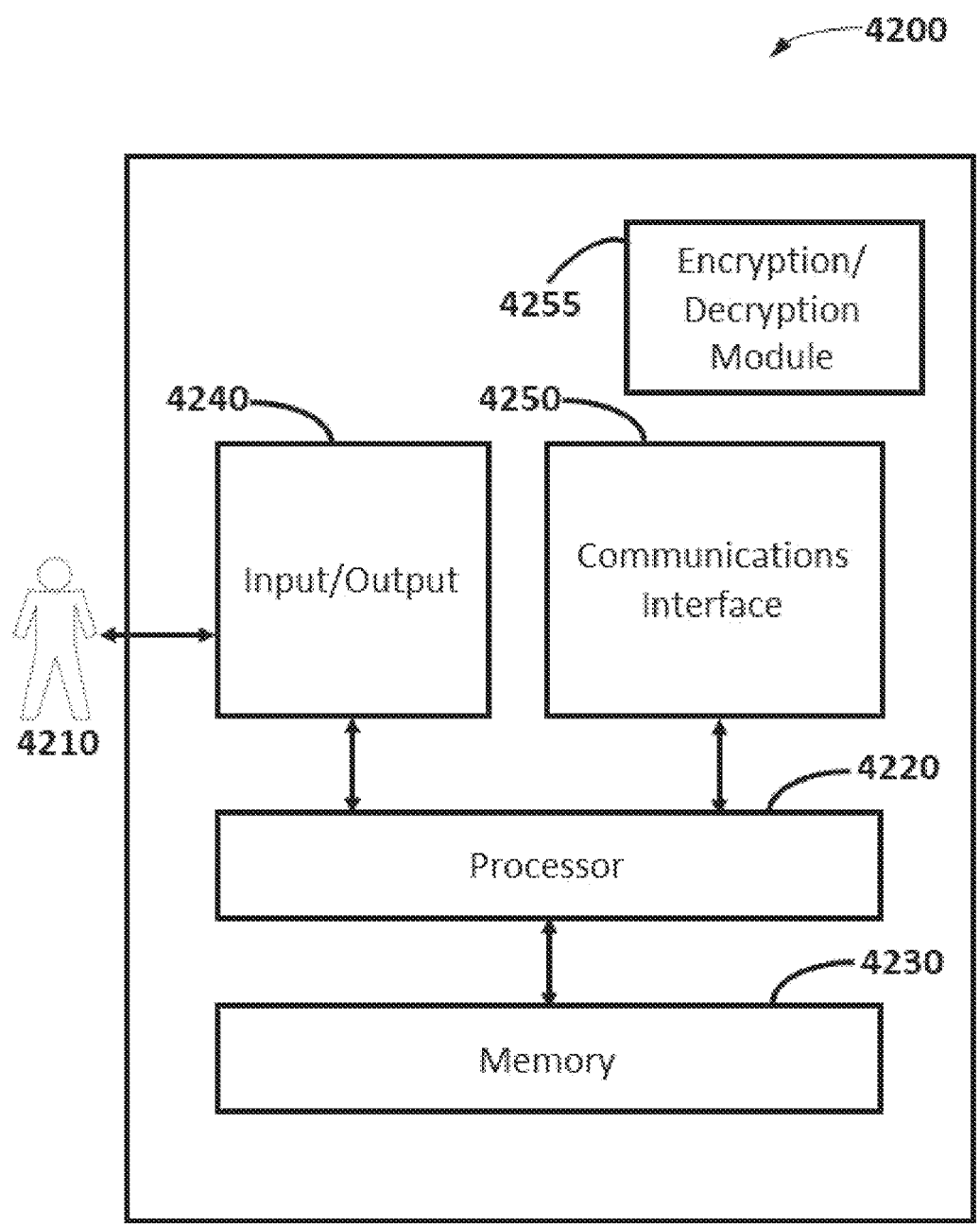
FIG. 42 is a block diagram of an exemplary computing device that enables the encryption and decryption of data.

FIG. 42 illustrates an exemplary computing device 4200 that enables the encryption of data for storage or transport in accordance with the different embodiments of the present invention. Computing device 4200 may comprise any type of computing device capable of performing the functions described herein, including, but not limited to, desktop computing devices, laptop computing devices, computing peripheral devices, smart phones, wearable computing devices, medical computing devices, tablet computing devices, mobile computing devices, vehicular computing devices, and the like. While exemplary components of computing device 4200 will be described below, it should be understood that other components with characteristics that are more or less advanced or functional than those of the described components may alternatively be used in accordance with the present invention.

In the exemplary configuration shown in FIG. 42, computing device 4200 is operated by a user 4210 and generally includes the following components: a processor 4220, a memory area 4230, an input/output unit 4240, a communications interface 4250, and an encryption/decryption module 4255. Of course, other components may also be provided depending on the configuration of the computing device. Each of the components shown in FIG. 42 will be described below.

Processor 4220 is configured to execute instructions stored in memory area 4230 and functions to control input/output unit 4240 and communications interface 4250. The processor may comprise central processing units, microprocessors, microcontrollers, reduced instruction set circuits (RISC), application specific integrated circuits (ASIC), logic circuits (e.g., field-programmable gate array), and any other circuit or processor capable of executing the functions described herein. Processor 4220 may also include one or more processing units, for example, a multi-core configuration. Memory area 4230 may comprise any type of memory that allows data and executable instructions to be stored and retrieved, such as a flash memory drive, digital versatile disc (DVD), compact disc (CD), fixed (hard) drive, diskette, optical disk, magnetic tape, or semiconductor memory such as read-only memory (ROM). The encrypted data blocks generated in accordance with the present invention may be stored in memory area 4230 in any format, including structured formats (e.g., structured files or databases) or unstructured formats.

Preferably, data passing from processor 4220 to memory area 4230 is encrypted via the application of a screen and one or more logic blocks and, conversely, encrypted data passing from memory area 4230 to processor 4220 is decrypted via the application of an inverse screen and one or more logic blocks. The data may be encrypted and decrypted at the file system layer so that the screens and/or logic blocks are applied to all reads and writes to the file system. Alternatively, the encryption and decryption may operate below the file system layer using, for example, a volume manager.

Input/output unit 4240 is configured to receive information from and provide information to user 4210. In some examples, input/output unit 4240 may include an output adapter such as a video adapter and/or an audio adapter. Input/output unit 4240 may alternatively include an output device such as a display device, a liquid crystal display (LCD), an organic light emitting diode (OLED) display, an "electronic ink" display, and/or an audio output device such as a speaker or headphones. Input/output unit 4240 may also include any device, module, or structure for receiving input from user 4210, including, but not limited to, a keyboard, a pointing device, a mouse, a stylus, a touch sensitive panel, a touch pad, a touch screen, a gyroscope, an accelerometer, a position detector, or an audio input device. A single component such as a touch screen may function as both an output device and an input device. Input/output unit 4240 may further include multiple sub-components for carrying out the input and output functions. In other examples, input/output unit 4240 may be of limited functionality or non-functional as in the case of some wearable computing devices.

Communication interface 4250 is configured to enable communication with a remote device, such as a remote server, a remote computing device, or any other suitable system. Communication interface 4250 may include, for example, a wired or wireless network adapter or a wireless data transceiver for use with a mobile data network or Worldwide Interoperability for Microwave Access (WiMAX).

Encryption/decryption module 4255 is configured to enable the encryption, decryption, and data security functions described herein. Specifically, encryption/decryption module 4255 includes instructions that are executed by processor 4220 to generate the screens, inverse screens and logic blocks and then apply those screens, inverse screens and logic blocks to encrypt and decrypt a plurality of data blocks, as described generally above.

Figure 43:
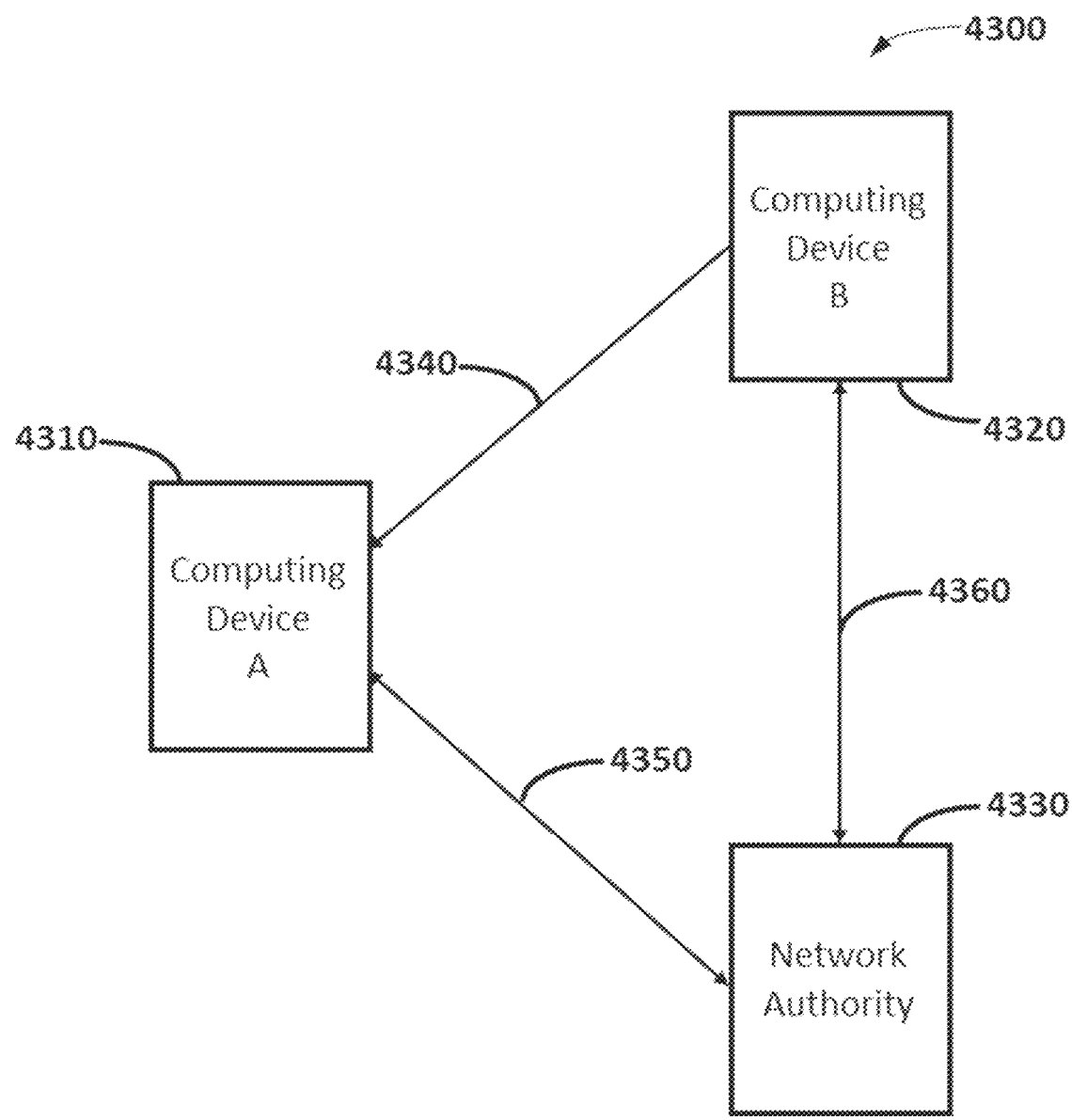
FIG. 43 is a block diagram of an exemplary system that enables the transport of encrypted data between first and second computing devices.

FIG. 43 is a block diagram of an exemplary system 4300 that enables the transport of encrypted data between a first computing device 4310 and a second computing device 4320 in accordance with the present invention. The configurations of first computing device 4310 and second computing device 4320 are the same as that of computing device 4200 shown in FIG. 42. In system 4300, a network authority 4330 is also provided to manage transport level encryption for data transmitted between first computing device 4310 and second computing device 4320.

As can be seen, first computing device 4310 is in communication with second computing device 4320 via a communication link 4340. Also, first computing device 4310 is in communication with network authority 4330 via a communication link 4350 and, similarly, second computing device 4320 is in communication with network authority 4330 via a communication link 4360. Communication links 4340, 4350 and 4360 represent any suitable wired or wireless communication links known in the art, including, but not limited to, those provided by the Internet or any other computer network.

Figure 44:
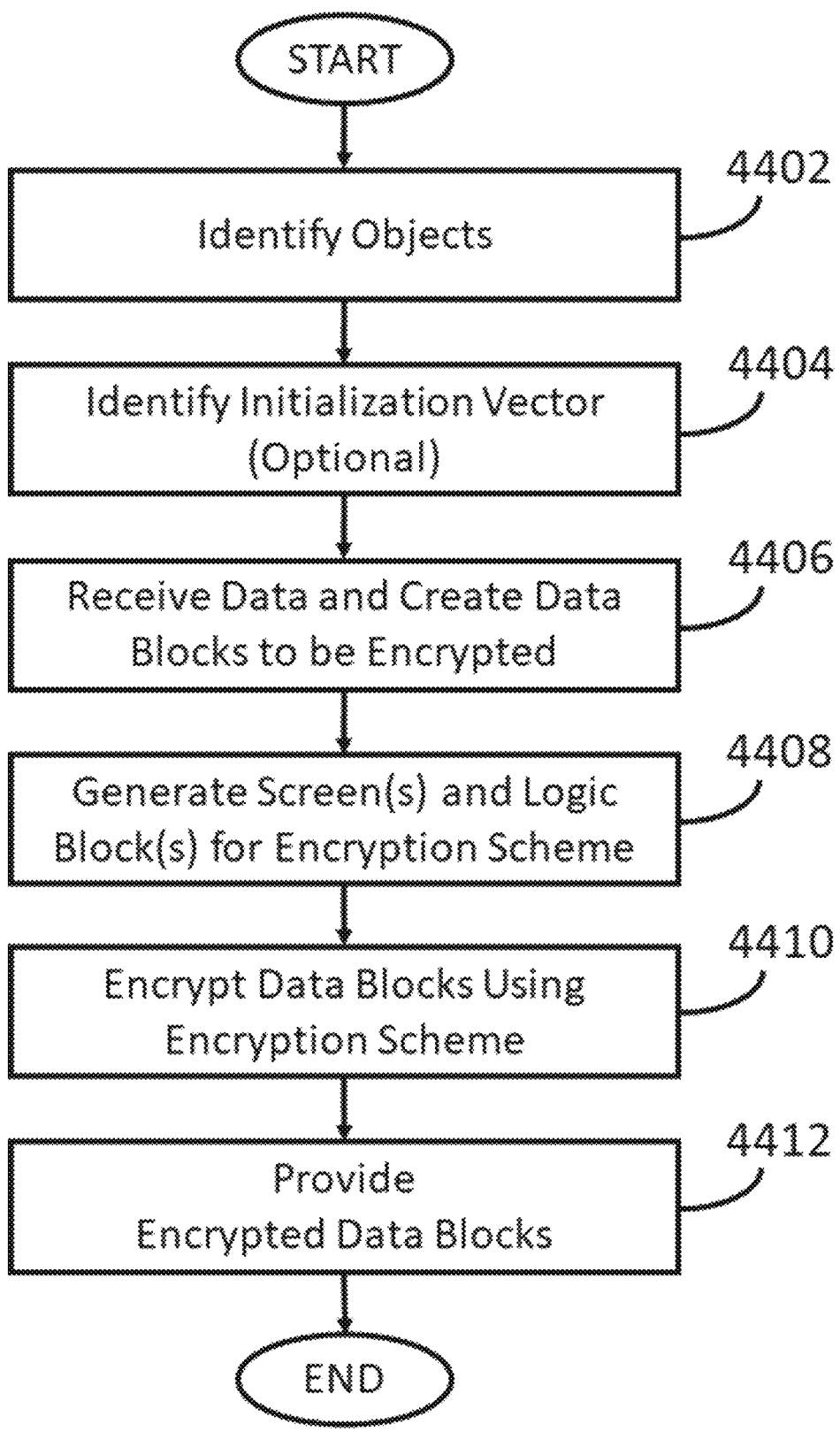
FIG. 44 is a flowchart of an exemplary data encryption method performed by the computing device of FIG. 42 or one of the computing devices of FIG. 43.

FIG. 44 is a flowchart of an exemplary data encryption method performed by computing device 4200 of FIG. 42 (or one of the computing devices of FIG. 43). In step 4402, computing device 4200 identifies the objects to be used in the encryption scheme. As described above, the objects may comprise a binary object and an integer object, a single set of values from which a binary object and an integer object may be derived, or a setup object set and process object set. In step 4404, computing device 4200 identifies an initialization vector to be used in the encryption scheme. It should be understood that this step is not required for certain embodiments of the invention.

In step 4406, computing device 4200 receives data, identifies a plurality of data segments to be encrypted, and positions the bits of the data segments within index blocks to generate a plurality of data blocks. In step 4408, computing device 4200 generates one or more screen(s) and logic block(s) to be used in the encryption scheme. In step 4410, computing device 4200 encrypts each of the data blocks by applying the screen(s) and logic block(s) in accordance with the encryption scheme. Finally, in step 4412, computing device 4200 provides the encrypted data blocks for storage in memory area 4230. Alternatively, computing device 4200 may transport the encrypted data blocks to another computing device or to a remote server for storage.

Figure 45:
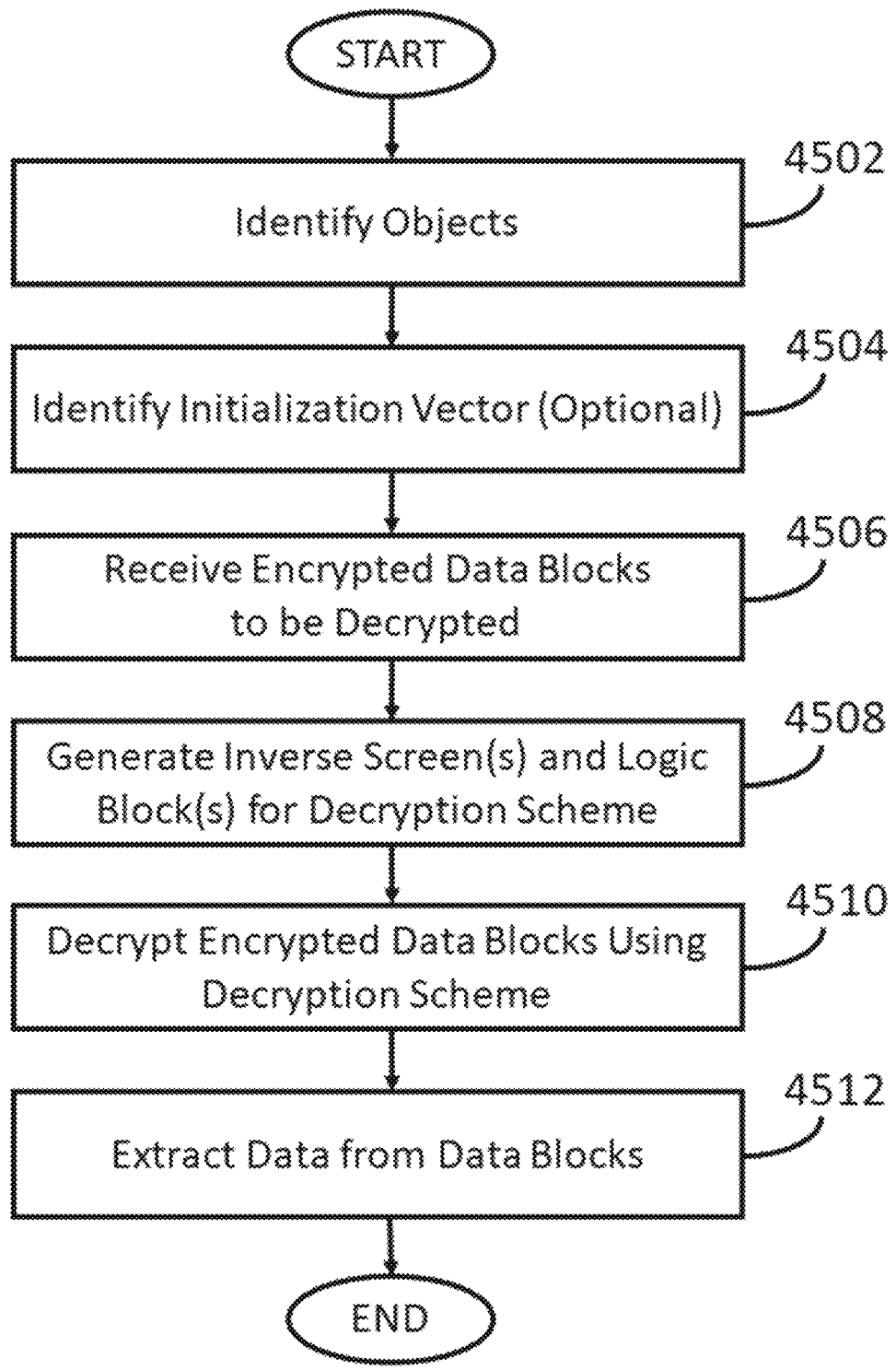
FIG. 45 is a flowchart of an exemplary data decryption method performed by the computing device of FIG. 42 or one of the computing devices of FIG. 43.

FIG. 45 is a flowchart of an exemplary data decryption method performed by computing device 4200 of FIG. 42 (or one of the computing devices of FIG. 43). In step 4502, computing device 4200 identifies the objects to be used in the decryption scheme. As described above, the objects may comprise a binary object and an integer object, a single set of values from which a binary object and an integer object may be derived, or a setup object set and process object set. In step 4504, computing device 4200 identifies an initialization vector to be used in the decryption scheme. It should be understood that this step is not required for certain embodiments of the invention.

In step 4506, computing device 4200 receives previously encrypted data blocks to be decrypted. In step 4508, computing device 4200 generates one or more screen(s) and logic block(s) to be used in the decryption scheme. In step 4510, computing device 4200 decrypts each of the data blocks by applying the screen(s) and logic block(s) in accordance with the decryption scheme. Finally, in step 4512, computing device 4200 extracts the data from the decrypted data blocks in order to allow authorized users (e.g., users with the appropriate objects) to access the data.

One skilled in the art will appreciate that the data encryption and decryption methods described above in connections with FIGS. 44 and 45 may be implemented using any computer programming or engineering techniques including computer software, firmware, hardware or any combination or subset thereof. Any computer program, having computer-readable code means, may be embodied or provided within one or more computer-readable media, thereby making a computer program product, i.e., an article of manufacture. Computer-readable storage media are tangible and non-transitory and store information such as computer-readable instructions, data structures, program modules, and other data.

Computing devices that implement the encryption and decryption methods of the present invention provide several advantages that are not available from many existing encryption/decryption methodologies. For example, the encryption and decryption methods support error correcting code so as to increase reliability. Also, the encryption and decryption methods increase the efficiency and reduce the power consumption of the computing device, and may increase throughput—i.e., the amount of data moved from one place to another in a given time period. In addition, the encryption and decryption methods are flexible and may provide increased data security. Further, the encryption and decryption methods enable the use of smaller block sizes to support lower-latency applications. Finally, the encryption and decryption methods enable a larger volume of data to be secured by selecting a larger quantity of logic blocks and/or larger process objects that provide larger effective object lengths. Of course, other advantages will be apparent to one skilled in the art.

III. GENERAL INFORMATION

The description set forth above provides several exemplary embodiments of the inventive subject matter. Although each exemplary embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The use of any and all examples or exemplary language (e.g., "such as") provided with respect to certain embodiments is intended merely to better describe the invention and does not pose a limitation on the scope of the invention. No language in the description should be construed as indicating any non-claimed element essential to the practice of the invention.

The use of relative relational terms, such as first and second, top and bottom, and left and right, are used solely to distinguish one unit or action from another unit or action without necessarily requiring or implying any actual such relationship or order between such units or actions. For example, while the index blocks referenced herein require a certain spatial relationship between index positions of the index blocks, any equivalent structures may be used. Also, as described herein, the objects do not require any particular format, size, or definition other than to allow for the creation of the screens as described herein.

The use of the terms "comprises," "comprising," or any other variation thereof, are intended to cover a non-exclusive inclusion, such that a process, method, device, or system that comprises a list of elements does not include only those elements, but may include other elements not expressly listed or inherent to such process, method, device, or system.

While the present invention has been described and illustrated hereinabove with reference to several exemplary embodiments, it should be understood that various modifications could be made to these embodiments without departing from the scope of the invention. Therefore, the present invention is not to be limited to the specific configurations

What is claimed and desired to be secured by Letters Patent is as follows:

1. A data encryption method, comprising:
    creating a plurality of data blocks each of which comprises a plurality of bits;
    generating a plurality of exclusive OR (XOR) blocks for each of the data blocks, wherein the XOR blocks are configured for use in a bit modification operation;
    generating at least one screen configured for use in a bit remapping operation; and
    encrypting the data blocks in accordance with an encryption scheme that transforms a data block into an encrypted data block by: (a) performing the bit modification operation on the data block using one or more of the XOR blocks generated for the data block to thereby generate a first intermediate state data block; (b) performing the bit remapping operation on the first intermediate state data block using the at least one screen to thereby generate a second intermediate state data block; and (c) performing the bit modification operation on the second intermediate state data block using one or more of the XOR blocks generated for the data block to thereby generate the encrypted data block.

2. The data encryption method of claim 1, further comprising:
    identifying a plurality of process objects each of which comprises a sequence of process bits, wherein each of the process objects is used to generate one of the XOR blocks for each of the data blocks.

3. The data encryption method of claim 2, wherein a number of the process objects equals a number of the XOR blocks generated for each of the data blocks.

4. The data encryption method of claim 2, wherein each of the process objects is associated with one of a plurality of object positions, and wherein the XOR blocks generated for each of the data blocks are applied in an order determined by the object positions.

5. The data encryption method of claim 2, wherein generating the XOR blocks for each of the data blocks comprises cyclically shifting a start bit within the sequence of process bits of each of the process objects.

6. The data encryption method of claim 5, wherein each of the process objects is associated with one of a plurality of effective object sizes and one of a plurality of object rates, and wherein the start bit within the sequence of process bits of a particular process object is calculated for a particular data block based on (i) a data block number, (ii) the one of the effective object sizes associated with the process object, and (iii) the one of the object rates associated with the process object.

7. The data encryption method of claim 1, wherein the bits of each of the data blocks are positioned in an index block comprising a plurality of index positions.

8. The data encryption method of claim 7, wherein each of the index positions contains one of the bits.

9. The data encryption method of claim 7, wherein each of the index positions contains a plurality of the bits.

10. The data encryption method of claim 7, wherein the screen identifies a correspondence between a plurality of initial index positions and a plurality of remapped index positions within the index block.

11. The data encryption method of claim 10, wherein the screen is generated based on a first object and a second object, wherein the first object comprises a sequence of bits and the second object comprises a sequence of integers.

12. The data encryption method of claim 11, wherein the first object is generated from a public binary setup object and a private binary setup object.

13. The data encryption method of claim 12, wherein the public binary setup object is unique to an encryption session.

14. The data encryption method of claim 11, wherein the second object comprises a private integer setup object.

15. The data encryption method of claim 11, wherein the screen is generated based on a set of movement instructions in which the bits of the first object are paired with the integers of the second object to create a set of bit/integer pairs, wherein the bit of each of the bit/integer pairs indicates a direction of bit movement within the index block and the integer of each of the bit/integer pairs indicates an offset of bit movement within the index block.

16. The data encryption method of claim 15, wherein the screen is further generated based on a mask.

17. The data encryption method of claim 16, wherein the screen is further generated based on an offset vector.

18. The data encryption method of claim 17, wherein the offset vector comprises a public integer pair that is unique to an encryption session.

19. The data encryption method of claim 1, further comprising one or both of (a) storing the encrypted data block as a representation of the data block and (b) transporting the encrypted data block as a representation of the data block.

20. The data encryption method of claim 1, wherein the encryption scheme is implemented in a single round.

21. A data encryption and decryption method, comprising:
    creating a plurality of data blocks each of which comprises a plurality of bits, wherein the bits of each of the data blocks are positioned in an index block comprising a plurality of index positions;
    generating at least first and second logic blocks for each of the data blocks;
    generating at least one encryption screen for each of the data blocks, wherein the encryption screen identifies a correspondence between a plurality of initial index positions and a plurality of remapped index positions within the index block;
    generating at least one decryption screen for each of the data blocks, wherein the decryption screen identifies a correspondence between the remapped index positions and the initial index positions within the index block;
    encrypting the data blocks into a plurality of corresponding encrypted data blocks in accordance with an encryption scheme that applies the at least first and second logic blocks and the encryption screen for each of the data blocks, wherein the first logic block is applied before the encryption screen and the second logic block is applied after the encryption screen; and
    decrypting the encrypted data blocks into the corresponding data blocks in accordance with a decryption scheme that applies the at least first and second logic blocks and the decryption screen for each of the data blocks, wherein the second logic block is applied before the decryption screen and the first logic block is applied after the decryption screen.

22. The data encryption and decryption method of claim 21, further comprising:
    identifying a first process object and a second process object each of which comprises a sequence of process bits, wherein the first and second process objects are used to generate the first and second logic blocks, respectively, for each of the data blocks.

23. The data encryption and decryption method of claim 22, wherein the first process object is associated with a first object position and the second process object is associated with a second object position, and wherein the first and second logic blocks generated for each of the data blocks are applied in an order determined by the first and second object positions.

24. The data encryption and decryption method of claim 22, wherein generating the first and second logic blocks for each of the data blocks comprises cyclically shifting a start bit within the sequence of process bits of each of the first and second process objects.

25. The data encryption and decryption method of claim 24, wherein:
the first process object is associated with a first effective object size and a first object rate, and wherein the start bit within the sequence of process bits of the first process object is calculated for a particular data block based on (i) a data block number, (ii) the first effective object size, and (iii) the first object rate; and
the second process object is associated with a second effective object size and a second object rate, and wherein the start bit within the sequence of process bits of the second process object is calculated for a particular data block based on (i) a data block number, (ii) the second effective object size, and (iii) the second object rate.

26. The data encryption and decryption method of claim 21, wherein each of the index positions contains one of the bits.

27. The data encryption and decryption method of claim 21, wherein each of the index positions contains a plurality of the bits.

28. The data encryption and decryption method of claim 21, wherein the encryption scheme and the decryption scheme are each implemented in a single round.

29. A data encryption method, comprising:
creating a plurality of data blocks each of which comprises a plurality of bits; and
encrypting the data blocks in accordance with an encryption scheme that transforms a data block into an encrypted data block by: (a) modifying the bits of the data block to thereby generate a first intermediate state data block; (b) remapping the modified bits of the first intermediate state data block to thereby generate a second intermediate state data block; and (c) modifying the remapped bits of the second intermediate state data block to thereby generate the encrypted data block, wherein the encryption scheme is implemented in a single round.

30. The data encryption method of claim 29, further comprising one or both of (a) storing the encrypted data block as a representation of the data block and (b) transporting the encrypted data block as a representation of the data block.

31. A data encryption method, comprising:
identifying at least one process object comprising a sequence of process bits;
using the process object to generate a plurality of logic blocks configured for use in a bit modification operation, wherein the logic blocks are generated by cyclically shifting a start bit within the sequence of process bits of the process object; and
encrypting a plurality of data blocks in accordance with an encryption scheme that performs the bit modification operation in connection with each of the data blocks using one of the logic blocks.

32. The data encryption method of claim 31, wherein each of a plurality of process objects is used to generate a plurality of logic blocks, and wherein the encryption scheme performs the bit modification operation in connection with each of the data blocks using one of the logic blocks generated from each of the process objects.

33. The data encryption method of claim 32, wherein a number of the process objects equals a number of the logic blocks generated for each one of the data blocks.

34. The data encryption method of claim 32, wherein each of the process objects is associated with one of a plurality of object positions, and wherein the logic blocks generated for each of the data blocks are applied in an order determined by the object positions.

35. The data encryption method of claim 32, wherein each of the process objects is associated with one of a plurality of effective object sizes and one of a plurality of object rates, and wherein the start bit within the sequence of process bits of a particular process object is calculated for a particular data block based on (i) a data block number, (ii) the one of the effective object sizes associated with the process object, and (iii) the one of the object rates associated with the process object.

36. The data encryption method of claim 31, wherein the logic block comprises an exclusive OR (XOR) block.

37. The data encryption method of claim 31, wherein each of the data blocks comprises a plurality of bits positioned in an index block comprising a plurality of index positions.

38. The data encryption method of claim 37, wherein each of the index positions contains one of the bits.

39. The data encryption method of claim 37, wherein each of the index positions contains a plurality of the bits.

40. The data encryption method of claim 37, wherein the encryption scheme also performs a bit remapping operation using a screen that identifies a correspondence between a plurality of initial index positions and a plurality of remapped index positions within the index block.

41. The data encryption method of claim 40, wherein the screen is generated based on a first object and a second object, wherein the first object comprises a sequence of bits and the second object comprises a sequence of integers.

42. The data encryption method of claim 41, wherein the first object is generated from a public binary setup object and a private binary setup object.

43. The data encryption method of claim 42, wherein the public binary setup object is unique to an encryption session.

44. The data encryption method of claim 41, wherein the second object comprises a private integer setup object.

45. The data encryption method of claim 41, wherein the screen is generated based on a set of movement instructions in which the bits of the first object are paired with the integers of the second object to create a set of bit/integer pairs, wherein the bit of each of the bit/integer pairs indicates a direction of bit movement within the index block and the integer of each of the bit/integer pairs indicates an offset of bit movement within the index block.

46. The data encryption method of claim 45, wherein the screen is further generated based on a mask.

47. The data encryption method of claim 46, wherein the screen is further generated based on an offset vector.

48. The data encryption method of claim 47, wherein the offset vector comprises a public integer pair that is unique to an encryption session.

* * * * *